United States Patent
Tagawa et al.

(10) Patent No.: US 7,644,154 B2
(45) Date of Patent: Jan. 5, 2010

(54) ADDRESS INFORMATION DISPLAY SYSTEM AND ADDRESS INFORMATION DISPLAY PROGRAM

(75) Inventors: Norio Tagawa, Nagoya (JP); Naoki Otsuka, Konan (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 738 days.

(21) Appl. No.: 11/236,676

(22) Filed: Sep. 28, 2005

(65) Prior Publication Data
US 2006/0067343 A1   Mar. 30, 2006

(30) Foreign Application Priority Data
Sep. 30, 2004   (JP)   ............... 2004-289135

(51) Int. Cl.
G06F 15/16   (2006.01)
G06F 15/173   (2006.01)

(52) U.S. Cl. ............... 709/224; 709/223; 709/251; 709/222; 709/245; 709/227; 709/229; 709/220; 709/201; 726/1; 726/5; 726/6; 726/7; 726/9; 370/401; 370/256; 370/386; 370/254

(58) Field of Classification Search ............... 709/238, 709/223, 245, 251, 222, 227, 220, 201, 224, 709/208, 229
See application file for complete search history.

(56) References Cited

U.S. PATENT DOCUMENTS

| 2002/0105946 A1 * | 8/2002 | Takeuchi | 370/352 |
| 2003/0163582 A1 * | 8/2003 | Inoue et al. | 709/238 |
| 2003/0210699 A1 * | 11/2003 | Holt et al. | 370/400 |

FOREIGN PATENT DOCUMENTS

| EP | 1244021 A1 | 9/2002 |
| JP | 2001-188732 | 7/2001 |
| JP | 2002-198997 | 7/2002 |

* cited by examiner

Primary Examiner—Jude J Jean Gilles
(74) Attorney, Agent, or Firm—Banner & Witcoff, Ltd.

(57) ABSTRACT

When a management PC (as an address information display device in an address information display system) displays IPv6 addresses that have been assigned to a device in the system, the addresses may be displayed in a pull-down menu, for example. The display order in the pull-down menu may be determined according to a priority order which can be set arbitrarily by the user. Further, addresses judged to be important (according to settings by the user) may be displayed using a bold font, local addresses are displayed in italic, addresses close to the expiration of term of validity may be grayed out) and invalid addresses (addresses already expired) may be grayed out with strikethroughs. As a result, an address information display system may be realized that is capable of displaying addresses assigned to a device in a style easy for the user to understand.

27 Claims, 34 Drawing Sheets

| IP ADDRESS | SCOPE | METHOD | LIFETIME | ELAPSED TIME | NUMBER OF DISPLAYS | FLAG | MARK |
|---|---|---|---|---|---|---|---|
| 2004::200:49ff:fe20:77 | Global | Static | 0 | 0 | 0 | — | Static, User |
| 3000::200:49ff:fe20:77 | Global | Stateless | 60 min. | 16 min. | 0 | — | Admin |
| 2000::1 | Global | Stateful | 60 min. | 3 min. | 0 | — | — |
| 3001::200:49ff:fe20:77 | Global | Stateless | 60 min. | 36 min. | 0 | depr. | — |
| fd01::200:49ff:fe20:77 | Site-Local | Stateless | 60 min. | 6 min. | 0 | — | — |
| fe80::200:49ff:fe20:77 | Link-Local | Auto | 0 | 0 | 0 | — | — |
| 3002::200:49ff:fe20:77 | Global | Stateless | 60 min. | 66 min. | 0 | inval. | — |

DEFAULT:PRIORITIZING GLOBAL SCOPE

| INDEX | COMPARISON FUNCTION | PRIORITY ORDER | | |
|---|---|---|---|---|
| | | 1 | 2 | 3 |
| 1 | compare_scope() | Global | Local | Link-Local |
| 2 | compare_method() | Static | Stateful | Stateless |
| 3 | compare_lifetime() | Preferred | Deprecated | Invalid |

FIG.10B

PRIORITIZING STATIC METHOD

| INDEX | CONPARISON FUNCTION | PRIORITY ORDER | | |
|---|---|---|---|---|
| | | 1 | 2 | 3 |
| 1 | compare_scope() | Static | Stateful | Stateless |
| 2 | compare_method() | Global | Local | Link-Local |
| 3 | compare_lifetime() | Preferred | Deprecated | Invalid |

FIG.10C

PRIORITIZING SITE-LOCAL SCOPE

| INDEX | CONPARISON FUNCTION | PRIORITY ORDER | | |
|---|---|---|---|---|
| | | 1 | 2 | 3 |
| 1 | compare_scope() | Site-Local | Global | Link-Local |
| 2 | compare_method() | Static | Stateful | Stateless |
| 3 | compare_lifetime() | Preferred | Deprecated | Invalid |

FIG.10D

PRIORITIZING LINK-LOCAL SCOPE

| INDEX | CONPARISON FUNCTION | PRIORITY ORDER | | |
|---|---|---|---|---|
| | | 1 | 2 | 3 |
| 1 | compare_scope() | Link-Local | Site-Local | Global |
| 2 | compare_method() | Static | Stateful | Stateless |
| 3 | compare_lifetime() | Preferred | Deprecated | Invalid |

| NAME | PROTOCOL | SOURCE IP ADDRESS | DESTINATION IP ADDRESS | DATE/TIME |
|---|---|---|---|---|
| host1 | LPD | 2001::11 | 3001::20 | 8/1/2004 10:10 |
| host2 | LPD | FE80::11 | 3001::20 | 8/2/2004 11:22 |
| host3 | HTTP | 2004::21 | FD01::20 | 8/4/2004 19:40 |

FIG.16

|  | PC | | |
|---|---|---|---|
|  | IPv4 | IPv6 | IPv4/IPv6 |
| PRINTER IPv4 | IPv4 | N/A | IPv4 |
| IPv6 | N/A | IPv6 | IPv6 |
| IPv4/IPv6 | IPv4 | IPv6 | IPv4/IPv6 |

| IP ADDRESS | SCOPE | METHOD | LIFETIME | ELAPSED TIME | NUMBER OF DISPLAYS | FLAG | MARK |
|---|---|---|---|---|---|---|---|
| 2004::200:49ff:fe20:77 | Global | Static | 0 | 0 | 0 | – | Static, User |
| 2004::2 | Global | Static | 0 | 0 | 0 | – | Static |
| 2005::3 | Global | Static | 0 | 0 | 0 | – | Static |
| 3000::200:49ff:fe20:77 | Global | Stateless | 60 min. | 16 min. | 0 | – | Admin |
| 2000::1 | Global | Stateful | 60 min. | 3 min. | 0 | – | – |
| 3000::200:49ff:fe20:77 | Global | Stateless | 60 min. | 36 min. | 0 | depr. | – |
| fd01::200:49ff:fe20:77 | Site-Local | Stateless | 60 min. | 6 min. | 0 | – | – |
| fe80::200:49ff:fe20:77 | Link-Local | Auto | 0 | 0 | 0 | – | – |
| 3002::200:49ff:fe20:77 | Global | Stateless | 60 min. | 66 min. | 0 | inval. | – |

FIG.32

ADDRESS INFORMATION DISPLAY SYSTEM AND ADDRESS INFORMATION DISPLAY PROGRAM

CROSS REFERENCE TO RELATED APPLICATION

This application claims priority from Japanese Patent Applications No. 2004-289135, filed on Sep. 30, 2004. The entire subject matter of the application is incorporated herein by reference.

BACKGROUND

1. Technical Field

Aspects of the present invention relate to an address information display system and an address information display program for displaying addresses that have been assigned to a device.

2. Related Art

Basic techniques for classifying IP addresses into several groups have been widely known as described in Japanese Patent Provisional Publication No. 2002-198997 (hereinafter referred to as JP publication No. 2002-198997) and Japanese Patent Provisional Publication No. 2001-188732 (hereinafter referred to as JP publication No. 2001-188732).

For example, JP publication No. 2002-198997 describes a technique for classifying collected IP addresses depending on the domain (to which each IP address belongs) and thereby identifying a domain from which access is made frequently. JP publication No. 2002-198997 describes a technique for classifying received IP addresses depending on the domain and thereby sending back data corresponding to the domain to the source (sender) of each IP address.

However, JP publications No. 2002-198997 and No. 2001-188732 only attempt to classify addresses corresponding to the total number of devices (considering only one address assigned to each device), with no proposal of a technique for classifying multiple addresses assigned to one device.

While a communication protocol IPv4 (Internet Protocol version 4) has been used so far in the Internet, a next-generation protocol called IPv6 (Internet Protocol version 6) is being introduced today. Under such circumstances, among devices connectable to a network (e.g. printers), those supporting both IPv4/IPv6 and those supporting IPv6 only (hereinafter collectively referred to as "IPv6 devices") are being put on the market in addition to conventional devices supporting IPv4 only. Such IPv6 devices are expected to increase rapidly in years to come.

Since the IPv6 standard allows for multiple addresses to be assigned to one device, an IPv6 device can have two or more addresses. A device supporting both IPv4/IPv6 has an IPv4 address in addition to the IPv6 address(es).

Therefore, when information on addresses assigned to an IPv6 device is displayed on a screen of a PC (Personal Computer) for example, simply displaying a random list (in which addresses assigned to an IPv6 device are arranged randomly) might be confusing to the user.

Especially, since IPv6 addresses include various types (addresses that become invalid when an expiration date comes, addresses having no expiration date, addresses differing in the area (extent) of the effective communication scope, etc.), if a random list of such IPv6 addresses is displayed on the screen, the user might be unable to recognize whether an address has an expiration date, whether an address having an expiration date is still valid, whether an address is usable in an intended communication scope etc.

SUMMARY

Illustrative aspects of the present invention are advantageous in that an address information display system and an address information display program for displaying addresses assigned to a device in a style easy for a user to understand can be provided.

BRIEF DESCRIPTION OF THE ACCOMPANYING DRAWINGS

Aspects of the present invention may become more apparent from the consideration of the following detailed description taken in conjunction with the accompanying drawings, in which:

FIG. 2 is a table showing an example of an address list in accordance with illustrative aspects of the invention.

FIG. 10A through 10D are tables showing examples of priority lists according to illustrative aspects of the present invention.

FIG. 16 is a table showing an example of an access log in accordance with illustrative aspects of the invention.

FIG. 21 is a table showing a correspondence table used by the management PC for determining whether to display IPv4/IPv6 addresses in accordance with illustrative aspects of the invention.

FIG. 30 is a screen image showing an example of balloon display on the device list display screen in accordance with illustrative aspects of the invention.

FIG. 32 is a table showing an example of the address list used for the balloon display process in accordance with illustrative aspects of the invention.

DETAILED DESCRIPTION

General Overview of Aspects

Figure 1:
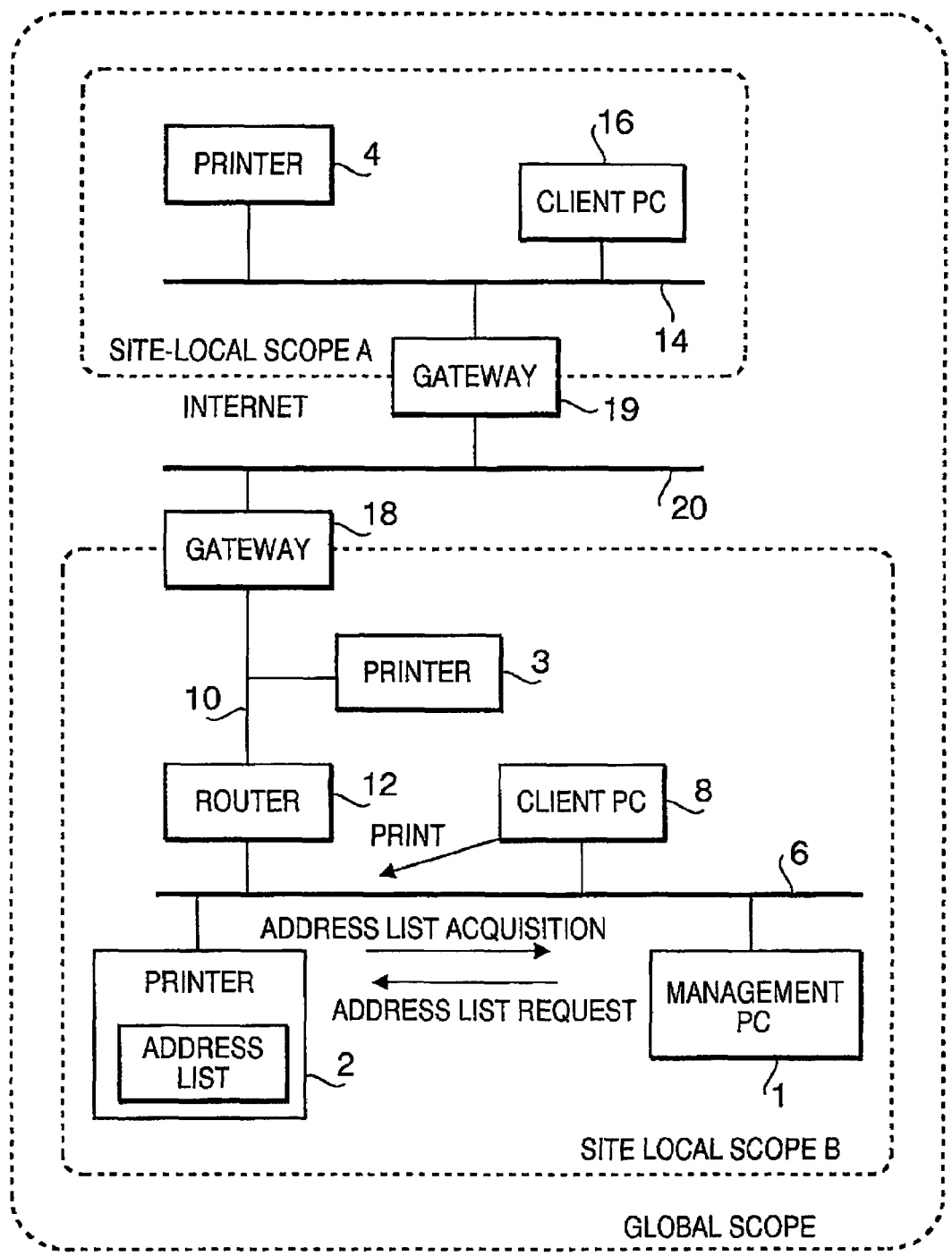
FIG. 1 is a block diagram showing the overall composition of a network system employing an address information display system in accordance with an illustrative embodiment of the present invention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, Flash memory, EEPROMs, CD-media, DVD-media, temporary storage, hard disk drives, floppy drives, permanent storage, and the like.

In accordance with an aspect of the present invention, there is provided an address information display system which is configured so that at least a first node included in nodes forming a network will function as an address information display device capable of displaying address information for an address assigned to a device connected to the network. The address information display system includes an address information storage unit configured to store the address information while storing pieces of address information corresponding to addresses assigned to a device; a judgment unit for judging whether an address assigned to a device is in a usable state based on the address information stored in the address information storage unit while judging whether each of the addresses of the device is in the usable state based on a corresponding piece of address information; and a display unit for displaying at least one address of the device judged by the judgment unit to be in the usable state when such an address exists while one of displaying each address of the device judged by the judgment unit to be in the unusable state in a display style different from a display style of the address judged to be in the usable state and not displaying each address judged to be in the unusable state.

In the above address information display system, the judgment unit may judge whether an address assigned to a device is in a usable state based on the address information stored in the address information storage unit. Especially when pieces of address information on a device have been stored in the address information storage unit, the judgment unit judges whether each of the addresses of the device is in the usable state based on a corresponding piece of address information. The display unit may display at least one address of a device judged by the judgment unit to be in the usable state when such an address exists. For each address judged by the judgment unit to be in the unusable state, the display unit may display the address in a display style different from the display style of the address judged to be in the usable state or not display the address. The difference in the display style may be implemented by changing any type of display style, such as color, font, character size, character decoration (underline, etc.), display status (blinking, inversion, etc.), or a combination of some of such styles.

With the address information display system configured as above, the user seeing the addresses displayed by the display unit can recognize whether each address is in the usable state based on the difference in the display style, or can recognize that each address displayed is in the usable state based on the fact that the address has been displayed by the display unit.

Therefore, by the address information display system in accordance with an illustrative aspect of the present invention, addresses assigned to a device can be displayed in a style easy for a user to understand different from the case where addresses are displayed randomly without classifying them depending on whether they are in the usable state, by which the user can easily find and recognize addresses that are in the usable state.

Incidentally, among the address information storage unit, the judgment unit and the display unit of the address information display system described above, at least the display unit is installed in the first node, by which the first node functions as the address information display device. Therefore, while the first node can mean the node provided with the display unit in the present invention, the address information storage unit and the judgment unit may either be installed in the first node or a node other than the first node.

Specifically, since the judgment unit receives the address information from the address information storage unit and outputs the result of judgment, the judgment unit can read the address information from the address information storage unit by internal processing in a single node in cases where the address information storage unit and the judgment unit are installed in the same node. Meanwhile, when the address information storage unit and the judgment unit are installed in different nodes, the address information is transmitted from the node having the address information storage unit to the node having the judgment unit by data communication.

Since the display unit is a unit for receiving the result of judgment from the judgment unit and outputting the address information to a display screen, the display unit can receive the judgment from the judgment unit by internal processing in a single node and thereby display the address information in cases where the judgment unit and the display unit are installed in the same node. Meanwhile, when the judgment unit and the display unit are installed in different nodes, the result of judgment is transmitted from the node having the judgment unit to the node having the display unit by data communication.

Further, each device whose address information may be stored in the address information storage unit may either be identical with or different from a device (node) having the address information storage unit, the judgment unit or the display unit.

For example, since the address information storage unit is a unit for storing the address information regarding one or more addresses assigned to each device, by providing each device with its own address information storage unit, the latest address information (including dynamically assigned addresses) can be stored in the address information storage unit with ease. Meanwhile, it is also possible to provide at least one address management server in the network and construct a system so that the address management server can recognize each event of address assignment to a device in the network (e.g. a system in which the address management server executes the address assignment to the devices, a system in which a notification is sent from each device to the address management server every time an address is assigned to the device, etc.). In this case, the address information storage unit may be installed in the address management server only, without the need to provide each device with its own address information storage unit.

The same goes for the judgment unit. In the case where each device is provided with its own address information storage unit, each device may be provided with its own judgment unit, or it is also possible to provide an information gathering server (for gathering information from the address information storage units of the devices) in the network and provide the information gathering server with the judgment unit. Such an information gathering server may either be identical with or different from the node having the display unit.

In the case where the judgment unit and the display unit are installed in different nodes, the result of judgment transmitted from the node having the judgment unit to the node having the display unit may either be data that turns into (or cause) visible (displayable) information at the point when the display unit carries out internal processing based on the result of judgment or data that has been created by internal processing of the judgment unit so that it can be immediately used by the display unit as visible information (e.g. data in a Web page format). In the latter case, the display unit can display intended visible information on the display screen only by displaying the data received from the judgment unit (e.g. only by opening the data in the Web page format received from the node having the judgment unit).

While the basic configuration of aspects of the address information display system in accordance with the present invention has been described above, other aspects of the address information display system of the present invention can be realized with the following configurations.

The address information may include validity term information regarding a term of validity which has been set to the address corresponding to the address information, and the judgment unit judges that an address is in the usable state if the term of validity set to the address has not expired yet based on the validity term information while judging that the address is in the unusable state if the term of validity has already expired based on the validity term information. Incidentally, the validity term information may also be information indicating whether the term of validity which has been set to the address corresponding to the address information has expired.

With the address information display system configured as above, the user seeing the addresses displayed by the display unit can recognize whether the term of validity of each address has expired based on the difference in the display style, or can recognize that the term of validity for each address displayed has not expired based on the fact that the address has been displayed by the display unit.

The address information storage unit may be configured to store the address information corresponding to an address until a prescribed time period passes since the term of validity set to the address has expired.

Such operation of the address information storage unit can be realized by, for example, providing the address information storage unit with a unit which periodically searches all pieces of address information stored in the address information storage unit to find address information that has passed the prescribed time period since the expiration of the term of validity and deletes such address information from the address information storage unit or a unit which sets a timer to each piece of address information whose term of validity has expired and deleting the address information when the prescribed time period has been counted by the counter.

With the address information display system configured as above, address information corresponding to an address whose term of validity has expired is still kept in the address information storage unit until the prescribed time period passes since the term of validity set to the address has expired, by which such address information corresponding to an expired address (whose term of validity has expired) can be included in the objects of processing by the judgment unit and the display unit until the prescribed time period passes since the expiration of the term of validity, differently from systems deleting address information from the address information storage unit immediately at the expiration of the term of validity of the address. Further, differently from systems executing no deletion of address information from the address information storage unit in regard to the expiration of the term of validity, address information corresponding to each expired address is not permanently included in the objects of the processing by the judgment unit and the display unit, by which the processing load on the judgment unit and the display unit can be reduced.

The address information storage unit may store the address information corresponding to an address until the address information is read out a prescribed number of times since the term of validity set to the address has expired.

Such operation of the address information storage unit can be realized by, for example, providing the address information storage unit with a unit which increments a counter each time the address information is read out from the address information storage unit and deletes the address information when the value of the counter exceeds the prescribed number of times.

With the address information display system configured as above, address information corresponding to an address whose term of validity has expired is still kept in the address information storage unit until the address information is read out the prescribed number of times since the term of validity set to the address has expired, by which such address information corresponding to an expired address can be included in the objects of the processing by the judgment unit and the display unit until the address information is read out the prescribed number of times since the expiration of the term of validity, differently from systems deleting address information from the address information storage unit immediately at the expiration of the term of validity of the address. Further, differently from systems executing no deletion of address information from the address information storage unit in regard to the expiration of the term of validity, address information corresponding to each expired address is not permanently included in the objects of the processing by the judgment unit and the display unit. As a result, the processing load on the judgment unit and the display unit can be reduced.

The address information display system may further include a message output unit which outputs a message when an address judged by the judgment unit is in an unusable state.

With the address information display system configured as above, the user can easily recognize that there exists an address judged by the judgment unit which is in the unusable state. Especially, even in the case where each address judged by the judgment unit to be in the unusable state is not displayed by the display unit, the user is informed of the presence of an address in the unusable state by the message outputted by the message output unit.

The address information may include first communication possibility information indicating whether the address corresponding to the address information is an address allowing communication with the first node, and the judgment unit judges that an address is in the usable state if the address allows communication with the first node based on the first communication possibility information while judging that the address is in the unusable state if the address does not allow communication with the first node based on the first communication possibility information.

With the address information display system configured as above, the user can recognize which address allows communication when communication between the first node (displaying the address information) and the device (corresponding to the address information) is necessary. For example, a user of the first node desiring to change the settings of the device by executing remote management of the device from the first node is allowed to easily judge which address to use.

The first communication possibility information may be information indicating whether the address corresponding to the address information is a destination address contained in an SNMP request transmitted from the first node.

In the address information display system, the "SNMP request" means a packet according to SNMP (Simple Network Management Protocol) which is transmitted from an SNMP manager to an SNMP agent.

With the address information display system configured as above, an address that has already been used for the transmission of an SNMP request from the first node (displaying the address information) to the device (corresponding to the address information) is judged as an address allowing communication with the first node. Therefore, a user of the first node desiring to change the settings of the device by executing remote management of the device from the first node using SNMP is allowed to easily judge which address to use, for example.

The first communication possibility information may be information indicating whether the address corresponding to the address information is an address in the same local area network as the first node.

With the address information display system configured as above, an address in the same local area network as the first node is judged as an address allowing communication with the first node. Therefore, a user of the first node desiring to communicate with a device in the same local area network as the first node is allowed to easily judge which address to use, for example.

The address information may include second communication possibility information indicating whether the address corresponding to the address information is an address allowing communication with a second node different from the first node, and the judgment unit judges that an address is in the usable state if the address allows communication with the second node based on the second communication possibility information while judging that the address is in the unusable state if the address does not allow communication with the second node based on the second communication possibility information.

With the address information display system configured as above, the user of the first node can learn which address the second node (different from the first node) should use when communication between the second node and the device is necessary.

Specifically, when the device has two or more addresses, there is a possibility that the first node and the second node are using different addresses for communication with the device. Therefore, when the user of the first node desires to know the address used by the second node for the communication with the device, the user can learn the address by employing the aforementioned second communication possibility information, even though the address is displayed at the first node.

The second communication possibility information included in the address information may be configured to indicate that the address corresponding to the address information is an address allowing communication with the second node if the address corresponding to the address information is an address of the device which has been used for communication between the second node and the device using a printing protocol.

In the address information display system, "printing protocol" means a protocol which is used when the second node outputs print data to the device (e.g. printer). Possible printing protocols include LPD, IPP, Port9100, DirectI-FAX, PDL-Datastream, etc.

With the address information display system configured as above, the address of the device which has been used for communication between the second node and the device using a printing protocol is judged as an address allowing communication with the second node. Therefore, the user of the first node can easily learn which address the second node should use when the second node has to output print data to the device, for example.

In the address information display system, the display unit may be configured to display each address judged by the judgment unit to be in the unusable state in a display style different from that of the address judged to be in the usable state.

With the address information display system configured as above, addresses judged by the judgment unit to be in the unusable state are also displayed by the display unit. Such a display mode is convenient for the user when the user desires to know the addresses judged to be in the unusable state (e.g. for analyzing accesses of the past).

In the address information display system, the display unit may also be configured to not display each address judged by the judgment unit to be in the unusable state.

With the address information display system configured as above, addresses judged by the judgment unit to be in the unusable state are not displayed by the display unit. Such a display mode is convenient for the user when addresses other than those judged to be in the usable state are unnecessary.

The address information may include communication protocol information capable of specifying a communication protocol that uses the address corresponding to the address information, and the judgment unit judges that an address is in the usable state if the address is used by a communication protocol supported by both devices communicating with each other based on the communication protocol information while judging that the address is in the unusable state if the address is used by a communication protocol not supported by both devices communicating with each other based on the communication protocol information.

Concretely, the address information may include communication protocol information capable of specifying whether the communication protocol that uses the address corresponding to the address information is IPv4 or IPv6. If the communication protocol IPv4 is supported by both devices communicating with each other, the judgment unit judges that an address used by IPv4 is in the usable state. If the communication protocol IPv6 is not supported by both devices communicating with each other, the judgment unit judges that an address used by IPv6 is in the unusable state.

With the address information display system configured as above, even when there are pieces of address information corresponding to different communication protocols (e.g. when the device supports both IPv4/IPv6), the judgment unit judges that an address used by a particular communication protocol (e.g. IPv4) is in the usable state if the first node supports the particular communication protocol only (e.g. IPv4), by which the user can learn which address can be used for communication between the first node and the device. Incidentally, while IPv4 and IPv6 have been taken as examples of communication protocols specified by the communication protocol information in the above explanation, of course other communication protocols may be specified by the communication protocol information.

The address information on a device may include a plurality of pieces of address information corresponding to addresses used by different communication protocols, the judgment unit judges whether each of the addresses of a device is in the usable state based on the corresponding piece of address information in regard to each of the different communication protocols, and the display unit displays addresses judged by the judgment unit to be in the usable state in regard to each of the different communication protocols.

With the address information display system configured as above, the display unit displays addresses judged by the judgment unit to be in the usable state in regard to each of the different communication protocols. For example, when there are pieces of address information corresponding to different communication protocols (e.g. when the device supports both IPv4/IPv6), addresses judged to be in the usable state are displayed in regard to each communication protocol (e.g. IPv4, IPv6). When both the communication protocols are available, the user can learn that both are available.

The address information on a device may include pieces of address information corresponding to addresses used by the same communication protocol. The judgment unit judges whether each of the addresses of a device is in the usable state based on the corresponding piece of address information.

With the address information display system configured as above, even when there are pieces of address information corresponding to one communication protocol as in the case of IPv6, whether each address corresponding to the communication protocol is in the usable state is judged by the judgment unit and the result of the judgment is displayed by the display unit.

When addresses of a device judged by the judgment unit to be in the usable state include a static address which is not changed unless manually changed by a user, the display unit may display one or more of the addresses including at least the static address.

With the address information display system configured as above, when a static address is included in the addresses judged to be in the usable state, the static address can be displayed more prominently than other types of addresses.

When there are two or more addresses of a device judged by the judgment unit to be in the usable state, the display unit displays all the addresses.

With the address information display system configured as above, all the addresses judged by the judgment unit to be in the usable state can be displayed.

When addresses of a device judged by the judgment unit to be in the usable state include a wide area network address which allows communication with a node outside a local area network, the display unit displays one or more of the addresses including at least the wide area network address.

With the address information display system configured as above, when a wide area network address is included in the addresses judged to be in the usable state, the wide area network address can be displayed more prominently than other types of addresses.

When addresses of a device judged by the judgment unit to be in the usable state include an address that the device last used for communication, the display unit displays one or more of the addresses including at least the address last used for communication.

With the address information display system configured as above, when an address that a device last used for communication is included in addresses of the device judged to be in the usable state, the address last used for communication is displayed more prominently than addresses used for prior communications, by which an address that is more likely to be used for communication than other addresses can be displayed.

The address information display system may further include a display condition storage unit which stores a display condition which can be set arbitrarily by a user. When addresses of a device judged by the judgment unit to be in the usable state include an address satisfying the display condition stored in the display condition storage unit, the display unit displays one or more of the addresses including at least the address satisfying the display condition.

With the address information display system configured as above, when an address satisfying the display condition stored in the display condition storage unit is included in the addresses judged to be in the usable state, the address satisfying the display condition is displayed more prominently than other addresses. Therefore, by designating a proper display condition, the user can let the display unit display an address meeting his/her needs.

While the address information display systems described above are configured to display at least one address in the usable state while displaying each address in the unusable state in a different display style or not displaying each address in the unusable state, the following address information display systems are configured to display at least one static address (address which is not changed unless changed manually by a user).

In accordance with another aspect of the present invention, there is provided an address information display system which is configured so that at least a first node included in nodes forming a network will function as an address information display device capable of displaying address information as information on an address assigned to a device connected to the network. The address information display system includes an address information storage unit which stores the address information while storing pieces of address information on a device when there are a plurality of pieces of address information on the device; a judgment unit which judges whether each address corresponding to each piece of address information is a static address which is not changed unless a user manually changes it based on a corresponding piece of address information stored in the address information storage unit; and a display unit which displays at least an address of a device judged by the judgment unit to be a static address when such an address exists while displaying each address of the device judged by the judgment unit not to be a static address in a display style different from that of the address judged to be a static address or not displaying each address judged not to be a static address.

In the address information display system, the judgment unit judges whether an address assigned to a device is a static address based on the address information stored in the address information storage unit. Especially when pieces of address information on a device have been stored in the address information storage unit, the judgment unit judges whether each address corresponding to each piece of address information is a static address based on a corresponding piece of address information stored in the address information storage unit. The display unit displays at least an address of a device judged by the judgment unit to be a static address when such an address exists. For each address judged by the judgment unit not to be a static address, the display unit displays the address in a display style different from that of the address judged to be a static address or does not display the address. The difference in the display style may be implemented by changing any type of display style, such as color, font, character size, character decoration (underline, etc.), display status (blinking, inversion, etc.), or a combination of some of such styles.

With the address information display system configured as above, the user seeing the addresses displayed by the display unit can recognize whether each address is a static address based on the difference in the display style, or can recognize that each address displayed is a static address based on the fact that the address has been displayed by the display unit.

Therefore, by the address information display system in accordance with aspects of the present invention, addresses assigned to a device can be displayed in a style easy for a user to understand differently from the case where addresses are displayed randomly without classifying them into static addresses and other addresses. As a result, the user is allowed to easily find and recognize static addresses.

Also in the above address information display system, at least the display unit (among the address information storage unit, the judgment unit and the display unit) is installed in the first node, by which the first node functions as the address information display device. The address information storage unit and the judgment unit may either be installed in the first node or a node other than the first node.

The above address information display system can be more desirable with the following configurations.

In the address information display system, the display unit may be configured to not display each address judged by the judgment unit not to be a static address.

With the address information display system configured as above, each address judged by the judgment unit not to be a static address is not displayed by the display unit. Such a display mode is convenient when addresses other than static addresses are unnecessary.

In the address information display system, the display unit may also be configured to display each address judged by the judgment unit not to be a static address in a display style different from that of the address judged to be a static address.

With the address information display system configured as above, the user can learn which address has been assigned as a static address. Such a display mode is convenient when the user desires to know each address which has been assigned not as a static address.

When t an address judged by the judgment unit is a static address, the display unit displays one or more addresses including at least the static address.

Also with the address information display system, the user can learn which address has been assigned as a static address.

When there are two or more addresses judged by the judgment unit to be a static address, the display unit first displays only one of the static addresses and thereafter displays two or more static address when a prescribed operation is performed by a user.

With the address information display system configured as above, only one static address (address judged to be a static address) is displayed first when there are two or more addresses judged to be a static address. Therefore, the screen layout can be simplified compared to cases where addresses are displayed from the beginning. Since static addresses are displayed in response to a prescribed operation by the user, the user desiring to know static addresses can see the static addresses with no problem, differently from systems displaying only one static address.

In accordance with another aspect of the present invention, there is provided a computer program product (address information display program) including computer-readable instructions that cause at least a first node included in nodes forming a network to function as an address information display device which displays address information as information on an address assigned to a device connected to the network. The computer-readable instructions cause the first node to execute: an address information acquisition step of obtaining the address information on a device from one of the nodes forming the network while obtaining pieces of address information when there are pieces of address information on the device; a judgment step of judging whether an address assigned to the device is in a usable state based on the address information obtained in the address information acquisition step while judging whether each of multiple addresses of the device is in the usable state based on a corresponding piece of address information when pieces of address information on the device have been obtained in the address information acquisition step; and a display step of displaying at least one address of the device judged by the judgment step to be in the usable state when such an address exists while displaying each address of the device judged by the judgment step to be in the unusable state in a display style different from that of the address judged to be in the usable state or not displaying each address judged to be in the unusable state.

While a personal computer can be named as a typical example of a device implementing the first node executing the steps according to the computer program product, the first node may also be implemented by other types of devices as long as the steps can be executed similarly.

An address information storage unit may be placed in one of the nodes on the network, and the above address information acquisition step is configured as a step for obtaining the address information from the address information storage unit existing on the network. The address information storage unit is equivalent to the units in the address information display systems which have been described above.

When the above steps are executed by the first node, the judgment step judges whether an address assigned to the device is in a usable state based on the address information obtained in the address information acquisition step. Especially when pieces of address information on the device have been obtained in the address information acquisition step, the judgment step judges whether each of multiple addresses of the device is in the usable state based on a corresponding piece of address information. In the display step, at least one address of the device judged by the judgment step to be in the usable state is displayed when such an address exists. For each address of the device judged by the judgment step to be in the unusable state, the display step displays the address in a display style different from that of the address judged to be in the usable state or does not display the address. The difference in the display style may be implemented by changing any type of display style, such as color, font, character size, character decoration (underline, etc.), display status (blinking, inversion, etc.), or a combination of some of such styles.

With the first node executing the steps according to the computer program product configured as above, a user seeing the addresses displayed by the display step can recognize whether each address is in the usable state based on the difference in the display style, or can recognize that each address displayed is in the usable state based on the fact that the address has been displayed by the display step.

Therefore, by the first node executing the above steps according to the computer program product, addresses assigned to a device can be displayed in a style easy for the user to understand differently from the case where addresses are displayed randomly without classifying them depending on whether they are in the usable state. As a result, the user is allowed to easily find and recognize addresses that are in the usable state.

The computer program product can be more desirable with the following configurations.

The computer program product may further include computer-readable instructions that cause the first node to execute a message output step of outputting a message when there exists an address judged by the judgment step is in the unusable state.

With the first node executing the steps according to the computer program product configured as above, the user can easily recognize that there exists an address judged by the judgment step to be in the unusable state. Especially, even in the case where each address judged by the judgment step to be in the unusable state is not displayed by the display step, the user is informed of the presence of an address in the unusable state by the message outputted by the message output step.

The address information may include first communication possibility information indicating whether the address corresponding to the address information is an address allowing communication with the first node, and the judgment step judges that an address is in the usable state if the address allows communication with the first node based on the first communication possibility information while judging that the address is in the unusable state if the address does not allow communication with the first node based on the first communication possibility information.

With the first node executing the steps according to the computer program product configured as above, the user can recognize which address allows communication when communication between the first node (displaying the address information) and the device (corresponding to the address information) is necessary. For example, a user of the first node desiring to change the settings of the device by executing remote management of the device from the first node is allowed to easily judge which address to use.

The address information may include second communication possibility information indicating whether the address corresponding to the address information is an address allowing communication with a second node different from the first node, and the judgment step judges that an address is in the usable state if the address allows communication with the second node based on the second communication possibility information while judging that the address is in the unusable state if the address does not allow communication with the second node based on the second communication possibility information.

With the first node executing the steps according to the computer program product configured as above, the user of the first node can learn which address the second node (different from the first node) should use when communication between the second node and the device is necessary.

When the device has two or more addresses, there is a possibility that the first node and the second node are using different addresses for communication with the device. Therefore, when the user of the first node desires to know the address used by the second node for the communication with the device, the user can learn the address by employing the aforementioned second communication possibility information, even though the address is displayed at the first node.

In the computer program product, the display step may be configured to display each address judged by the judgment step to be in the unusable state in a display style different from that of the address judged to be in the usable state.

With the first node executing the steps according to the computer program product configured as above, addresses judged by the judgment step to be in the unusable state are also displayed by the display step. Such a display mode is convenient for the user when the user desires to know the addresses judged to be in the unusable state (e.g. for analyzing accesses of the past).

In the computer program product, the display step may also be configured to not display each address judged by the judgment step to be in the unusable state.

With the first node executing the steps according to the computer program product configured as above, addresses judged by the judgment step to be in the unusable state are not displayed by the display step. Such a display mode is convenient for the user when addresses other than those judged to be in the usable state are unnecessary.

The address information may include communication protocol information capable of specifying a communication protocol that uses the address corresponding to the address information, and the judgment step judges that an address is in the usable state if the address is used by a communication protocol supported by both devices communicating with each other based on the communication protocol information while judging that the address is in the unusable state if the address is used by a communication protocol not supported by both devices communicating with each other based on the communication protocol information.

Concretely, the address information may include communication protocol information capable of specifying whether the communication protocol that uses the address corresponding to the address information is IPv4 or IPv6. If the communication protocol IPv4 is supported by both devices communicating with each other, the judgment step judges that an address used by IPv4 is in the usable state. If the communication protocol IPv6 is not supported by both devices communicating with each other, the judgment step judges that an address used by IPv6 is in the unusable state.

With the first node executing the steps according to the computer program product configured as above, even when there are pieces of address information corresponding to different communication protocols (e.g. when the device supports both IPv4/IPv6), the judgment step judges that an address used by a particular communication protocol (e.g. IPv4) is in the usable state if the first node supports the particular communication protocol only (e.g. IPv4), by which the user can learn which address can be used for communication between the first node and the device. Incidentally, while IPv4 and IPv6 have been taken as examples of communication protocols specified by the communication protocol information in the above explanation, of course other communication protocols may be specified by the communication protocol information.

The address information on a device may include pieces of address information corresponding to addresses used by different communication protocols, the judgment step judges whether each of the addresses of the device is in the usable state based on the corresponding piece of address information in regard to each of the different communication protocols, and the display step displays addresses judged by the judgment step to be in the usable state in regard to each of the different communication protocols.

With the first node executing the steps according to the computer program product configured as above, the display step displays addresses judged by the judgment step to be in the usable state in regard to each of the different communication protocols. For example, when there are pieces of address information corresponding to different communication protocols (e.g. when the device supports both IPv4/IPv6), addresses judged to be in the usable state are displayed in regard to each communication protocol (e.g. IPv4, IPv6). When both the communication protocols are available, the user can learn that both are available.

The address information on a device may include pieces of address information corresponding to addresses used by the same communication protocol. The judgment step judges whether each of the addresses of the device is in the usable state based on the corresponding piece of address information.

With the first node executing the steps according to the computer program product configured as above, even when there are pieces of address information corresponding to one communication protocol as in the case of IPv6, whether each address corresponding to the communication protocol is in the usable state is judged by the judgment step and the result of the judgment is displayed by the display step.

When addresses of the device judged by the judgment step to be in the usable state include a static address which is not changed unless manually changed by a user, the display step displays one or more of the addresses including at least the static address.

With the first node executing the steps according to the computer program product configured as above, when a static address is included in the addresses judged to be in the usable state, the static address can be displayed more prominently than other types of addresses.

When there are two or more addresses of the device judged by the judgment step to be in the usable state, the display step displays all the addresses.

With the first node executing the steps according to the computer program product configured as above, all the addresses judged by the judgment step to be in the usable state can be displayed.

When addresses of the device judged by the judgment step to be in the usable state include a wide area network address which allows communication with a node outside a local area network, the display step displays one or more of the addresses including at least the wide area network address.

With the first node executing the steps according to the computer program product configured as above, when a wide area network address is included in the addresses judged to be in the usable state, the wide area network address can be displayed more prominently than other types of addresses.

When addresses of the device judged by the judgment step to be in the usable state include an address that the device last used for communication, the display step displays one or more of the addresses including at least the address last used for communication.

With the first node executing the steps according to the computer program product configured as above, when an address that the device last used for communication is included in addresses of the device judged to be in the usable state, the address last used for communication is displayed more prominently than addresses used for prior communications, by which an address that is more likely to be used for communication than other addresses can be displayed.

The computer program product may further include computer-readable instructions that cause the first node to execute a display condition acquisition step of acquiring a display condition which can be set arbitrarily by a user. When addresses of the device judged by the judgment step to be in the usable state include an address satisfying the display condition acquired by the display condition acquisition step, the display step displays one or more of the addresses including at least the address satisfying the display condition.

With the first node executing the steps according to the computer program product configured as above, when an address satisfying the display condition acquired by the display condition acquisition step is included in the addresses judged to be in the usable state, the address satisfying the display condition is displayed more prominently than other addresses. Therefore, by designating a proper display condition, the user can let the display step display an address meeting his/her needs.

While the computer program products described above are configured to let the first node display at least one address in the usable state while displaying each address in the unusable state in a different display style or not displaying each address in the unusable state, the following computer program products are configured to let the first node display at least one static address (address which is not changed unless a user changes it intentionally).

In accordance with a further aspect of the present invention, there is provided a computer program product (address information display program) including computer-readable instructions that cause at least a first node included in nodes forming a network to function as an address information display device which displays address information as information on an address assigned to a device connected to the network. The computer-readable instructions cause the first node to execute: an address information acquisition step of obtaining the address information on a device from one of the nodes forming the network while obtaining pieces of address information when there are pieces of address information on the device; a judgment step of judging whether an address assigned to the device is a static address which is not changed unless a user manually changes it based on the address information obtained in the address information acquisition step while judging whether each of multiple addresses of the device is a static address based on a corresponding piece of address information when pieces of address information on the device have been obtained in the address information acquisition step; and a display step of displaying at least one address of the device judged by the judgment step to be a static address when such an address exists while displaying each address of the device judged by the judgment step not to be a static address in a display style different from that of the address judged to be a static address or not displaying each address judged not to be a static address.

As mentioned above, while a personal computer can be named as a typical example of a device implementing the first node executing the steps according to the computer program product, the first node may also be implemented by other types of devices as long as the steps can be executed similarly.

Specifically, an address information storage unit is placed in one of the nodes on the network, and the above address information acquisition step is configured as a step for obtaining the address information from the address information storage unit existing on the network. The address information storage unit is equivalent to the units in the address information display systems which have been described above.

When the above steps are executed by the first node, the judgment step judges whether an address assigned to the device is a static address based on the address information obtained in the address information acquisition step. Especially when pieces of address information on the device have been obtained in the address information acquisition step, the judgment step judges whether each of multiple addresses of the device is a static address based on a corresponding piece of address information. In the display step, at least one address of the device judged by the judgment step to be a static address is displayed when such an address exists. For each address of the device judged by the judgment step not to be a static address, the display step displays the address in a display style different from that of the address judged to be a static address or does not display the address. The difference in the display style may be implemented by changing any type of display style, such as color, font, character size, character decoration (underline, etc.), display status (blinking, inversion, etc.), or a combination of two or more of such styles.

With the first node executing the steps according to the computer program product configured as above, a user seeing the addresses displayed by the display step can recognize whether each address is a static address or not based on the difference in the display style, or can recognize that each address displayed is a static address based on the fact that the address has been displayed by the display step.

Therefore, by the first node executing the above steps according to the computer program product, addresses assigned to a device can be displayed in a style easy for the user to understand differently from the case where addresses are displayed randomly without classifying them into static addresses and other addresses. As a result, the user is allowed to easily find and recognize static addresses.

The computer program product can be more desirable with the following configurations.

In the computer program product, the display step may be configured to not display each address judged by the judgment step not to be a static address.

With the first node executing the steps according to the computer program product configured as above, each address judged by the judgment step not to be a static address is not displayed by the display step. Such a display mode is convenient when addresses other than static addresses are unnecessary.

In the computer program product, the display step may also be configured to display each address judged by the judgment step not to be a static address in a display style different from that of the address judged to be a static address.

With the first node executing the steps according to the computer program product configured as above, the user can learn which address has been assigned as a static address. Such a display mode is convenient when the user desires to know each address which has been assigned not as a static address.

When an address judged by the judgment step is a static address, the display step may display one or more addresses including at least the static address.

Also with the first node executing the steps according to the computer program product configured as above, the user can learn which address has been assigned as a static address.

When there are two or more addresses judged by the judgment step to be a static address, the display step may first display only one of the static addresses and thereafter displays two or more static address when a prescribed operation is performed by a user.

With the first node executing the steps according to the computer program product configured as above, only one static address (address judged to be a static address) is displayed first when there are two or more addresses judged to be a static address. Therefore, the screen layout can be simplified compared to cases where addresses are displayed from the beginning. Since static addresses are displayed in response to a prescribed operation by the user, the user desiring to know static addresses can see the static addresses with no problem, differently from cases where only one static address can be displayed.

Illustrative Embodiment

Referring now to the drawings, a description will be given in detail of an illustrative embodiment in accordance with the present invention.

1. Overall Composition of System

FIG. 1 is a block diagram showing the overall composition of a network system employing an address information display system in accordance with an illustrative embodiment of the present invention.

In the network system of FIG. 1, a management PC 1 serves as a first node designed to function as an address information display device in accordance with aspects of the present invention (first node executing an address information display program in accordance with aspects of the present invention). The network system includes printers 2, 3 and 4 capable of receiving print requests from nodes on the network. The printers 2, 3 and 4 are devices as the objects of the address information display.

Among the above network devices, the management PC 1 and the printer 2 are connected to a LAN (Local Area Network) 6. To the LAN 6, a client PC 8 capable of outputting a print request to the printer 2 is also connected. The printer 3 is connected to a LAN 10 to which the LAN 6 is connected via a router 12. The LANs 6 and 10 form a LAN having a hierarchical structure, in which the LAN 10 serves as an upper-level LAN and the LAN 6 serves as a lower-level LAN. Meanwhile, the printer 4 is connected to another LAN 14. To the LAN 14, a client PC 16 capable of outputting a print request to the printer 4 is also connected. The LANs 10 and 14 are connected to the Internet 20 via gateways 18 and 19, respectively.

The above network devices (the management PC 1, the printers 2, 3 and 4, etc.) are a combination of devices supporting IPv4 (hereinafter referred to as "IPv4 devices"), devices supporting IPv6 (hereinafter referred to as "IPv6 devices") and devices supporting both IPv4 and IPv6 (hereinafter referred to as "IPv4/IPv6 devices"). The IPv4 devices and the IPv4/IPv6 devices are capable of communicating with one another by a communication protocol according to IPv4, while IPv6 devices and the IPv4/IPv6 devices are capable of communicating with one another by a communication protocol according to IPv6. Incidentally, the term "IPv6 devices" (devices supporting IPv6) can include the IPv4/IPv6 devices (devices supporting both IPv4 and IPv6) in the following description.

Specifically, the IPv4 devices and the IPv4/IPv6 devices are assigned IPv4 addresses (as addresses for uniquely identifying and specifying each device on the network) so that they can communicate with one another using the IPv4 addresses. Meanwhile, the IPv6 devices and the IPv4/IPv6 devices are assigned IPv6 addresses (as addresses for uniquely identifying and specifying each device on the network) so that they can communicate with one another using the IPv6 addresses. Therefore, each IPv4/IPv6 device is assigned both an IPv4 address and an IPv6 address.

Further, in IPv6, each device can be assigned two or more IPv6 addresses while each device is assigned only one IPv4 address in IPv4. The IPv6 addresses assigned to one device differ from one another in regard to the effective communication scope (in which the address is usable) and the address assignment method, for example.

Specifically, IPv6 assumes several levels of communication scopes of different widths (areas), and an IPv6 device (node) can be assigned several addresses (each of which is usable for communication within each communication scope) corresponding to several communication scopes. The widest communication scope is the one called "global scope". In the example of FIG. 1, the global scope contains the whole network including the Internet 20. Inside the global scope, communication scopes called "site-local scopes" are set. In FIG. 1, a site-local scope (site-local scope A, site-local scope B) is a scope containing a whole LAN that is connected to the Internet 20 via a gateway (18, 19). Inside each site-local scope, communication scopes called "link-local scopes" are set. A link-local scope is a scope in which direct communication via no router is possible inside a site-local scope. In FIG. 1, the inside of a subnet like the LAN 6 (in which communication is possible not via the router 12) corresponds to a site-local scope. Corresponding to the scopes of different levels, an IPv6 device (node) can be assigned a global address usable for communication in a global scope, a site-local address usable for communication in a site-local scope, a link-local address usable for communication in a link-local scope, etc. Since some levels of scopes can be formed between the global scope and a link-local scope depending on the number of routers, what levels actually correspond to a "site-local scope" can not be specified uniquely. However, one or more levels managed by a particular manager/administrator while being separated from other scopes are collectively called a "site", and the inside of the "site" is generally called a "site-local scope". Incidentally, a global address is also usable for communication in a site-local scope and communication in a link-local scope, and a site-local address is also usable for communication in a link-local scope. Thus, it is generally unnecessary to assign each device the above addresses corresponding to all the scopes. Any one of the addresses suitable for communication among devices may be employed arbitrarily.

There are various ways of assigning an IP address to a device (irrespective of whether the address is an IPv4 address or an IPv6 address): assigning a "static address" which is designated by a user, assigning an "automatically set address" which is automatically set inside a network, etc. While only one of the above methods has to be selected for assigning an address to a device in IPv4, both a static address and an automatically set address can be assigned to a device in IPv6 since two or more addresses can be assigned to an IPv6 device as explained above. Further, in IPv6, the automatic address setting includes various ways, such as "stateful automatic address setting" in which an IP address is obtained from a DHCP server and "stateless automatic address setting" in which each node generates an IP address based on its MAC address.

As explained above, addresses handled by the network system of this illustrative embodiment include various types differing in the communication protocol (IPv4, IPv6), the communication scope (Global, Site-Local, Link-Local), the address assigning method (static, automatic setting (stateful, stateless)), etc.

2. Configuration of Address List

In the following, the configuration of an address list, which is stored in each printer 2, 3, 4 (as an object of the address information display) in the network system, will be explained in detail.

Each of the printers 2, 3 and 4 as the objects of the address information display stores an address list (as shown in the printer 2 in FIG. 1). The address list stores address information corresponding to addresses that have been assigned to the printer (2, 3, 4), as shown in FIG. 2 for example.

The address information corresponding to an address includes items such as "IP ADDRESS", "SCOPE", "METHOD", "LIFETIME (or TERM OF VALIDITY)", "ELAPSED TIME", "NUMBER OF DISPLAYS", "FLAG" and "MARK". The "IP ADDRESS" stores an IP address. The "SCOPE" stores one of the "Global", "Site-Local" and "Link-Local" which have been explained above. The "METHOD" stores the method of assigning the IP address (Static, Stateless, Stateful, etc.). The "LIFETIME" stores the lifetime (or the term of validity) of the IP address. The lifetime of the IP address is set when the IP address is assigned. The value "0" in the item "LIFETIME" means an infinite lifetime. The "NUMBER OF DISPLAYS" stores a value indicating how many times the address has been displayed by a process which will be explained later. The "FLAG" stores information on the status of the IP address (selected from "Deprecated", "Invalid" and "-" (meaning normal status). The meanings of the flags will be described later in an explanation of a process. The "MARK" can store information indicating that the IP address is a special IP address. Specifically, the "MARK" can store one or more selected from "Admin" indicating that the address has been accessed by the management PC 1, "User" indicating that the address has been accessed by a client PC, "Last" indicating that the address is the one last used, and "Static" indicating that the address has been assigned as a static address.

The lines of address information in the address list are sorted automatically so that a line having higher priority (explained later) will be ranked higher (placed higher in the example of FIG. 2). Therefore, when the address information in the address list is displayed in the process explained later, the addresses can be displayed in the order of priority by simply displaying the lines of address information in the order of the address list.

Incidentally, each address list in this illustrative embodiment is stored as a part of an MIB (Management Information Base) which is employed in SNMP (Simple Network Management Protocol). The management PC 1 is provided with a function of serving as an SNMP manager, while each printer (2, 3, 4) serves as an SNMP agent. By the cooperation of the SNMP manager and SNMP agents, the management PC 1 (SNMP manager) can obtain each piece of information stored in the address list of each printer (SNMP agent) by sending a request designating an OID (Object ID for requesting the particular information stored in the MIB) to the printer (SNMP agent) by SNMP.

3. Processes Executed by Each Device

In the following, processes executed by each of the devices as the objects of the address information display (the printers 2, 3 and 4) will be explained in detail. Since the processes executed by the printers 2, 3 and 4 are equivalent to one another, the following explanation will be given assuming that the processes are executed by the printer 2. The printer 2 executes the following three processes (a first process, a second process and a third process) as processes related to the network system. The three processes are performed in parallel, independently and asynchronously.

3.1 First Process Executed by Each Device

Figure 3:
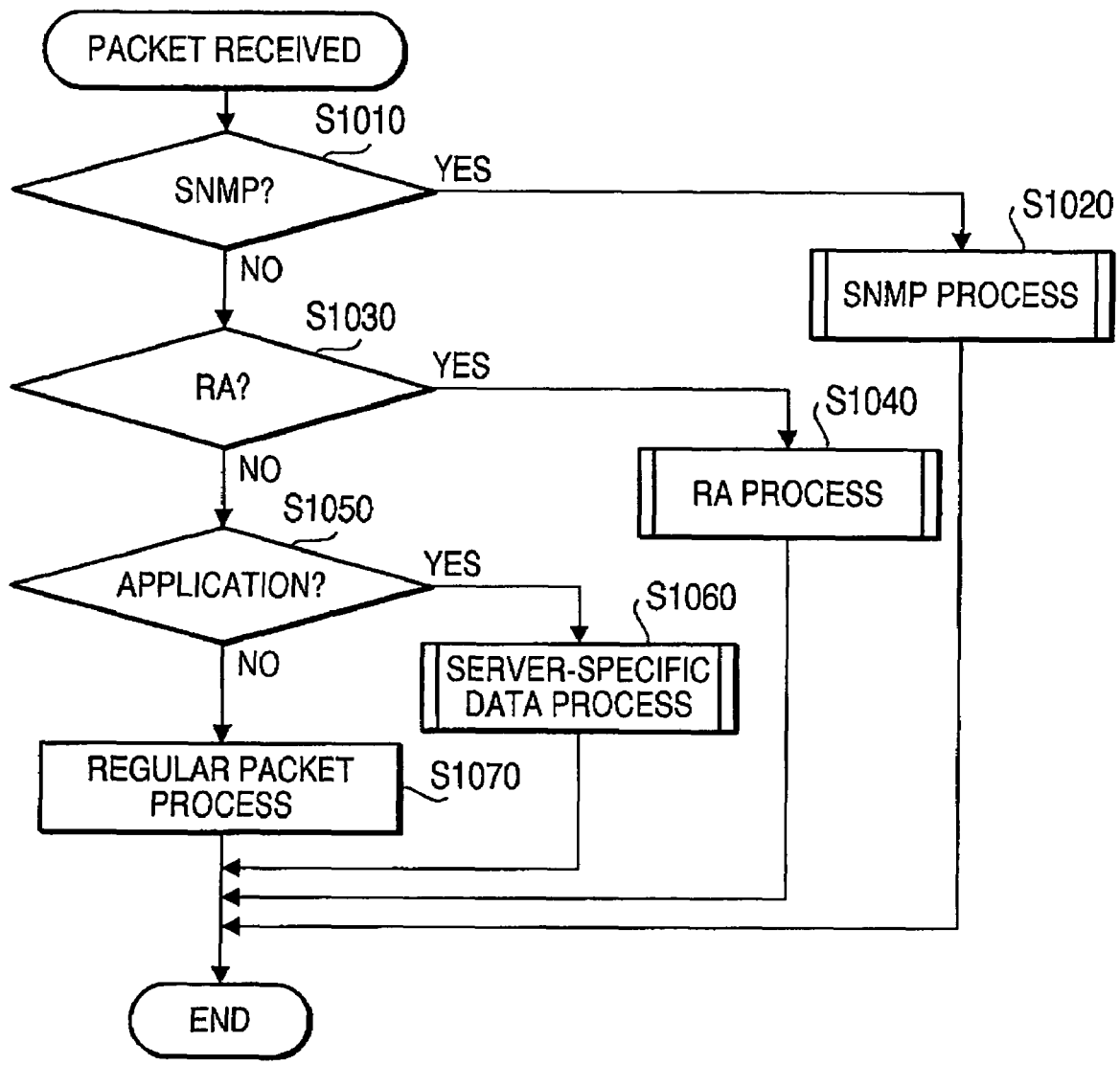
FIG. 3 is a flow chart showing a first process (packet reception process) executed by each device in the network system in accordance with illustrative aspects of the invention.

First, the first process executed by the printer 2 (each device) will be described referring to a flow chart of FIG. 3. The first process is executed by the printer 2 on each reception of a packet via the network.

At the start of the first process, the printer 2 judges whether the received packet is an SNMP packet (S1010). If the received packet is an SNMP packet (S1010: YES), an SNMP process (explained later) is executed (S1020) and the first process of FIG. 3 is ended. If the received packet is not an SNMP packet (S1010: NO), whether the received packet is an RA (Router Advertisement) packet is judged (S1030). If the received packet is an RA packet (S1030: YES), an RA process (explained later) is executed (S1040) and the first process of FIG. 3 is ended. If the received packet is not an RA packet (S1030: NO), whether the received packet is a packet from an application is judged (S1050). If the received packet is a packet from an appreciation (S1050: YES), a server-specific data process is executed (S1060) and the first process of FIG. 3 is ended. Incidentally, while the server-specific data process of S1060 is a process for storing data to be processed by the third process (server-specific process, explained later) in a data buffer of each server, the server-specific data process (S1060) itself does not correspond to the third process which will be explained later. Therefore, the third process (server-specific process) and the server-specific data process (S1060) are executed asynchronously. If the received packet is not a packet from an application (S1050: NO), a regular packet process is executed (S1070) and the first process of FIG. 3 is ended. While the regular packet process of S1070 (executed when the received packed is not an SNMP packet, an RA packet nor a packet from an application) actually branches out into several subprocesses, detailed explanation of such subprocesses (not directly relevant to the present invention) is omitted here.

3.1.1 SNMP Process

Next, the SNMP process executed in the step S1020 of the first process of FIG. 3 will be explained referring to a flow chart of FIG. 4. At the start of the SNMP process, the printer 2 judges whether the received packet is an address list acquisition request (S1210). The address list acquisition request is a packet which is transmitted by the management PC 1 to the printer 2 when the management PC 1 needs to acquire the address list managed by the printer 2.

If the received packet is judged to be an address list acquisition request (S1210: YES), the printer 2 executes a management PC address check process (S1220). The details of the management PC address check process of S1220 are shown in FIG. 5.

Figure 5:
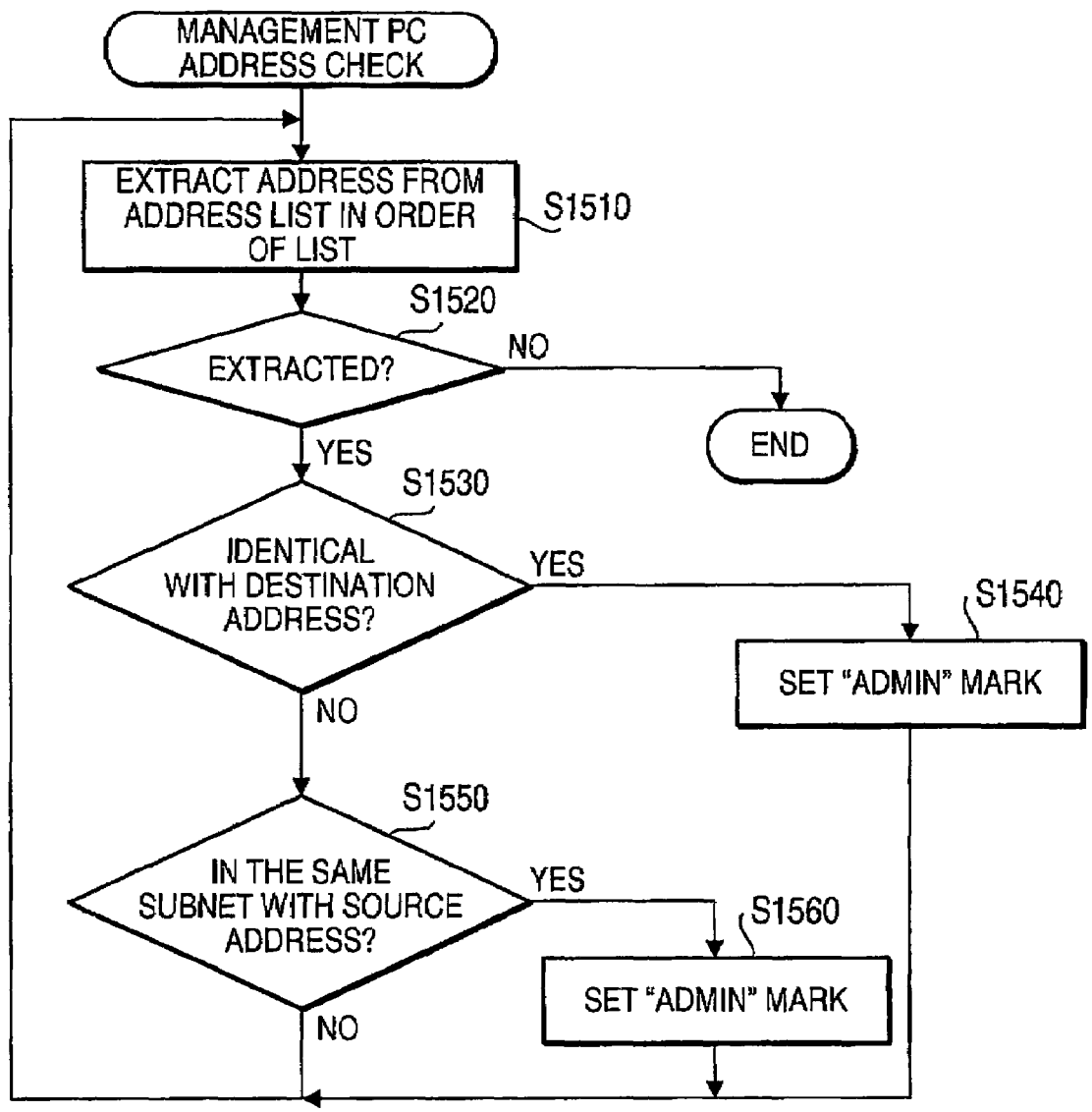
FIG. 5 is a flow chart showing a management PC address check process executed by each device in the network system in accordance with illustrative aspects of the invention.

Referring to FIG. 5, the printer 2 extracts a piece (line) of address information from its own address list (see FIG. 2) in the order of the list (from the high priority side of the address list) (S1510) and thereafter judges whether a piece of address information has been successfully extracted (S1520). Since at least one address has been assigned to the printer 2, the judgment of the step S1520 results in "YES" at least once. In this case (S1520: YES), whether the IP address in the address information extracted in S1510 is identical with a destination address contained in the SNMP packet (address list acquisition request) (which has been used as the destination of the address list acquisition request) is checked (S1530).

If the addresses are identical with each other (S1530: YES), the "Admin" mark (see FIG. 2) is set in a part of the address list corresponding to the address information extracted in S1510 so as to update the address list of the printer 2 (S1540).

If the addresses are not identical with each other (S1530: NO), whether the IP address in the address information extracted in S1520 and a source address contained in the SNMP packet (as the source of the address list acquisition request) are in the same subnet is checked (S1550). In IPv6, the prefix length is 64 for ordinary terminal devices, and thus the addresses may be judged to be in the same subnet if the first 64 bits of one address are identical with those of the other address. In IPv4 (in which a subnet mask has been set), the comparison is made after masking the addresses with the subnet mask.

If the addresses are in the same subnet (S1550: YES), the "Admin" mark (see FIG. 2) is set in a part of the address list corresponding to the address information extracted in S1510 so as to update the address list of the printer 2 (S1560).

When the addresses are not judged to be in the same subnet (S1550: NO) or after the setting of the "Admin" mark in S1540 or S1560, the process returns to S1510. Thereafter, the above process (S1510-S1560) is repeated until the judgment of S1520 results in "NO". By the repetition, the lines of address information contained in the address list are successively processed in the order of the list (from the high priority side of the address list). When S1510 is executed after a piece (line) of address information at the end of the address list is processed, no further address information can be extracted (S1520: NO). In this case, the management PC address check process of FIG. 5 is ended.

As above, the management PC address check process of FIG. 5 is a process for adding the "Admin" mark to addresses that are used when an SNMP packet is transmitted from the management PC 1. While the "Admin" mark in this illustrative embodiment is added to both an address that is totally identical with the destination address and an address that is presumed to be in the same network (subnet) as the source address based on the checks in S1530 and S1550, adding the "Admin" mark to either of them is generally sufficient for the purpose (S1530 or S1550 may be omitted).

Figure 4:
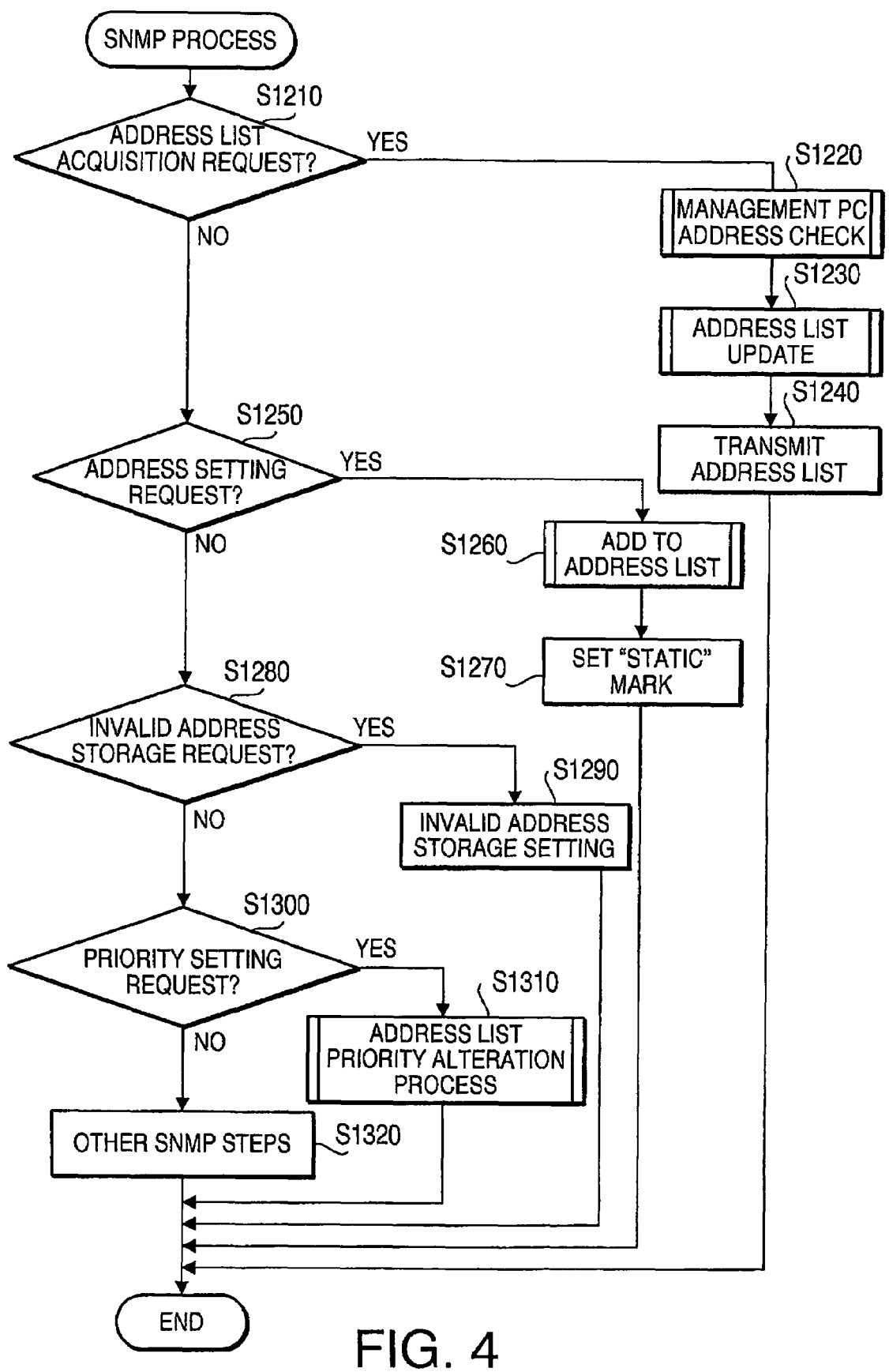
FIG. 4 is a flow chart showing an SNMP process executed by each device in the network system in accordance with illustrative aspects of the invention.

After the management PC address check process of FIG. 5 is finished (i.e. after S1220 of FIG. 4 is finished), the printer 2 executes an address list update process (S1230). The details of the address list update process of S1230 are shown in FIG. 6.

Figure 6:
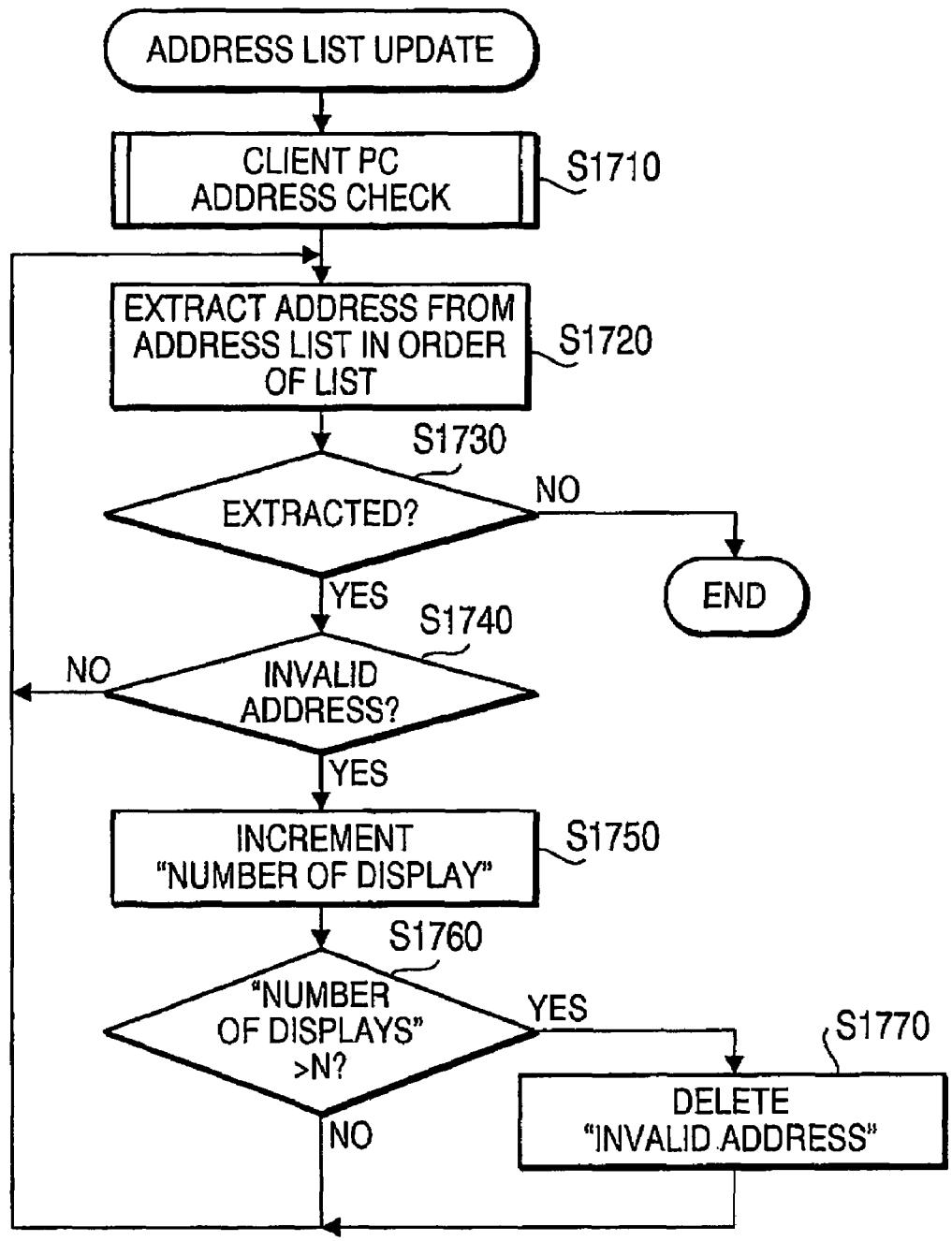
FIG. 6 is a flow chart showing an address list update process executed by each device in the network system in accordance with illustrative aspects of the invention.
Figure 7:
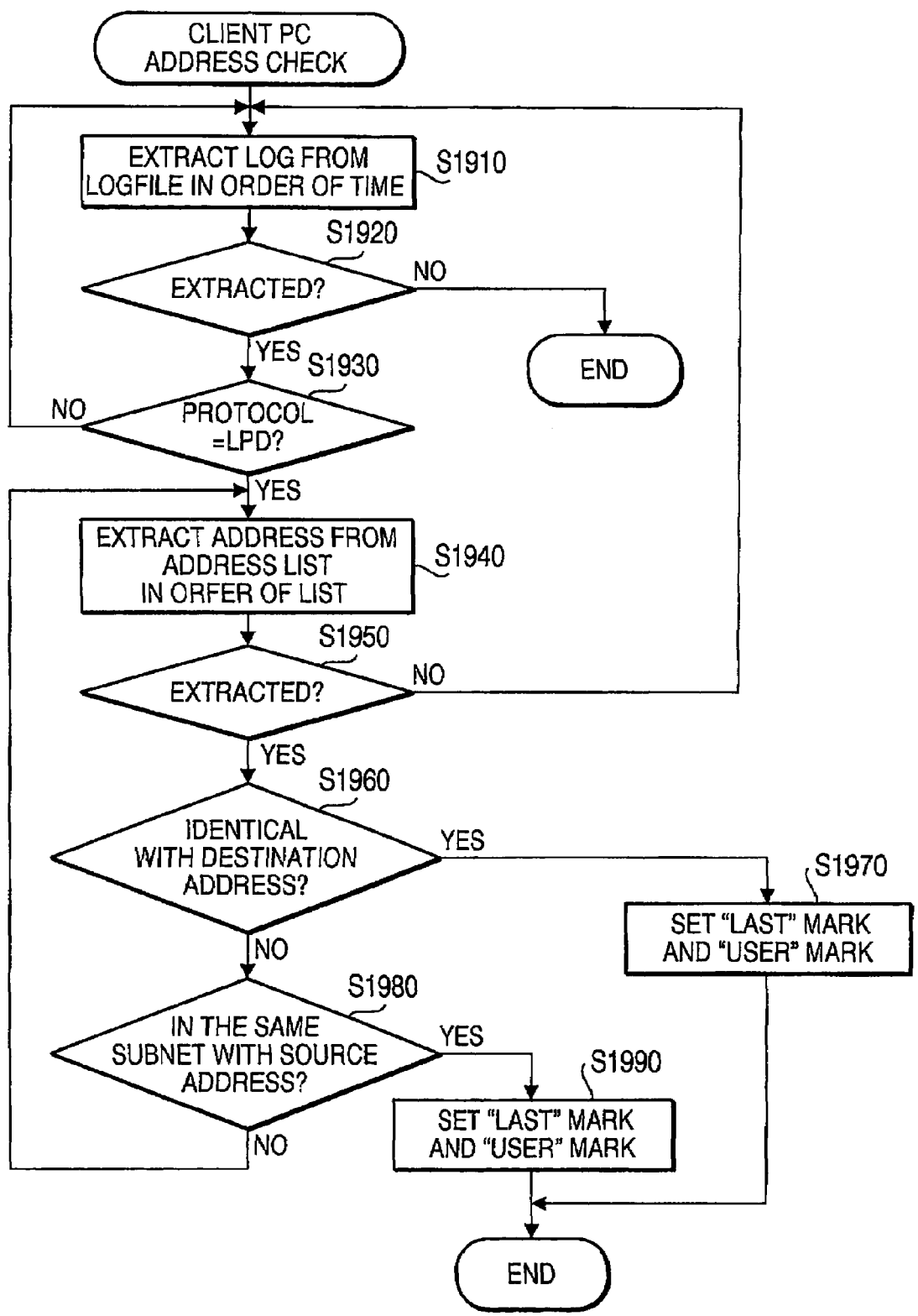
FIG. 7 is a flow chart showing a client PC address check process executed by each device in the network system in accordance with illustrative aspects of the invention.

Referring to FIG. 6, the printer 2 first executes a client PC address check process (S1710). The details of the client PC address check process are shown in FIG. 7. At the start of the client PC address check process, the printer 2 extracts a log from a log file in order of time (starting from the newest one) (S1910). The logs have been kept in the log file stored in a nonvolatile memory of the printer 2. On each occurrence of a prescribed event (e.g. reception of a packet), the printer 2 records a log (indicating the date/time of the event, the contents of the event, etc.) in the access log (log file).

Since the access log generally contains at least one log already recorded, a log is extracted successfully in S1910 in most cases. In this case (S1920: YES), whether the extracted log indicates the use of an LPD protocol is judged (S1930). The printer 2 (usually waiting for the arrival of a print request using the LPD protocol) records the use of the LPD protocol in a log when a print request is received from the client PC 8.

If the extracted log does not indicate the use of the LPD protocol (S1930: NO), the process returns to S1910 and thereafter the loop (S1910-S1930) is repeated until S1930 results in "YES". When no log can be extracted from the log file in S1910 after the repeated extraction of logs (S1920: NO), the client PC address check process of FIG. 7 is ended.

On the other hand, if the extracted log is judged to indicate the use of the LPD protocol (S1930: YES), the process exits from the loop of S1910-S1930. Subsequently, the printer 2 extracts a piece (line) of address information from its own address list (see FIG. 2) in the order of the list (from the high priority side of the address list) (S1940) and thereafter judges whether a piece of address information has been successfully extracted (S1950). The judgment of the step S1950 results in "YES" at least once since at least one address has been assigned to the printer 2. In this case (S1950: YES), whether the IP address in the address information extracted in S1940 is identical with the destination address of the received packet using the LPD protocol is checked (S1960).

If the addresses are identical with each other (S1960: YES), the "Last" mark and the "User" mark (see FIG. 2) are set in a part of the address list corresponding to the address information extracted in S1940 so as to update the address list of the printer 2 (S1970).

If the addresses are not identical with each other (S1960: NO), the printer 2 checks whether the IP address in the address information extracted in S1940 and the source address of the received packet using the LPD protocol are in the same subnet (S1980). Since the prefix length is 64 in IPv6 for ordinary terminal devices, the addresses may be judged to be in the same subnet if the first 64 bits of one address are identical with those of the other address. In IPv4 in which a subnet mask has been set, the comparison is made after masking the addresses with the subnet mask.

If the addresses are in the same subnet (S1980: YES), the "Last" mark and the "User" mark (see FIG. 2) are set in a part of the address list corresponding to the address information extracted in S1940 so as to update the address list of the printer 2 (S1990).

After the setting of the "Last" mark and the "User" mark in S1970 or S1990, the client PC address check process of FIG. 7 is ended. On the other hand, if the addresses are not judged to be in the same subnet (S1980: NO), the process returns to S1940 and thereafter the loop of S1940-S1980 is repeated until the judgment of S1950 results in "NO". By the repetition, the lines (pieces) of address information contained in the address list are successively processed in the order of the list (from the high priority side of the address list). During the repetition, when the judgment of S1960 or S1980 becomes "YES", the "Last" mark and the "User" mark are set (S1970 or S1990) as explained above. If the judgments of S1960 and S1980 remain "NO", it eventually becomes impossible to further extract address information from the address list (S1950: NO) at the point when S1940 is executed after the last piece (line) of address information in the address list is processed. In this case, the process returns to S1910. Thereafter, the process from S1910 is repeated for the next log in the log file.

As above, the client PC address check process of FIG. 7 is a process for extracting an address that was used by the client PC 8 for access to the printer 2 from the access log and adding the "Last" mark and the "User" mark to a related part of the address list. Incidentally, for the addition of the "Last" mark, it is actually necessary (although not shown in FIG. 7) to scan the whole address list and delete all the already-added "Last" marks before the start of the client PC address check process. While the printer 2 checks for the LPD protocol as a printing protocol existing in the access log in the above example (in order to find the last access from the client PC 8), it is also possible to let the printer 2 check for all the protocols (let the judgment of S1930 be always "YES"). In this case, the address comparison is made regardless of the protocol of the received packet, by which an address used in the last access (last packet) to the printer 2 is marked irrespective of the source of the access (possible sources include the management PC 1).

After the client PC address check process of FIG. 7 is finished (i.e. after S1710 of FIG. 6 is finished), the printer 2 extracts a piece (line) of address information from its own address list (see FIG. 2) in the order of the list (from the high priority side of the address list) (S1720) and thereafter judges whether a piece of address information has been successfully extracted (S1730). The judgment of the step S1730 results in "YES" at least once since at least one address has been assigned to the printer 2. In this case (S1730: YES), the printer 2 judges whether the IP address in the extracted address information is an invalid address (S1740). An "invalid address" means an address whose term of validity has expired. The term of validity is set to each automatically set address when the automatically set address is assigned to the printer 2.

If the IP address in the extracted address information is judged to be an invalid address (S1740: YES), the "NUMBER OF DISPLAYS" in the address information is incremented by 1 (S1750). When the incremented "NUMBER OF DISPLAYS" exceeds a prescribed number of times N (S1760: YES), the address information corresponding to the invalid address is deleted from the address list (S1770). In the steps S1750-S1770, while the address information corresponding to the invalid address is not deleted from the address list until the invalid address is displayed the prescribed number of times (N times), the address information is deleted when the invalid address has been displayed N times. Incidentally, while the printer 2 increments the "NUMBER OF DISPLAYS" (in each piece of address information in the address list corresponding to each invalid address) by one in response to the arrival of one address list acquisition request from the management PC 1 (assuming that each invalid address in the address list will actually be displayed by the management PC 1 once) in this illustrative embodiment, the printer 2 does not know whether the management PC 1 actually displays each invalid address.

After S1770 is finished or when the judgment of S1740 or S1760 is "NO", the process returns to S1720. Thereafter, the loop between S1720 and S1770 is repeated until the judgment of S1730 results in "NO". By the repetition, the lines of address information contained in the address list are successively processed in the order of the list (from the high priority side of the address list). When S1720 is executed after the last piece (line) of address information in the address list is processed, no address information can be extracted further (S1730: NO). In this case, the address list update process of FIG. 6 is ended.

After the check on access from the client PC (the client PC address check process) and the check on the number of displays of each invalid address are finished in the address list update process of FIG. 6 (i.e. after S1230 of FIG. 4 is finished), the printer 2 transmits the address list to the management PC 1 (S1240) and ends the SNMP process of FIG. 4.

In S1210 of the SNMP process of FIG. 4, if the received packet is not judged to be an address list acquisition request (S1210: NO), the printer 2 judges whether the received packet is an address setting request (S1250). The address setting request is an SNMP packet which is transmitted by the management PC 1 to the printer 2 when the management PC 1 needs to assign a new address to the printer 2.

If the received packet is judged to be an address setting request (S1250: YES), the printer 2 executes a process for adding the new address to the address list (S1260). The details of the process of S1260 are shown in FIG. 8.

Figure 8:
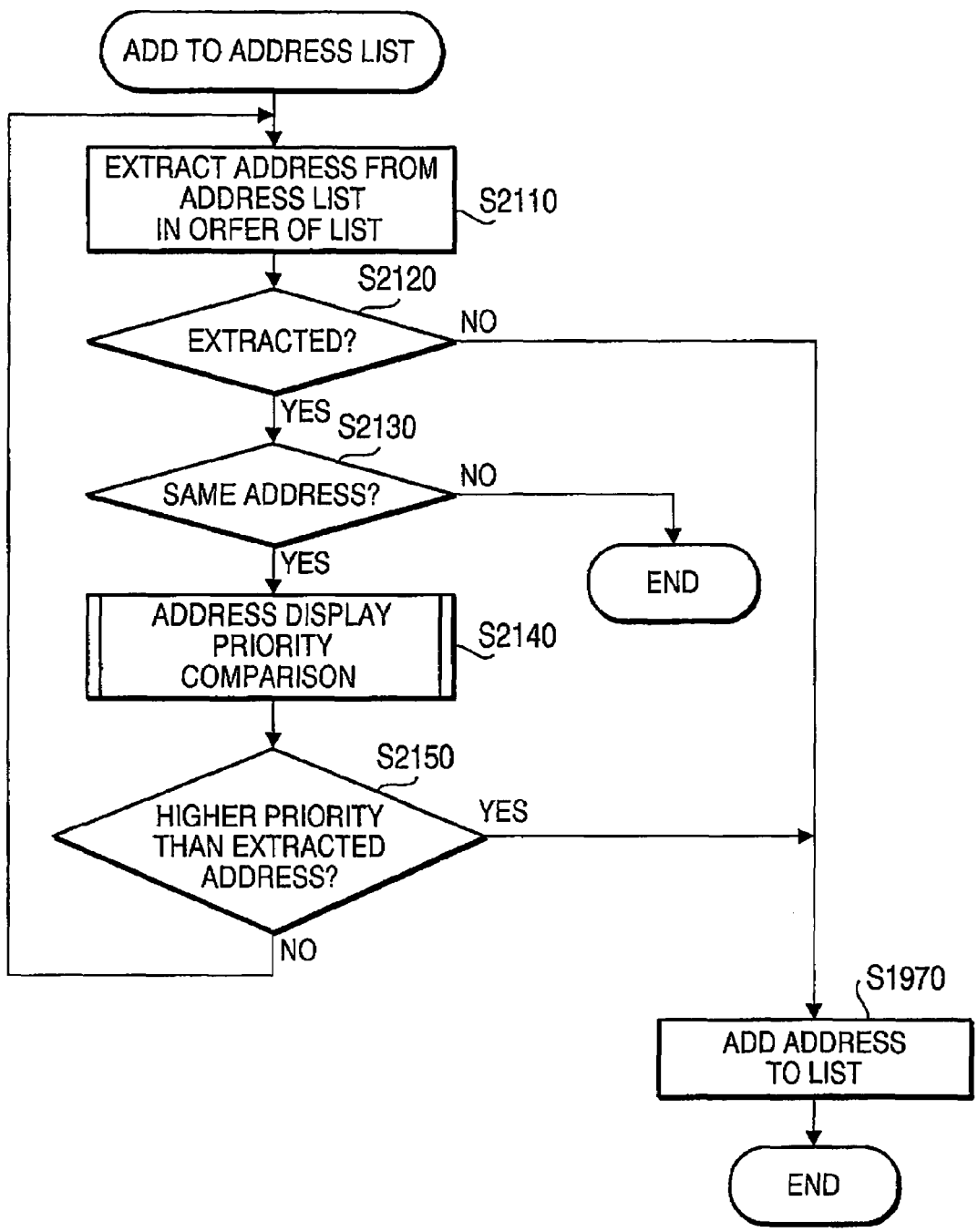
FIG. 8 is a flow chart showing a process for adding a new address to the address list executed by each device in the network system in accordance with illustrative aspects of the invention.

Referring to FIG. 8, the printer 2 extracts a piece of address information from its own address list (see FIG. 2) in the order of the list (from the high priority side of the address list) (S2110) and thereafter judges whether a piece of address information has been successfully extracted (S2120). The judgment of the step S2120 results in "YES" at least once since at least one address has been assigned to the printer 2. In this case (S2120: YES), whether the IP address in the address information extracted in S2110 is identical with an address specified by the address setting request (to be added to the address list) is checked (S2130).

If the addresses are identical with each other (S2130: YES), the process of FIG. 8 is ended since it is unnecessary to add the address specified by the address setting request (already existing in the address list) to the address list.

If the addresses are not identical with each other (S2130: NO), a comparison of address display priority is made between the two different addresses (S2140). The details of the priority comparison process of S2140 are shown in FIG. 9.

Figure 9:
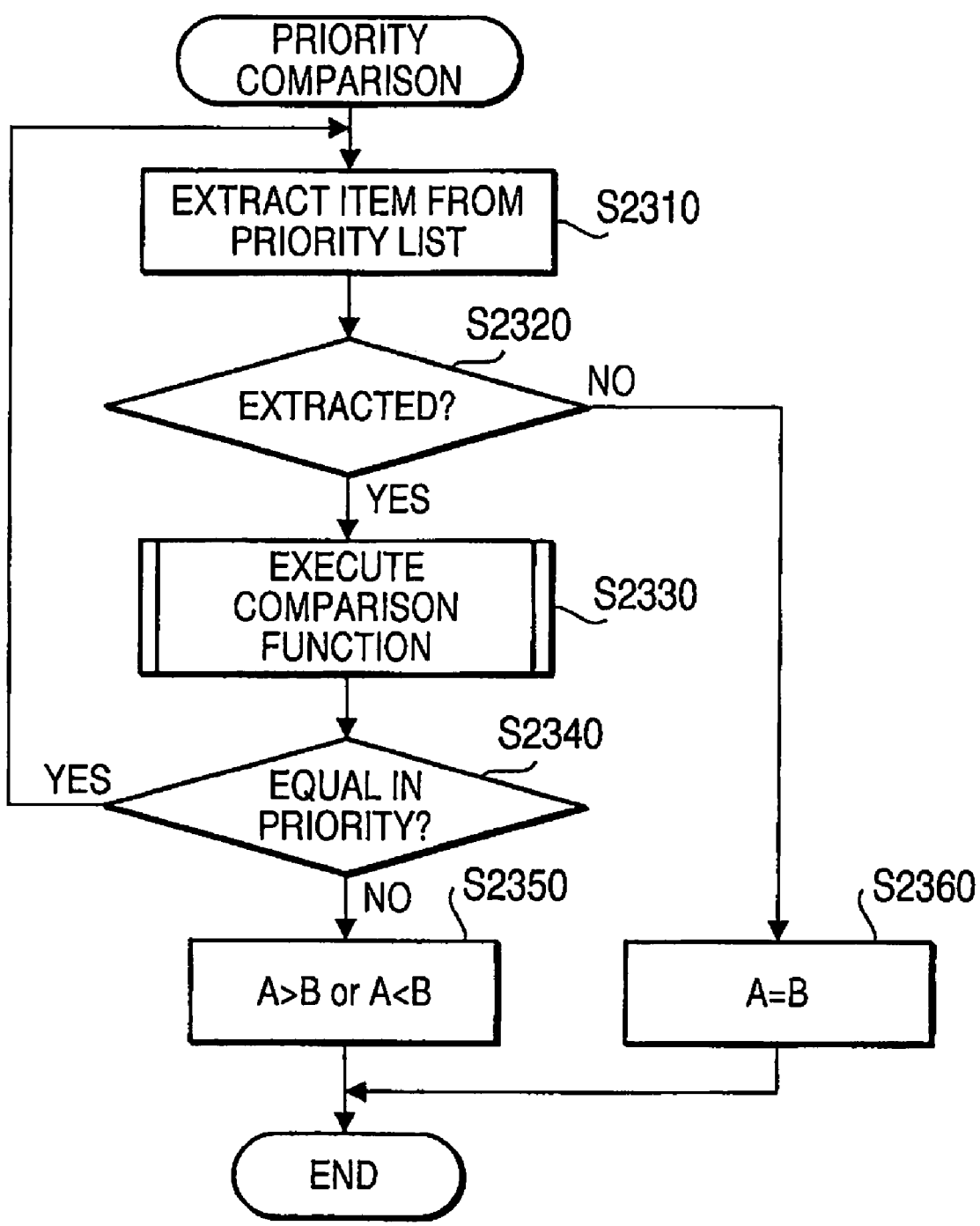
FIG. 9 is a flow chart showing an address display priority comparison process executed by each device in the network system in accordance with aspects of the invention.

Referring to FIG. 9, the printer 2 extracts an item from a priority list (S2310). The priority list is a table like the ones shown in FIGS. 10A-10D. One of the four types of lists has been stored in the nonvolatile memory of the printer 2. While the difference among the four types of lists, selection of a type from the four types, and timing of the type selection will be explained in detail later, this explanation will be continued assuming that the priority list of FIG. 10A (prioritizing the global scope) has been set to the printer 2. In each priority list, three types of comparison functions (compare_scope( ), compare_method( ), and compare_lifetime( )) have been registered to be called up for the priority comparison, and indexes 1-3 have been assigned to the three types of comparison functions. In the step S2310, an item is extracted from the priority list in order of the index number.

Subsequently, the printer 2 judges whether an item has been successfully extracted from the priority list (S2320). Since each priority list in this illustrative embodiment necessarily contains three items that have been assigned the indexes 1-3, the judgment of the step S2320 results in "YES" at least three times. In this case (S2320: YES), the comparison function registered in the item extracted in S2310 is executed to the two addresses which have been judged to be not identical with each other in S2130 (S2330).

In the case where the priority list of FIG. 10A (prioritizing the global scope) has been set to the printer 2, the comparison function compare_scope( ) is executed first.

Each of the three types of comparison functions (compare_scope( ), compare_method( ), and compare_lifetime( )) judges which of the two addresses has higher priority based on priority order specified in the item of the priority list and outputs a return value indicating the result of judgment. In the case where the priority list of FIG. 10A has been set to the printer 2 and the comparison function compare_scope( ) is called up first, the priority judgment is made according to the priority order (Global, Local, Link-Local) specified in the item of the priority list.

Figure 11:
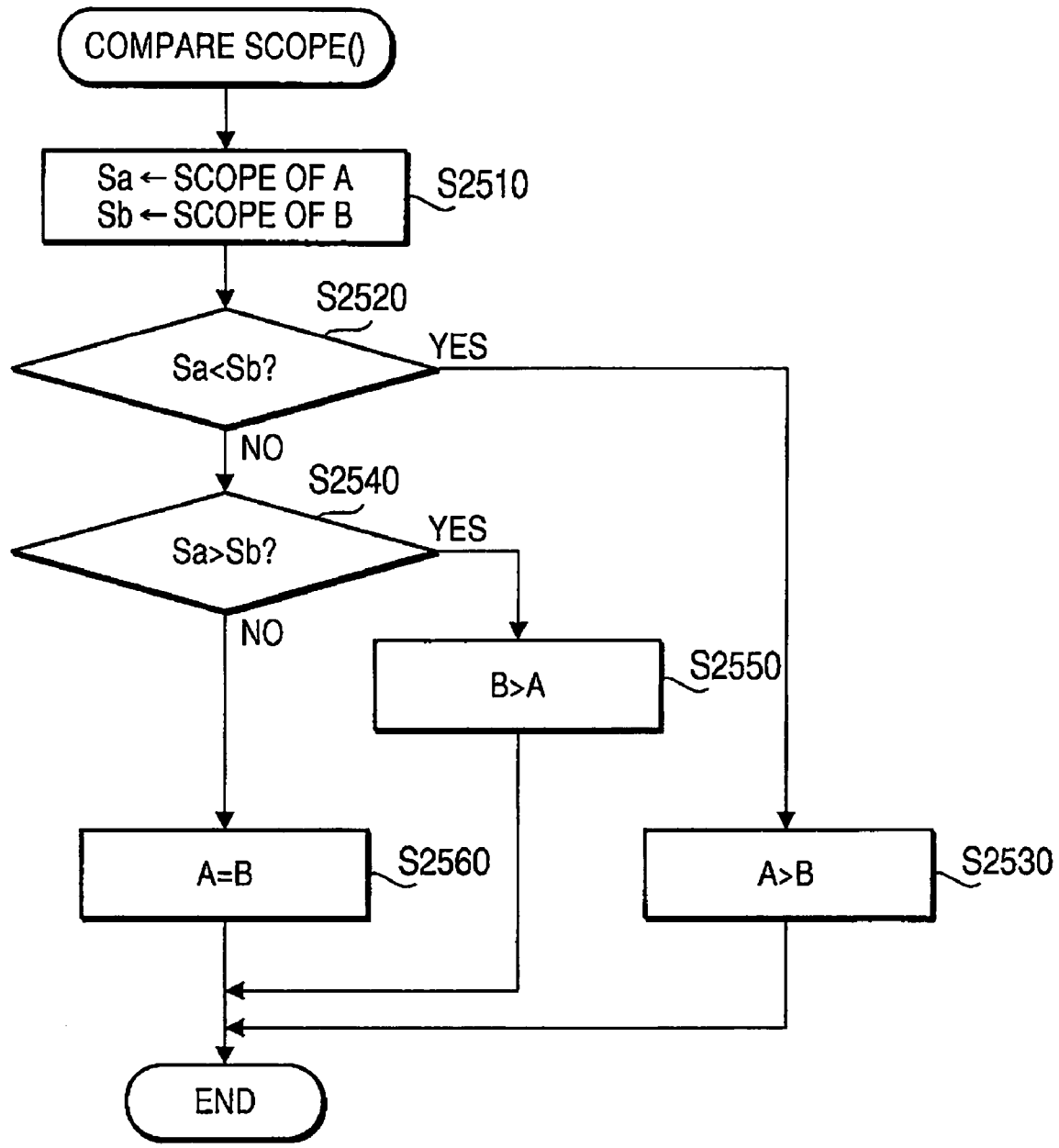
FIG. 11 is a flow chart showing a comparison function process executed by each device in the network system in accordance with illustrative aspects of the invention.

Specifically, the comparison function compare_scope( ) is executed as shown in FIG. 11, for example. When the priority judgment is made for two addresses A and B according to the priority order (Global, Local, Link-Local) specified in the item of the priority list, priority order Sa of the address A (1: Global, (2: Local, or (3: Link-Local) is obtained from the item of the priority list based on the scope of the address A, while priority order Sb of the address B ((1: Global, (2: Local, or (3: Link-Local) is obtained from the item of the priority list based on the scope of the address B (S2510). If Sa<Sb (S2520: YES), a return value indicating that the priority of the address A is higher than that of the address B (A>B) is outputted (S2530). If Sa>Sb (S2520: NO, S2540: YES), a return value indicating that the priority of the address B is higher than that of the address A (B>A) is outputted (S2550). If Sa=Sb (S2520: NO, S2540: NO), a return value indicating that the priority of the address A is equal to that of the address B (A=B) is outputted (S2560). For example, when the scope of the address A is "Global" (Sa=1) and that of the address B is "Link-Local" (Sb=3), the return value indicating that the priority of the address A is higher than that of the address B (A>B) is outputted.

After S2330 of FIG. 9 is finished, whether the two addresses are equal in priority is judged based on the return value of the comparison function (S2340). If the two addresses are judged to be unequal in priority (S2340: NO), the priority judgment (the priority of the address A is higher than that of the address B (A>B), or the priority of the address B is higher than that of the address A (B>A)) is finalized (S2350) and the priority comparison process of FIG. 9 is ended.

On the other hand, if the two addresses are judged to be equal in priority (S2340: YES), the priority judgment is not finalized immediately and the process returns to S2310, by which the loop of S2310-S2340 is repeated for the next item in the priority list.

In this illustrative embodiment, the loop of S2310-S2340 can be repeated three times at most as mentioned above. In the case where the priority list of FIG. 10A has been set to the printer 2, an item with the index "2" is extracted from the priority list in S2310 in the second execution of the loop, by which the comparison function compare_method( ) is executed and the priority judgment is made according to the priority order (Static, Stateful, Stateless) specified in the item of the priority list in S2330. In S2310 in the third execution of the loop, an item with the index "3" is extracted from the priority list, by which the comparison function compare_lifetime( ) is executed and the priority judgment is made according to the priority order (Preferred, Deprecated, Invalid) specified in the item of the priority list in S2330. Internal processing regarding each comparison function (compare_method( ), compare_lifetime( )) is equivalent to that regarding compare_scope( ) which has been explained above (see FIG. 11), and thus detailed explanation thereof is omitted here.

During the repetition of the loop of S2310-S2340 (three times at most), when the two addresses are judged to be unequal in priority in S2340 (S2340: NO), the priority judgment (the priority of the address A is higher than that of the address B (A>B), or the priority of the address B is higher than that of the address A (B>A)) is finalized (S2350) and the priority comparison process of FIG. 9 is ended as mentioned above. If the two addresses are judged to be equal in priority in S2340 (S2340: YES) in the third execution of the loop, the next S2310 can not further extract an item from the priority list and the judgment in S2320 results in "NO". In this case, the priority judgment (the addresses A and B are equal in priority (A=B)) is finalized (S2360) and the priority comparison process of FIG. 9 is ended.

As above, in the priority comparison process of FIG. 9, the comparison functions registered in the priority list are used in order of index. When the first comparison function judges that the two addresses are unequal in priority, the priority judgment is immediately regarded as the finalized judgment. Meanwhile, when the comparison function judges that the two addresses are equal in priority, the next comparison function is used according to the index order in the priority list. Only when all the comparison functions have judged that the two addresses are equal in priority (A=B), the priority judgment A=B is handled as the finalized judgment.

After the priority comparison process of FIG. 9 is finished (i.e. after S2140 of FIG. 8 is finished), the printer 2 judges whether the address specified by the address setting request (to be added to the address list) has higher priority than the IP address in the address information extracted in S2110 based on the priority judgment finalized in S2140 (S2150).

If the address specified by the address setting request is judged to have higher priority than the IP address in the address information extracted in S2110 (S2150: YES), new address information corresponding to the address specified by the address setting request is added to the address list (S2160) and the process of FIG. 8 is ended. In S2160, the new address information is added to a position immediately before (on the high priority side of) the address information extracted in S2110. The address information extracted in S2110 and subsequent address information are moved down (toward the low priority side) in the address list.

If the address specified by the address setting request is not judged to have higher priority than the IP address in the address information extracted in S2110 (S2150: NO), the process returns to S2110 and the loop from S2110 is repeated. By the repetition, pieces (lines) of address information are successively extracted from the address list in S2110 and when an address having lower priority than the address specified by the address setting request is found (S2150: YES), new address information corresponding to the address specified by the address setting request is inserted into the address list at the position of the address information containing the low priority address. During the repetition in which the pieces of address information in the address list are processed in the order of the list (from the high priority side of the address list), at the point when S2110 is executed after the last piece of address information in the address list is processed, no address information can be extracted further (S2120: NO). In this case, new address information corresponding to the address specified by the address setting request is added to the rear end of the address list (S2160) and the process of FIG. 8 is ended. In the above process, addresses having the same priority are arranged in the address list in order of address setting time (older addresses are placed at higher positions among the addresses having the same priority) since a newly set address is placed next to the other addresses having the same priority.

After the process of FIG. 8 is finished (i.e. after S1260 of FIG. 4 is finished), the printer 2 sets the "Static" mark (see FIG. 2) in the address information corresponding to the address specified by the address setting request (S1270) and ends the SNMP process of FIG. 4. Since the address added to the address list in the process of FIG. 8 (S1260) is an address specified by the SNMP packet (address setting request) sent from the management PC 1 (i.e. the aforementioned static address which is set manually by a user of the management PC 1), the "Static" mark is set in the address information in the step S1270.

On the other hand, if the received packet is not judged to be an address setting request in S1250 (S1250: NO), the printer 2 judges whether the received packet is an invalid address storage request (S1280). If the received packet is an invalid address storage request (S1280: YES), the printer 2 executes an invalid address storage setting (S1290) and ends the SNMP process of FIG. 4. The invalid address storage request is an SNMP packet which is transmitted by the management PC 1 to the printer 2 when a setting of the printer 2 regarding whether to store invalid addresses is changed by a process executed by the management PC 1 (explained later). In the invalid address storage setting of S1290, the setting regarding whether to store invalid addresses is registered in the MIB of the printer 2 as an invalid address storage flag.

If the received packet is not an invalid address storage request (S1280: NO), the printer 2 judges whether the received packet is a priority setting request (S1300). The priority setting request is an SNMP packet which is transmitted by the management PC 1 to the printer 2 when the priority setting is changed by a process executed by the management PC 1 (explained later). If the received packet is a priority setting request (S1300: YES), the printer 2 executes an address list priority alteration process (S1310). In the address list priority alteration process, the pieces of address information in the address list are sorted again according to the change of the priority setting. The details of the address list priority alteration process of S1310 are shown in FIG. 12.

Figure 12:
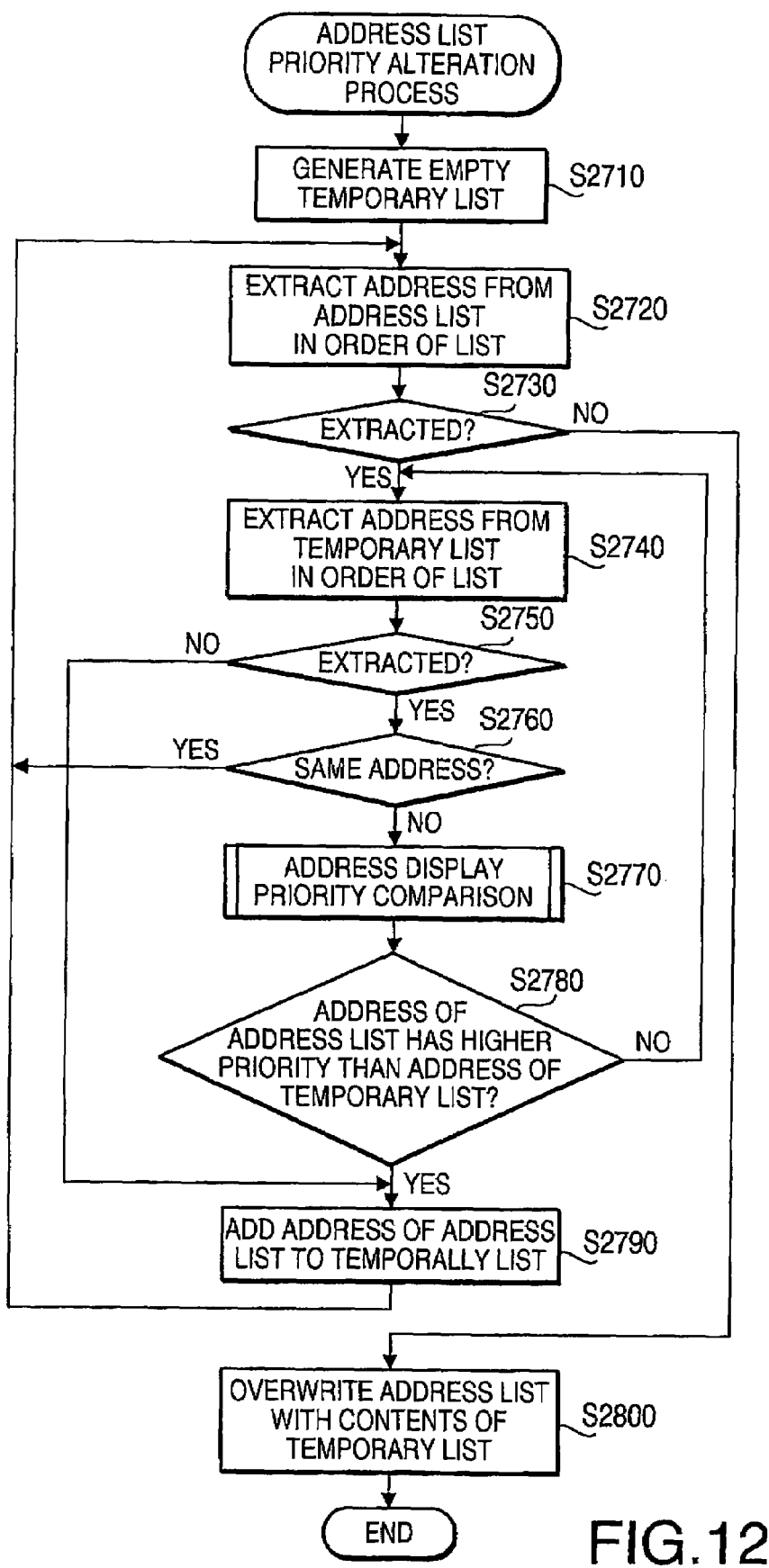
FIG. 12 is a flow chart showing an address list priority alteration process executed by each device in the network system in accordance with illustrative aspects of the invention.

Referring to FIG. 12, the printer 2 first generates an empty temporary list in order to generate the address list again (S2710). Subsequently, the printer 2 extracts a piece (line) of address information from its own address list (see FIG. 2) in the order of the list (from the high priority side of the address list) (S2720) and thereafter judges whether a piece of address information has been successfully extracted (S2730).

The judgment of the step S2730 results in "YES" at least once since at least one address has been assigned to the printer 2. In this case (S2730: YES), the printer 2 extracts a piece (line) of address information from the temporary list generated in S2710 in the order of the list (S2740) and thereafter judges whether a piece of address information has been successfully extracted (S2750). While the temporary list is capable of storing addresses (pieces of address information) in order of priority (address information having higher priority is placed higher) similarly to the address list, the temporary list is empty at the point when S2740 is executed for the first time. Therefore, the judgment of S2750 results in "NO" (S2750: NO) and the address information extracted from the address list in S2720 is added to the temporary list (S2790). Thereafter, the process returns to S2720 and the loop from S2720 is repeated for the next address information extracted from the address list.

During the repetition of the loop from S2720, at least a piece of address information can be extracted from the temporary list in the order of the list in S2740 since S2790 has already been executed at least once. In this case (S2750: YES), the printer 2 judges whether the address extracted from the address list in S2720 is identical with the address extracted from the temporary list in S2740 (S2760).

If the two addresses are identical with each other (S2760: YES), it means that two identical addresses have been registered in the address list (i.e. the same address has been registered twice in the address list) for some reason. In this case, the process returns to S2720 while skipping S2770-S2790, by which redundant address information is excluded from the temporary list.

If the addresses are not identical with each other (S2760: NO), a comparison of address display priority is made between the two different addresses (S2770). The priority comparison process of S2770 is totally equivalent to the priority comparison process of S2140 which has been explained above (details are shown in FIGS. 9 and 11), and thus detailed explanation thereof is omitted here.

After the priority comparison process of S2770 is finished, the printer 2 judges whether the address extracted from the address list in S2720 has higher priority than the address extracted from the temporary list in S2740 according to the priority judgment finalized in S2770 (S2780).

If the address extracted from the address list is judged to have higher priority than the address extracted from the temporary list (S2780: YES), the address information extracted from the address list in S2720 is added to the temporary list (S2790) and the process returns to S2720. On the other hand, if the address extracted from the address list is not judged to have higher priority than the address extracted from the temporary list (S2780: NO), the process returns to S2740 and the next address (address information) is extracted from the temporary list.

In the loop of S2720-S2790 described above, a piece of address information is extracted from the address list in the order of the list and pieces of address information which have been registered in the temporary list are scanned successively from the front end of the list. During the scan, when address information in the temporary list having lower priority than the address information extracted from the address list is found, the address information extracted from the address list is inserted into the temporary list at the position of the low priority address information (The low priority address information and subsequent address information in the temporary list are moved down toward the low priority side.). By the repetition of the loop of S2720-S2790, pieces of address information are registered in the temporary list while being sorted in the priority order. After all pieces of address information contained in the address list have been registered in the temporary list, the address list is overwritten with the contents of the temporary list (S2800), by which the address list priority alteration process of FIG. 12 is ended.

After the address list priority alteration process of FIG. 12 is finished (i.e. after S1310 of FIG. 4 is finished), the SNMP process of FIG. 4 is ended. Incidentally, when the received packet is not a priority setting request in S1300 (S1300: NO), other SNMP steps are executed (S1320) and thereafter the SNMP process of FIG. 4 is ended. While the "other SNMP steps" of S1320 can include various processes depending on the functions of the printer 2, detailed explanation of S1320 (not directly relevant to the principal part of the present invention) is omitted here.

3.1.2 RA Process

Next, the RA Process executed in the step S1040 of the first process of FIG. 3 will be explained referring to a flow chart of FIG. 13. At the start of the RA Process, the printer 2 checks whether "prefix option" has been set in the received packet (S3010).

If no prefix option has been set in the received packet (S3010: NO), the packet can at least be regarded as a packet irrelevant to address assignment; therefore, the printer 2 executes a regular RA process (S3020) and ends the RA Process of FIG. 13.

If the prefix option has been set in the received packet (S3010: YES), an address is generated by extracting a prefix from the packet (S3030) and address information corresponding to the generated address is added to the address list (S3040). The process of S3040 is totally equivalent to the process of S1260 which has been explained above (details are shown in FIGS. 8, 9 and 11), and thus detailed explanation thereof is omitted here. Incidentally, while the process of S3040 itself is equivalent to the process of S1260, the address added to the address list in S3040 is the aforementioned automatically set address differently from the address added to the address list in S1260 (static address).

After the process of S3040 is finished, a lifetime is set in the item "LIFETIME" of the address information which has been added to the address list in S3040 (S3050) and the "ELAPSED TIME" in the address information is reset to 0 (S3060). Thereafter, information regarding the execution of the above steps is recorded as a log (S3070) and the RA Process of FIG. 13 is ended.

Figure 13:
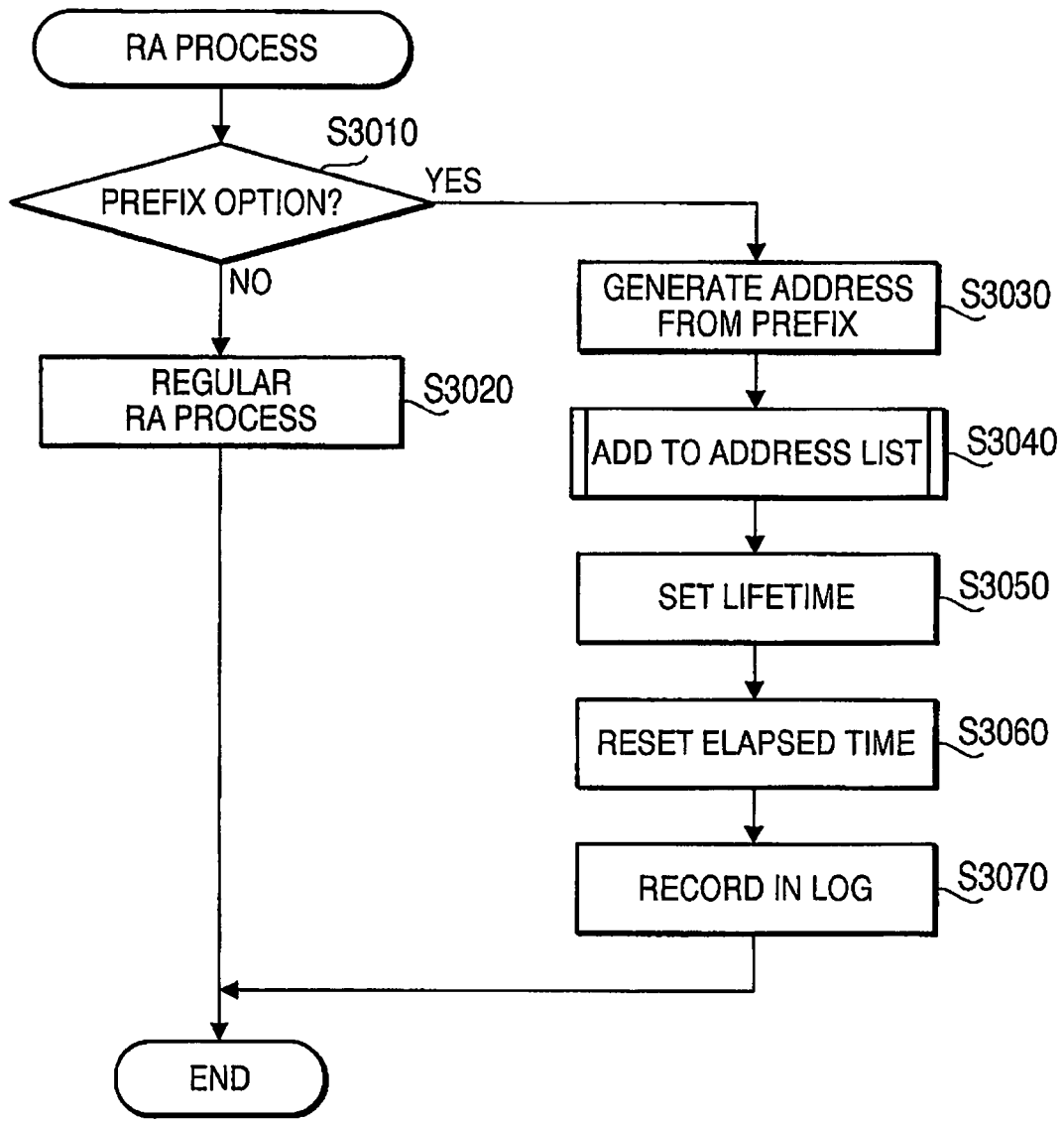
FIG. 13 is a flow chart showing an RA Process executed by each device in the network system in accordance with illustrative aspects of the invention.

Incidentally, although not shown in FIG. 13, when the address generated in S3030 has already been registered in the address list, the process of S3040 is skipped and the steps S3050 and S3060 are executed to the address information (corresponding to the address generated in S3030) already registered in the address list. In other words, the lifetime of the already-registered address is updated without adding a new address to the address list.

3.2 Second Process Executed by Each Device

Figure 14:
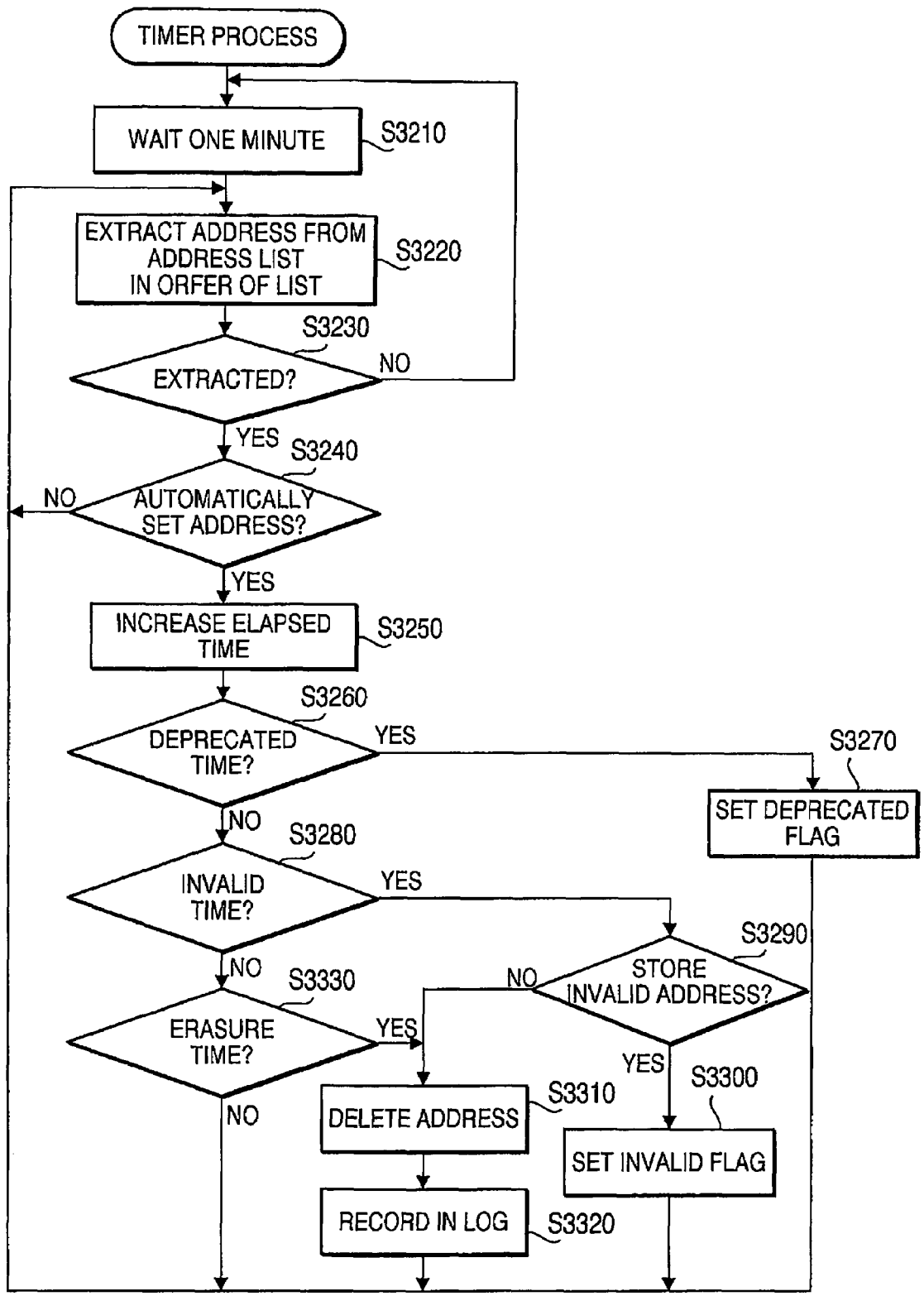
FIG. 14 is a flow chart showing a second process (timer process) executed by each device in the network system in accordance with illustrative aspects of the invention.

Next, the second process (timer process) executed by the printer 2 (each device) will be described referring to a flow chart of FIG. 14. The timer process is executed by the printer 2 periodically (approximately once a minute in this illustrative embodiment) so as to update address information in the address list corresponding to the automatically set addresses.

At the start of the second process (timer process), the printer 2 waits until a minute passes since the start of the previous timer process (S3210). When a minute has passed, the printer 2 extracts a piece (line) of address information from its own address list in the order of the list (from the high priority side of the address list) (S3220) and thereafter judges whether a piece of address information has been successfully extracted (S3230). The judgment of the step S3230 results in "YES" at least once since at least one address has been assigned to the printer 2. In this case (S3230: YES), the printer 2 judges whether the extracted address information is information on an automatically set address (S3240).

If the extracted address information is not judged to be information on an automatically set address (S3240: NO), the process returns to S3220 since the extracted address information is not the object of update by the timer process.

If the extracted address information is judged to be information on an automatically set address (S3240: YES), the printer 2 updates the address list by increasing the elapsed time (see FIG. 2) of the extracted address information by 1 minute (S3250) and judges whether the increased elapsed time is within a time range "deprecated time" (S3260). The "deprecated time" is the following time range defined in relation to the lifetime:

$$\tfrac{1}{2} \times \text{lifetime} \leq \text{deprecated time} < \text{lifetime}$$

If the elapsed time is judged to be within the time range "deprecated time" (S3260: YES), the "Deprecated" flag ("depr.") is set in the "FLAG" (see FIG. 2) of the extracted address information (S3270) and the process returns to S3220.

If the elapsed time is not judged to be within the time range "deprecated time" (S3260: NO), the printer 2 judges whether the elapsed time is within a time range "invalid time" (S3280). The "invalid time" is the following time range defined in relation to the lifetime:

$$\text{Lifetime} \leq \text{invalid time} < 2 \times \text{lifetime}$$

If the elapsed time is judged to be within the time range "invalid time" (S3280: YES), the printer 2 judges whether the setting regarding the storage of invalid addresses has been made so as to store invalid addresses (S3290). Whether to store invalid addresses has been set by use of the invalid address storage flag stored in the MIB of the printer 2 in the invalid address storage setting of S1290; therefore, the judgment of S3290 is made based on the invalid address storage flag stored in the MIB. If the setting has been made to store invalid addresses (S3290: YES), the "Invalid" flag ("inval.") is set in the "FLAG" (see FIG. 2) of the extracted address information (S3300) and the process returns to S3220. If the setting has not been made to store invalid addresses (S3290: NO), the extracted address information is deleted from the address list (S3310), information regarding the address deletion is recorded as a log (S3320) and the process returns to S3220.

If the elapsed time is not judged to be within the time range "invalid time" (S3280: NO), the printer 2 judges whether the elapsed time is within a time range "erasure time" (S3330). The "erasure time" is the following time range defined in relation to the lifetime:

$$2 \times \text{lifetime} \leq \text{erasure time}$$

If the elapsed time is within the time range "erasure time" (S3330: YES), the aforementioned steps S3310 and S3320 are executed and thereafter the process returns to S3220. If the elapsed time is not within the time range "erasure time" (S3330: NO), the process directly returns to S3220.

After returning to S3220 (when the judgment of S3240 or S3330 is "NO" or when S3270, S3300 or S3320 is finished), the printer 2 repeats the loop of S3220-S3330 until the judgment of S3230 results in "NO". By the repetition, the pieces (lines) of address information contained in the address list are successively processed in the order of the list. When S3220 is executed after the last piece (line) of address information in the address list is processed, no address information can be extracted further (S3230: NO). In this case, the process returns to S3210 and the printer 2 waits for the start of the next timer process.

By the timer process described above, the status of each address in the address list is constantly checked by monitoring the elapsed time of each address. Each address (address information) changes into "Deprecated" when half the lifetime has passed, and into "Invalid" when the lifetime has expired. When the invalid address storage setting (S1290) has not been made to store invalid addresses, each piece of address information is deleted from the address list at the point when it changes into "Invalid". Even when the invalid address storage setting (S1290) has been made, each piece of address information is automatically deleted from the address list at the point when the elapsed time exceeds twice the lifetime.

3.3 Third Process Executed by Each Device

Figure 15:
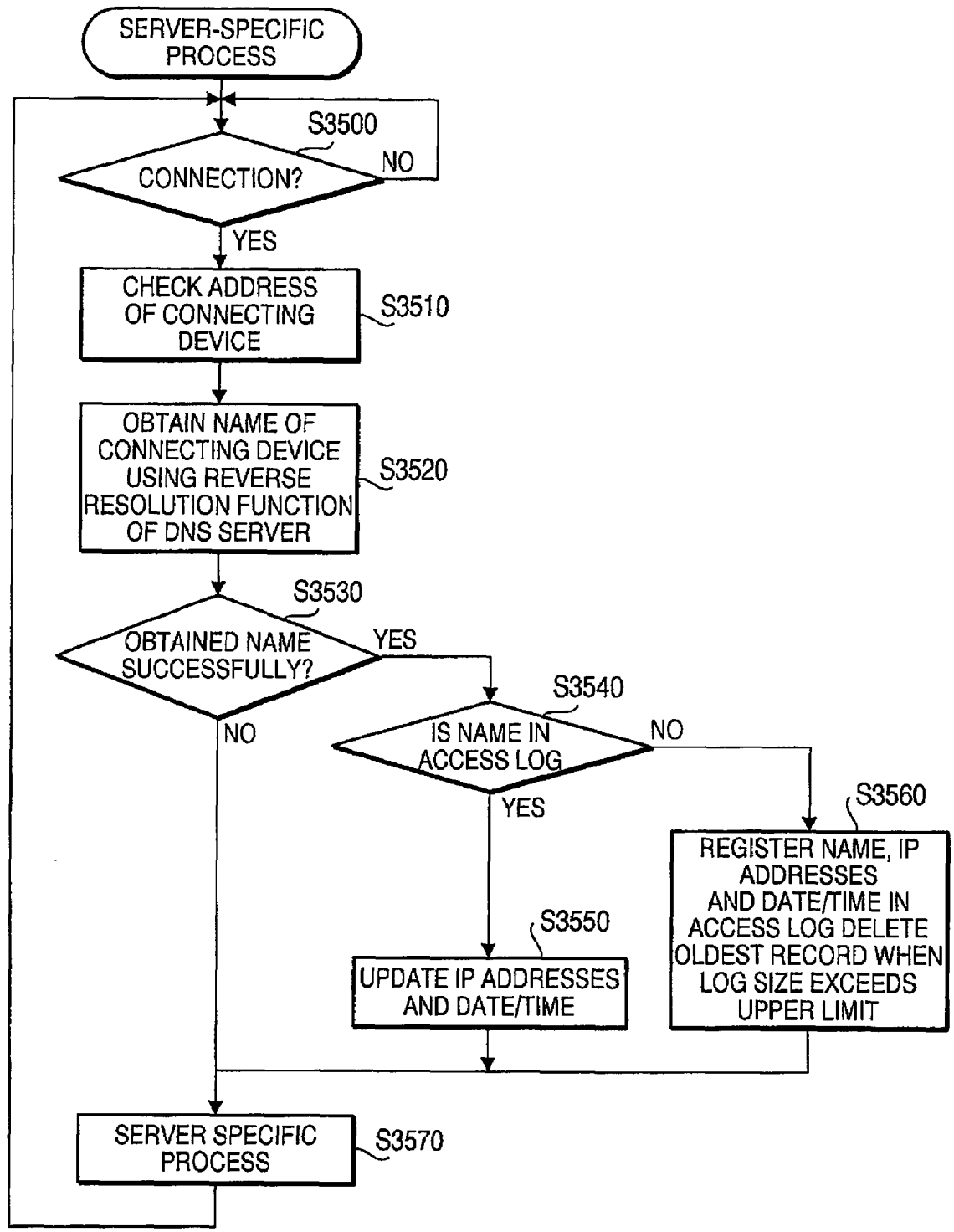
FIG. 15 is a flow chart showing a third process (server-specific process) executed by each device in the network system in accordance with illustrative aspects of the invention.

Next, the third process (server-specific process) executed by the printer 2 (each device) will be described referring to a flow chart of FIG. 15. The server-specific process is executed constantly by a server-specific function of the printer 2 as a background process (standby state). The substantial part of the process is executed when a request from a client PC is received.

At the start of the third process, the printer 2 judges whether a connection request from a client PC has been received (S3500). If no connection request has been received (S3500: NO), the judgment of S3500 is repeated until a connection request is received.

If a connection request from a client PC has been received (S3500: YES), the printer 2 checks the address of the client PC (hereinafter referred to as a "connecting device") (S3510) and obtains the name of the connecting device using a reverse resolution function (reverse search/retrieval function) of a DNS server (not shown) existing on the network (S3520).

When the name of the connecting device is obtained successfully (S3530: YES), the printer 2 checks whether the name has already been registered in the access log (S3540). The access log is a file in the format shown in FIG. 16, for example. In the access log, the name of each connecting device, a protocol used, the source IP address, the destination IP address, the date/time, etc. have been recorded.

If the name of the connecting device has already been registered in the access log (S3540: YES), the printer 2 updates the contents (the protocol, source IP address, destination IP address, date/time, etc.) of a corresponding entry (record) in the access log (S3550). On the other hand, if the name of the connecting device has not been registered in the access log yet (S3540: NO), the printer 2 registers a new record (containing the name of the connecting device, the protocol used, the source IP address, the destination IP address, the date/time, etc.) in the access log (S3560). In S3560, when the file size of the access log exceeds an upper limit due to the new registration, the oldest record in the access log is deleted so as to prevent the file size from exceeding the upper limit.

When the judgment of S3530 is "NO" or after S3550 (update of a record in the access log) or S3560 (new registration in the access log) is finished, a process specific to each server is executed (S3570) and thereafter the process from S3500 is repeated.

In the server-specific process described above, the server-specific function of the printer 2 executes a process corresponding to a request sent from a client PC while conducting the registration in the access log when the name of the client PC is obtained successfully, by which information such as the name of a client PC using the LPD protocol, a source IP address, a destination IP address and a date/time, for example, are registered in the access log. The access log is used in the aforementioned process of S1910-S1930, for example.

4 Process Executed by Management PC

Figure 17:
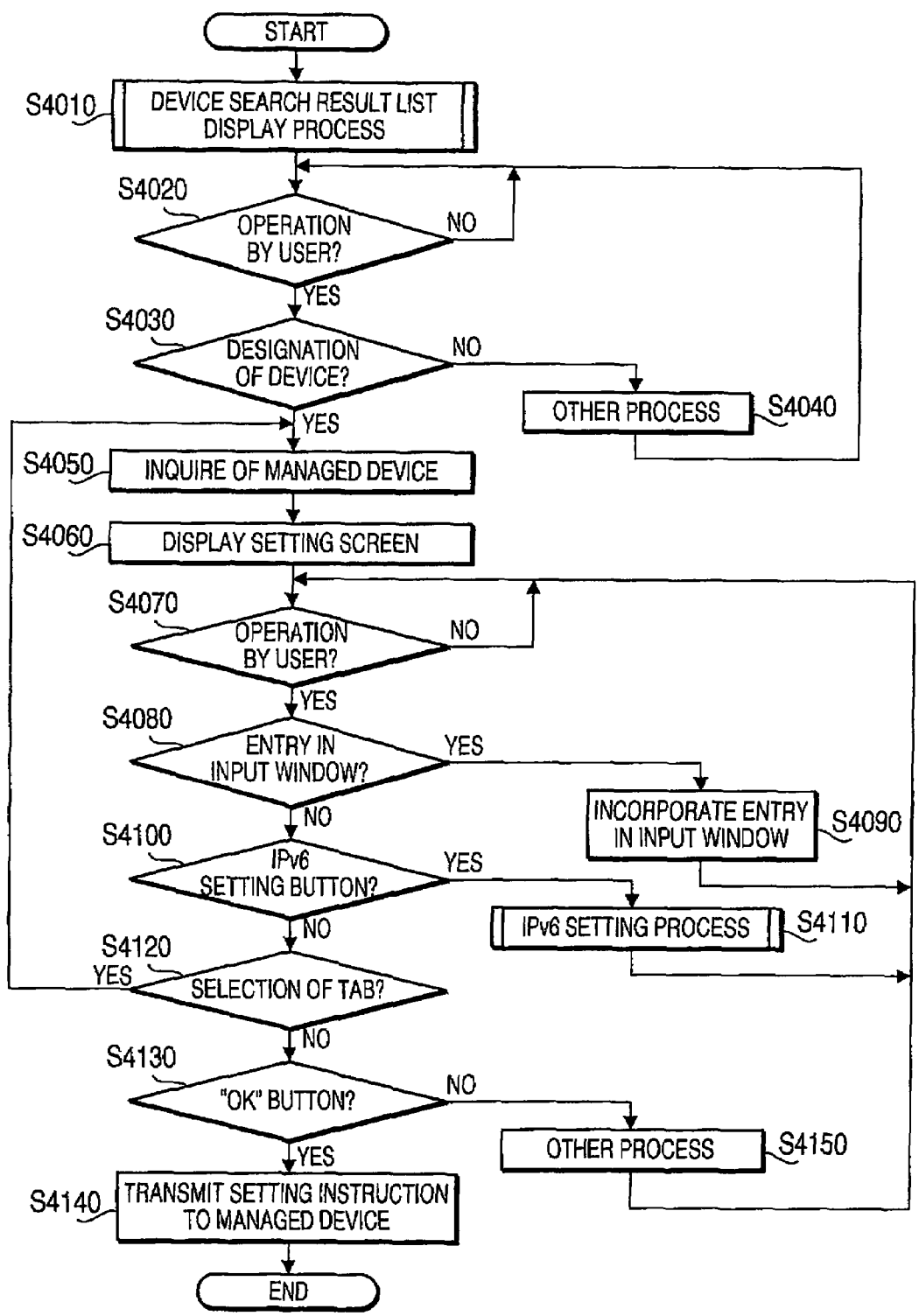
FIG. 17 is a flow chart showing the main flow of a process (device management tool) executed by a management PC in the network system in accordance with illustrative aspects of the invention.

In the following, an address information display process executed by the management PC 1 will be described in detail. The management PC 1 which executes the address information display process is the aforementioned first node functioning as the address information display device in accordance with aspects of the present invention. An address information display function of the management PC 1 (realized by the address information display process) is implemented as a part of a device management tool which is used for managing devices existing on the network (in this illustrative embodiment, printing devices such as printers and MFPs (Multi Function Peripheral) having the printer function). FIG. 17 is a flow chart showing a process executed when the device management tool is started up.

4.1 Main Flow of Device Management Tool

Figure 18:
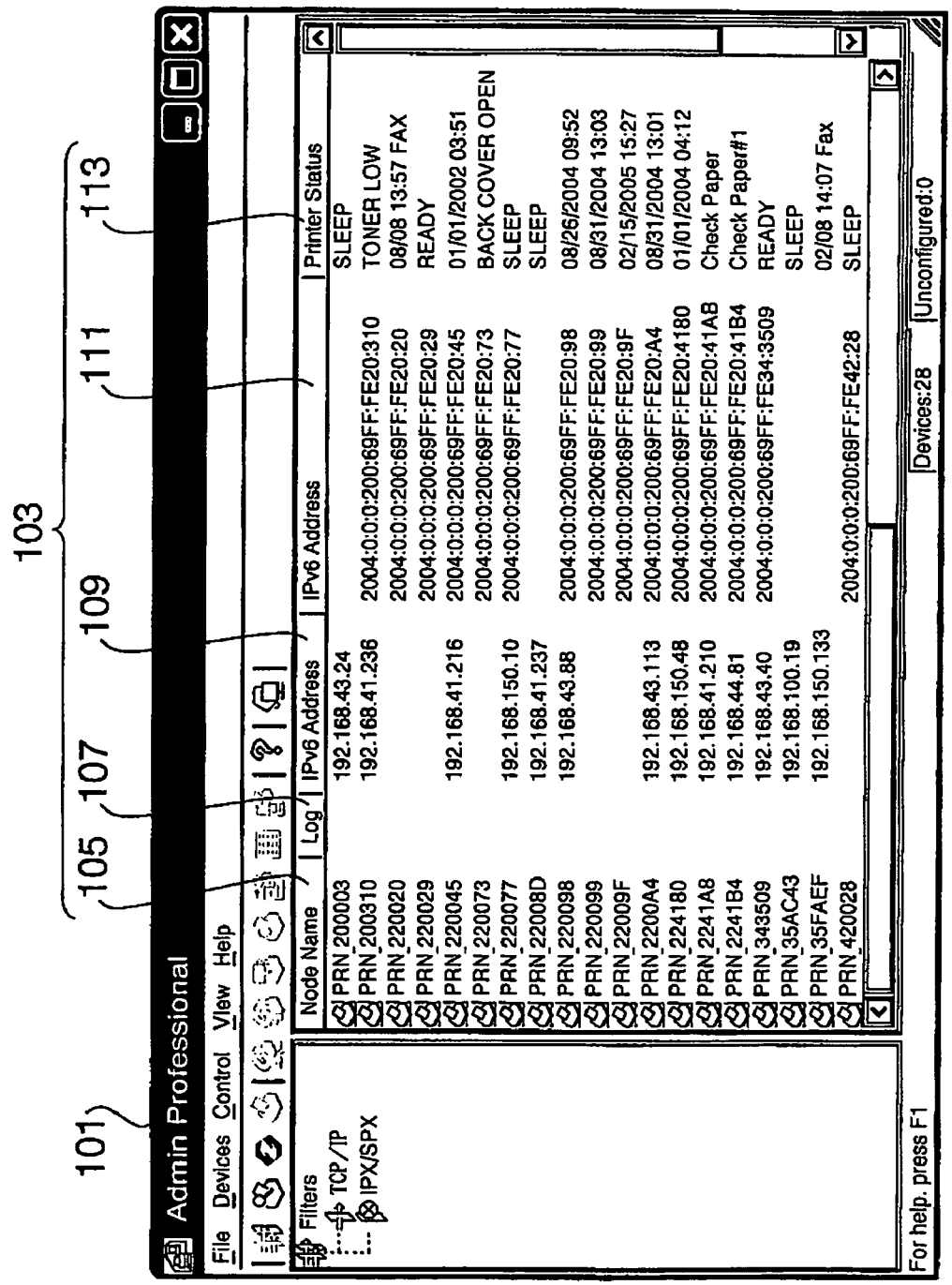
FIG. 18 is a screen image showing a device list display screen displayed by the management PC in accordance with illustrative aspects of the invention.

When the device management tool is activated by a user, the management PC 1 first searches for devices existing on the network and displays a list of the results of the search on its display unit (S4010). While the details of the list display process will be described later, by the step S4010, a device list display screen 101 like the one shown in FIG. 18 is displayed on the display unit of the management PC 1.

The device list display screen 101 has a device information display window 103 for displaying information on printers (devices) existing on the network. The device information display window 103 is partitioned into a node name display field 105, a log display field 107, an IPv4 address display field 109, an IPv6 address display field 111, a printer status display field 113, etc. so that a variety of information can be displayed.

After the displaying of such a device list display screen 101, the management PC 1 waits until its operation unit (keyboard, mouse, etc.) is operated by the user (S4020: NO).

When the operation unit is operated (S4020: YES), the management PC 1 judges whether the operation is one for designating a device (S4030). If the operation is designation of a device (S4030: YES), the management PC 1 inquires of the designated device (hereinafter referred to as a "managed device") its setting information (S4050). In this step, the management PC 1 transmits inquiry data to the managed device in order to inquire information corresponding to a subscreen of a setting screen (to be displayed in the following step S4060) and database registration information as the setting information on the managed device. The managed device receiving the inquiry data sends back setting data which indicates the setting information and the registration information. When information inquired by the inquiry data has not been set to the managed device, the managed device sends back setting data that can specify that the information has not been set (void parameter, etc.). On the other hand, if the operation by the user after the device list display screen 101 is displayed is not designation of a device (S4030: NO), a process corresponding to the operation (other process) is executed (S4040) and the process of FIG. 17 returns to S4020.

Based on the setting data from the managed device in response to the inquiry of S4050, the setting screen, used for setting parameters to the managed device (remote setup), is displayed on the display unit (S4060). The setting screen includes subscreens (with tabs) which are superposed on one another. By selecting a tab of one of the subscreens, the subscreen with the selected tab is displayed at the forefront (top) of the layered subscreens.

Figure 19:
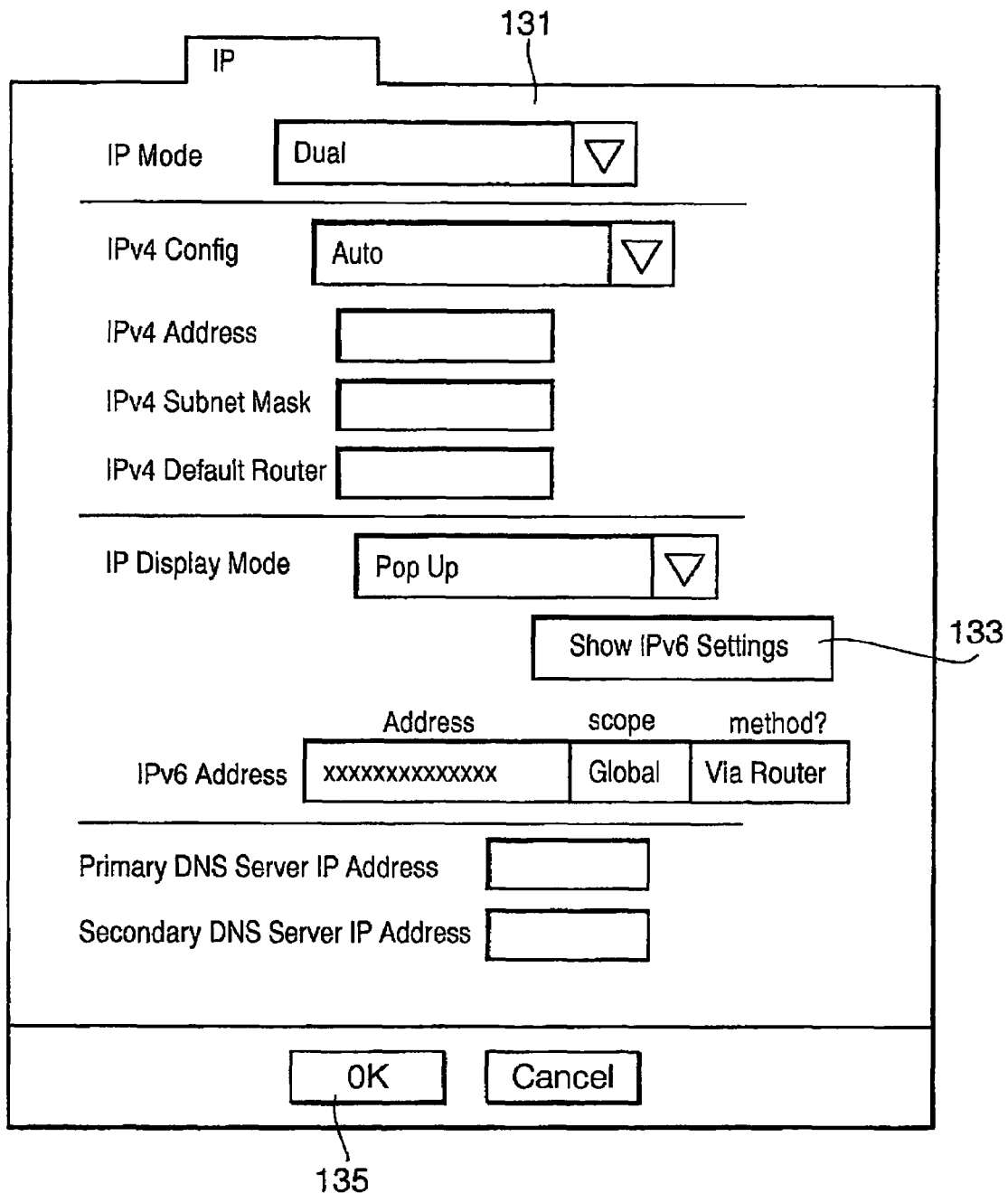
FIG. 19 is a schematic diagram showing an IP setting subscreen displayed by the management PC in accordance with illustrative aspects of the invention.

FIG. 19 shows an IP setting subscreen 131 which can be displayed by the management PC 1 as one of the subscreens of the setting screen. The IP setting subscreen 131 has various input windows, an IPv6 settings button 133, an OK button 135, etc.

After displaying the setting screen in S4060, the management PC 1 waits until the operation unit is operated by the user (S4070: NO).

When the operation unit is operated (S4070: YES), if the operation is an entry in an input window (S4080: YES), the entry is displayed (incorporated) in the input window (S4090) and the process returns to S4070.

If the operation by the user is the pressing of the IPv6 settings button 133 on the IP setting subscreen 131 shown in FIG. 19 (S4080: NO, S4100: YES), an "IPv6 setting process" (explained later) is executed (S4110) and the process returns to S4070.

If the operation by the user is the selection of a tab (i.e. switching of the subscreen displayed on the setting screen) (S4100: NO, S4120: YES), the process returns to S4050 and the management PC 1 inquires of the managed device setting information to be displayed on a subscreen corresponding to the selected tab (S4050) and displays again the setting screen (containing the subscreen corresponding to the selected tab) (S4060).

After the repetition of the loop of S4050-S4120, when the operation by the user in S4070 is the pressing of an OK button on one of the subscreens of the setting screen (S4120: NO, S4130: YES), the management PC 1 transmits setting instruction data (for instructing the managed device to set parameters which have been entered in the input windows of all the subscreens of the setting screen, excluding parameters designated in the "IPv6 setting process") to the managed device (S4140) and ends the process of FIG. 17. The managed device receiving the setting instruction data sets the parameters (or updates parameters which have been set) according to the setting instruction data.

Incidentally, when the operation by the user in S4070 is none of the above operations (S4120: NO, S4130: NO), a process corresponding to the operation (other process) is executed (S4150) and the process of FIG. 17 returns to S4070. While the process of FIG. 17 is designed to erase the setting screen and the device list display screen 101 and return to S4010 when a cancel button on any one of the subscreens of the setting screen is pressed, detailed explanation of the step is omitted here.

4.2 Device Search Result List Display Process

Figure 20:
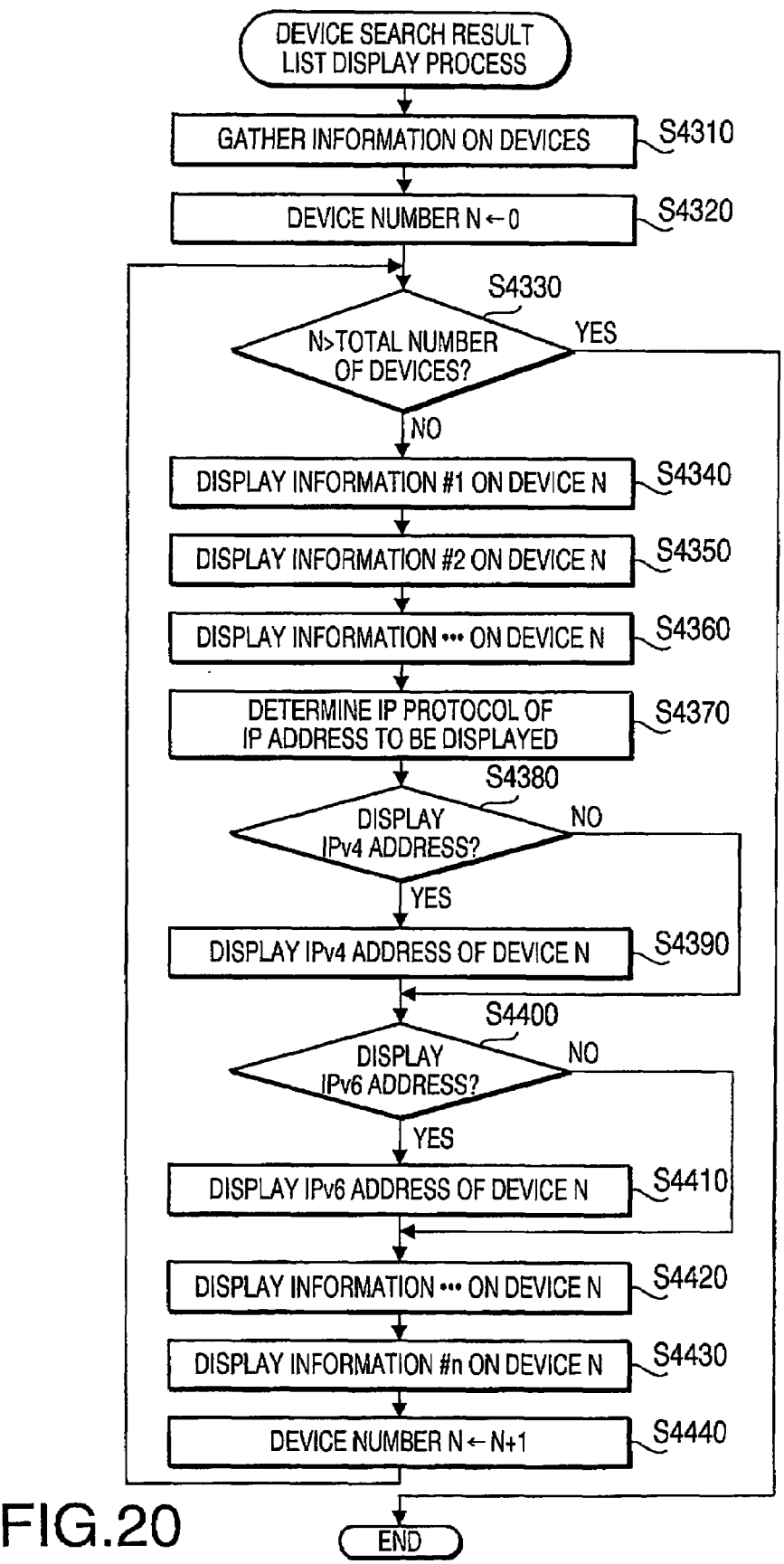
FIG. 20 is a flow chart showing a device search result list display process executed by the management PC in accordance with illustrative aspects of the invention.

Next, the details of the device search result list display process (S4010 of FIG. 17) will be described referring to a flow chart of FIG. 20.

At the start of the device search result list display process, the management PC 1 gathers information on devices existing on the network (S4310). Specifically, the management PC 1 transmits (broadcast & multicast) request packets (for requesting devices on the network to send back information) according to IPv4 and IPv6. Since each device capable of replying to the request packet returns a reply packet, the management PC 1 gathers information supplied from such devices for a while (e.g. several seconds) by successively receiving the reply packets from the devices.

Subsequently, the management PC 1 initializes a device number N (to be used as a counter in the following loop) to 0 (S4320) and judges whether the device number N has reached the total number of the devices (from which the information was obtained in S4310) (S4330).

The judgment of S4330 in the first execution of the loop (with the device number N =0) results in "NO" unless the total number of the devices from which the information was obtained in S4310 is 0.

In the case where the device number N is less than the total number of the devices (S4330: NO), the management PC 1 displays information (information #1, information #2 and subsequent information . . . (#3 and #4, for example), if any) on a device N (a device corresponding to the device number N) that should be displayed before (to the left of) the IP address (S4340-S4360). By the steps S4340-S4360, the information #1, #2 and . . . on one device (device N) is displayed or drawn in the device information display window 103 of the device list display screen 101. In the example of FIG. 18, all the information that should be displayed to the left of the IPv4 address display field 109 (information to be displayed in the node name display field 105 and the log display field 107) is displayed.

Subsequently, the management PC 1 determines the IP protocol (IPv4, IPv6 or both IPv4/IPv6 in this illustrative embodiment) of the IP address(es) to be displayed (S4370). For the step S4370, the management PC 1 has prepared a correspondence table shown in FIG. 21 containing nine cases (3 cases×3 cases) assuming three cases regarding the management PC 1 (where the management PC 1 supports IPv4 only, IPv6 only, and both IPv4 and IPv6) and three cases regarding the device N (where the device N supports IPv4 only, IPv6 only, and both IPv4 and IPv6). By referring to the correspondence table, the management PC 1 determines whether to display the IPv4 address only, the IPv6 address only, or both the IPv4 address and the IPv6 address based on the IP protocols supported by the management PC 1 and the device N.

In S4390, the IPv4 address of the device N is displayed if the management PC 1 has determined to display the IPv4 address in S4370 (S4380: YES). The step S4390 is skipped if the management PC 1 has determined not to display the IPv4 address in S4370 (S4380: NO). The step S4390 corresponds to the displaying of information in the IPv4 address display field 109 in the case of FIG. 18. In the example of FIG. 18, for a node at the top of the device information display window 103 (PRN__200003), an IPv4 address "192.168.43.24" has been displayed in the IPv4 address display field 109 by the step S4390. Meanwhile, for the third node in the device information display window 103 (PRN__200020), the step S4390 has been skipped and the IPv4 address display field 109 has been left blank.

In S4410, the IPv6 address (or one of the IPv6 addresses) of the device N is displayed if the management PC 1 has determined to display the IPv6 address in S4370 (S4400: YES). The step S4410 is skipped if the management PC 1 has determined not to display the IPv6 address in S4370 (S4400: NO). The step S4410 corresponds to the displaying of information in the IPv6 address display field 111 in the case of FIG. 18. In the example of FIG. 18, for the second node in the device information display window 103 (PRN__200310), an IPv6 address "2004:0:0:0:200:69FF:FE20:310" has been displayed in the IPv6 address display field 111 by the step S4410. Meanwhile, for the node at the top of the device information display window 103 (PRN__200003), the step S4110 has been skipped and the IPv6 address display field 111 has been left blank.

After finishing the displaying step S4410 regarding the IPv6 address display field 111, the management PC 1 displays information . . . (information #5 and #6, for example) and the last information #n (if any) on the device N that should be displayed after (to the right of) the IP address (S4420, S4430). By the steps S4420 and S4430, the information . . . and #n on one device (device N) is displayed or drawn in the device information display window 103 of the device list display screen 101. In the example of FIG. 18, all the information that should be displayed to the right of the IPv6 address display field 111 (information to be displayed in the printer status display field 113 and display fields to the right of the printer status display field 113 (which cannot be seen without scrolling the screen)) is displayed.

After finishing S4340-S4430, the device number N is incremented by 1 (S4440) and the process returns to S4330, by which the loop of S4330-S4440 is repeated for the total number of devices (from which the information was obtained in S4310). By the repetition, lines of information (one line for each device) are successively displayed in the device information display window 103 of the device list display screen 101 shown in FIG. 18 until all the lines corresponding to the total number of the devices are displayed. Thereafter, the process returns again to S4330, in which the judgment results in "YES" (S4330: YES) and the device search result list display process of FIG. 20 is ended.

Incidentally, an IPv6 device (e.g. the printer 2) can be assigned two or more IPv6 addresses and the addresses are stored in the address list of the printer 2 as mentioned above. The management PC 1 may either obtain one IPv6 address from the top of the address list of the printer 2 in S4310 or obtain the whole address list in S4310 and display one IPv6 address from the top of the obtained address list in S4410. Since addresses in the address list are arranged in the priority order as explained above, the one IPv6 address displayed in the IPv6 address display field 111 by the above process is one of the IPv6 addresses having the highest priority. Thus, even though only one IPv6 address is displayed for one device in the IPv6 address display field 111 of the device information display window 103, an address that is the most helpful to the user is displayed in the IPv6 address display field 111 with a high probability.

Further, since the priority can be set arbitrarily by the user in a process which will be described later, even when the priority has not been set properly, customization for letting the IPv6 address display field 111 display the address most helpful to the user is possible by changing the priority setting.

4.3 IPv6 Setting Process

Figure 22:
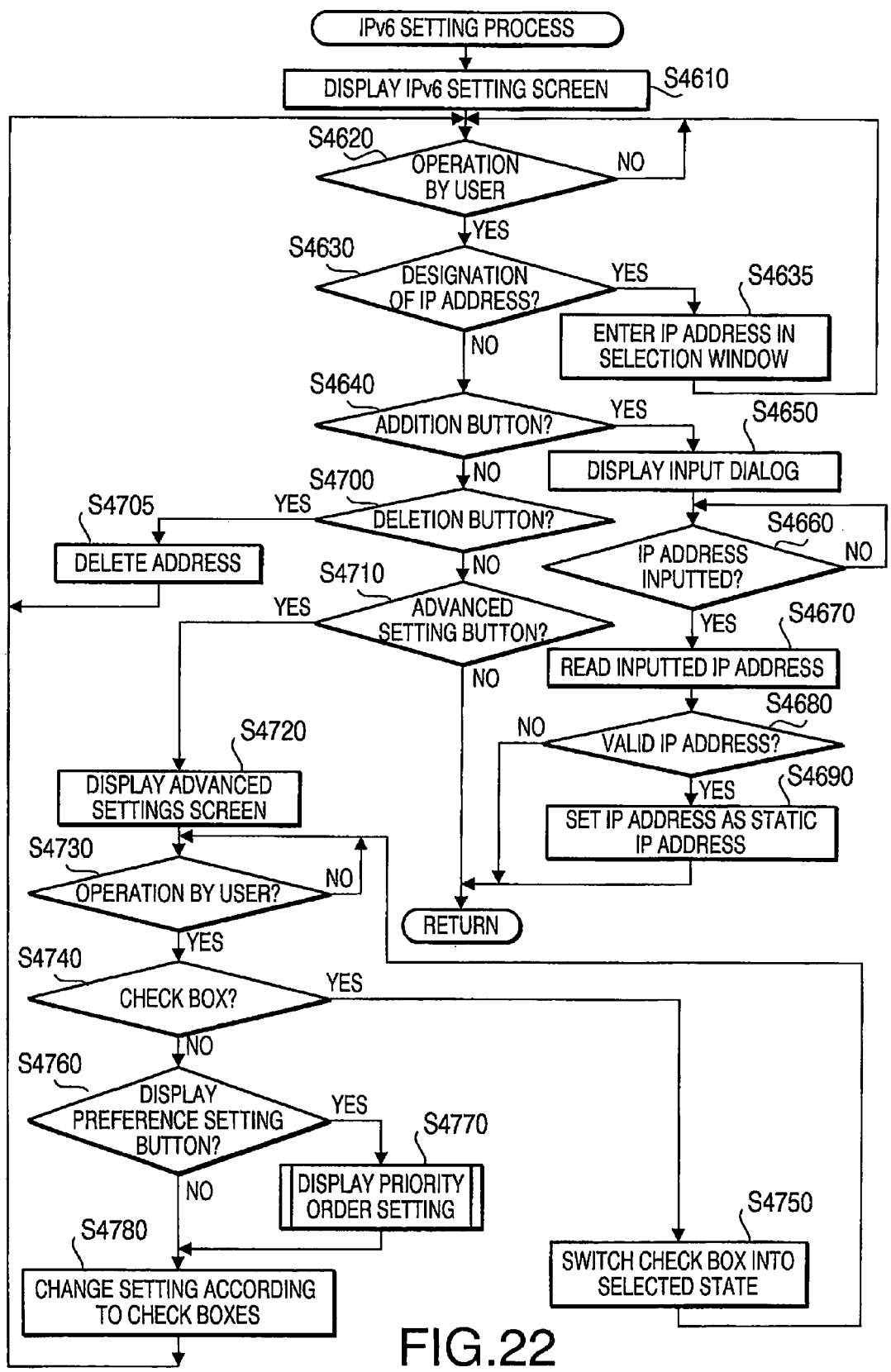
FIG. 22 is a flow chart showing an IPv6 setting process executed by the management PC in accordance with illustrative aspects of the invention.

Next, the aforementioned IPv6 setting process of S4110 (see FIG. 17) will be explained in detail referring to a flow chart of FIG. 22.

Figure 23:
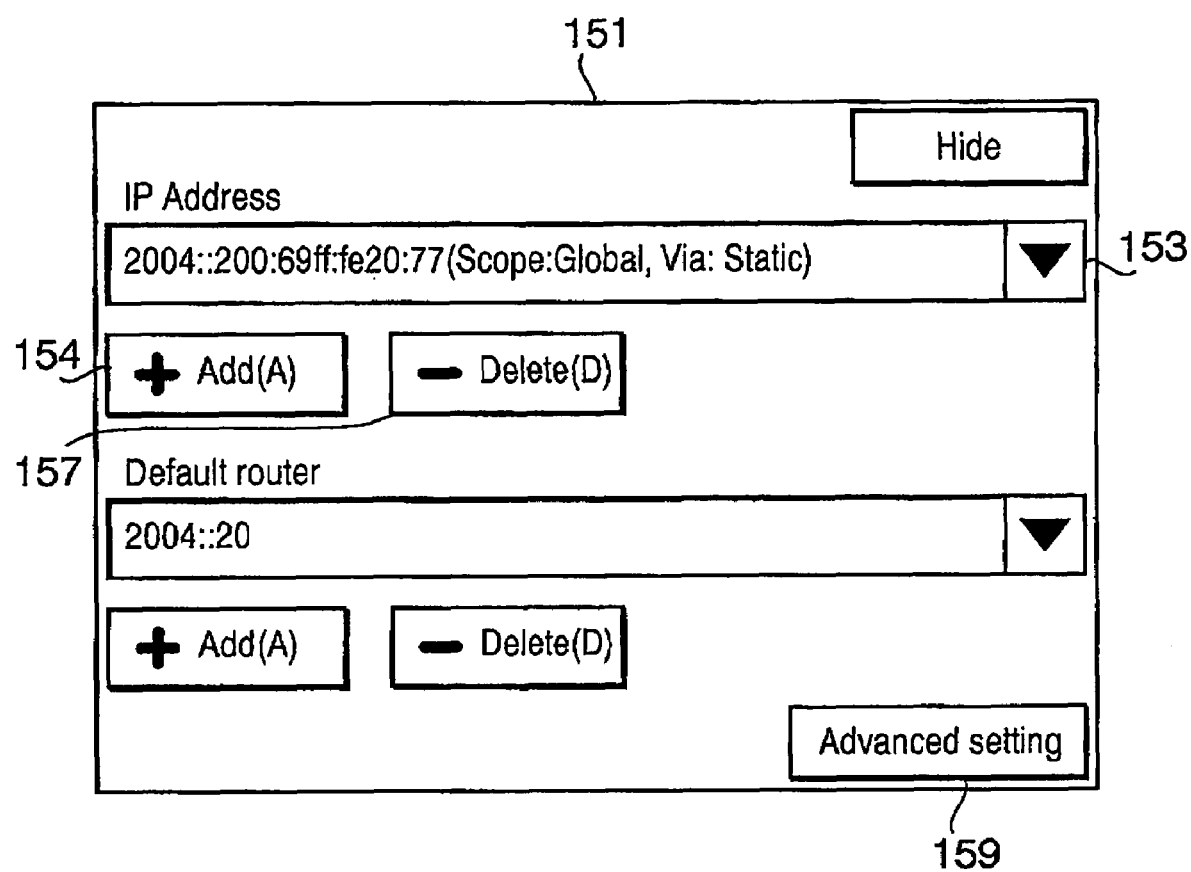
FIG. 23 is a screen image showing an IPv6 settings screen displayed by the management PC in accordance with illustrative aspects of the invention.

At the start of the IPv6 setting process, the management PC 1 displays an IPv6 settings screen 151 (see FIG. 23) on the display unit (S4610). As shown in FIG. 23, the IPv6 settings screen 151 has a selection window 153 (for displaying IPv6 addresses assigned to the managed device and letting the user select one of them), an addition button 155, a deletion button 157, an advanced settings button 159 (pressed for calling up an advanced settings screen 171 for making more detailed (advanced) settings), etc.

After displaying the IPv6 settings screen 151 on the display unit, the management PC 1 waits for an operation by the user (S4620: NO). When an operation is performed by the user (S4620: YES), if the operation is a designation of an IP address in the selection window 153 (S4630: YES), the designated IP address is entered in the selection window 153 (S4635) and the process returns to S4620.

If the operation by the user is the pressing of the addition button 155 (S4630: NO, S4640: YES), the management PC 1 displays an input dialog (requesting the user to input an IP address to be added) on the display unit (S4650) and waits until an IP address (a character string indicating an IP address) is inputted (S4660: NO). When an IP address is inputted (S4660: YES), the management PC 1 reads the inputted IP address (character string indicating an IP address) (S4670) and checks whether the IP address read in S4670 is a valid address (S4680). In this step, whether the character string read in S4670 is an appropriate IPv6 address or not is judged by checking whether the character string includes an improper character or not, whether the character string is made up of a proper number of characters or not, etc. If the IP address read in S4670 is judged to be invalid (S4680: NO), the IPv6 setting process of FIG. 22 is ended and the process returns to S4070 of FIG. 17. On the other hand, if the IP address is judged to be valid (S4680: YES), the management PC 1 instructs the managed device to set the IP address as a manually set address (static address) (S4690). Since each IP address is registered in the database (address list) of the managed device while associating the IP address with a setting function (method), in the step S4690, a setting request requesting the managed device to register the IP address read in S4670 associating the managed device with information specifying that the IP address has been set manually is transmitted to the managed device by use of SNMP. The managed device receiving the setting request updates information based on the setting request (S1260) as explained before, by which an IP address as a manually set address (static address) is assigned to the managed device.

If the operation by the user in S4620 is the pressing of the deletion button 157 (S4640: NO, S4700: YES), the IP address selected in the selection window 153 is deleted from the address list of the managed device (S4705). In this step, a setting request requesting the managed device to delete the IP address selected in the selection window 153 is transmitted by use of SNMP. The managed device receiving the setting request updates information based on the setting request as explained before, by which the IP address is deleted from the address list of the managed device (the address list is updated).

Figure 24:
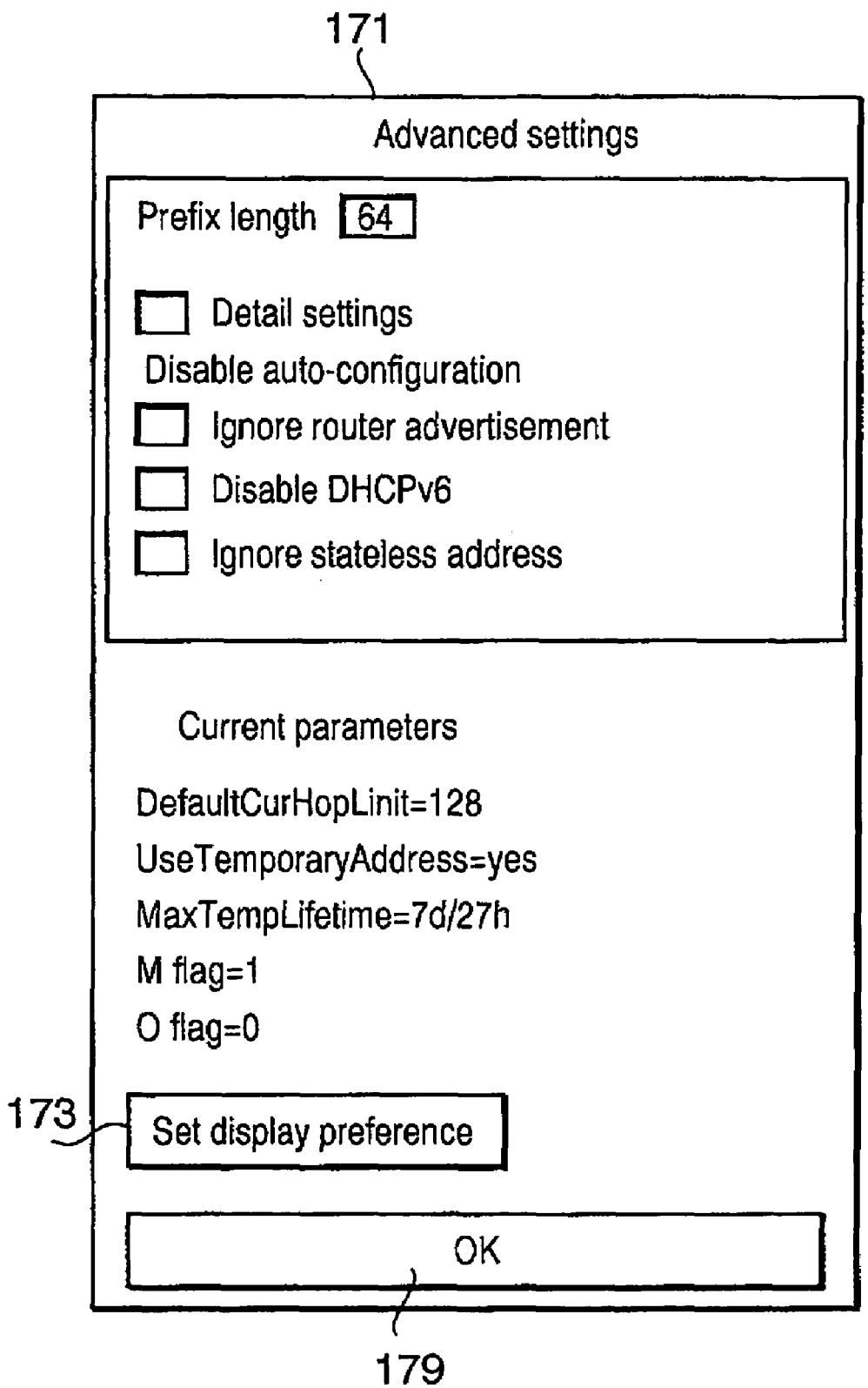
FIG. 24 is a screen image showing an advanced settings screen displayed by the management PC in accordance with illustrative aspects of the invention.

If the operation by the user in S4620 is the pressing of the advanced settings button 159 (S4700: NO, S4710: YES), the management PC 1 displays the advanced settings screen 171 (see FIG. 24) on the display unit (S4720). As shown in FIG. 24, the advanced settings screen 171 has various input windows, a display preference setting button 173, an OK button 179, etc. After displaying the advanced settings screen 171, the management PC 1 waits for an operation by the user (S4730: NO). When an operation is performed by the user (S4730: YES), if the operation is a selection of a check box (S4740: YES), the check box is switched to a selected state (to a non-selected state when the check box has already been selected) (S4750) and the process returns to S4730.

If the operation in S4730 is the pressing of the display preference setting button 173 (S4740: NO, S4760: YES), the management PC 1 executes a display priority order setting process (S4770). The details of the display priority order setting process will be explained later. After finishing the step S4770 or when the operation by the user in S4730 is the pressing of the OK button 179 (S4760: NO), the management PC 1 instructs the managed device to change its settings based on the selection status of the check boxes at this point and the result of the display priority order setting process (S4780) and thereafter returns to S4620. Since RA ignorance information (indicating whether to ignore an RA (Router Advertisement: information containing a prefix) transmitted from a router) and automatic setting validity information (indicating whether to enable or disable automatic setting) have been registered in the database of the managed device, in the step S4780, a setting request requesting the managed device to change the information according to the selection status of the check boxes is transmitted by use of SNMP. The managed device receiving the setting request updates the information based on the setting request, by which the settings of the managed device are changed according to the selection status of the check boxes.

In the aforementioned step S4710, if the operation by the user in S4620 is not the pressing of the advanced settings button 159 (S4710: NO), the IPv6 setting process of FIG. 22 is ended and the process returns to S4070 of FIG. 17.

4.4 Display Priority Order Setting Process

Figure 25:
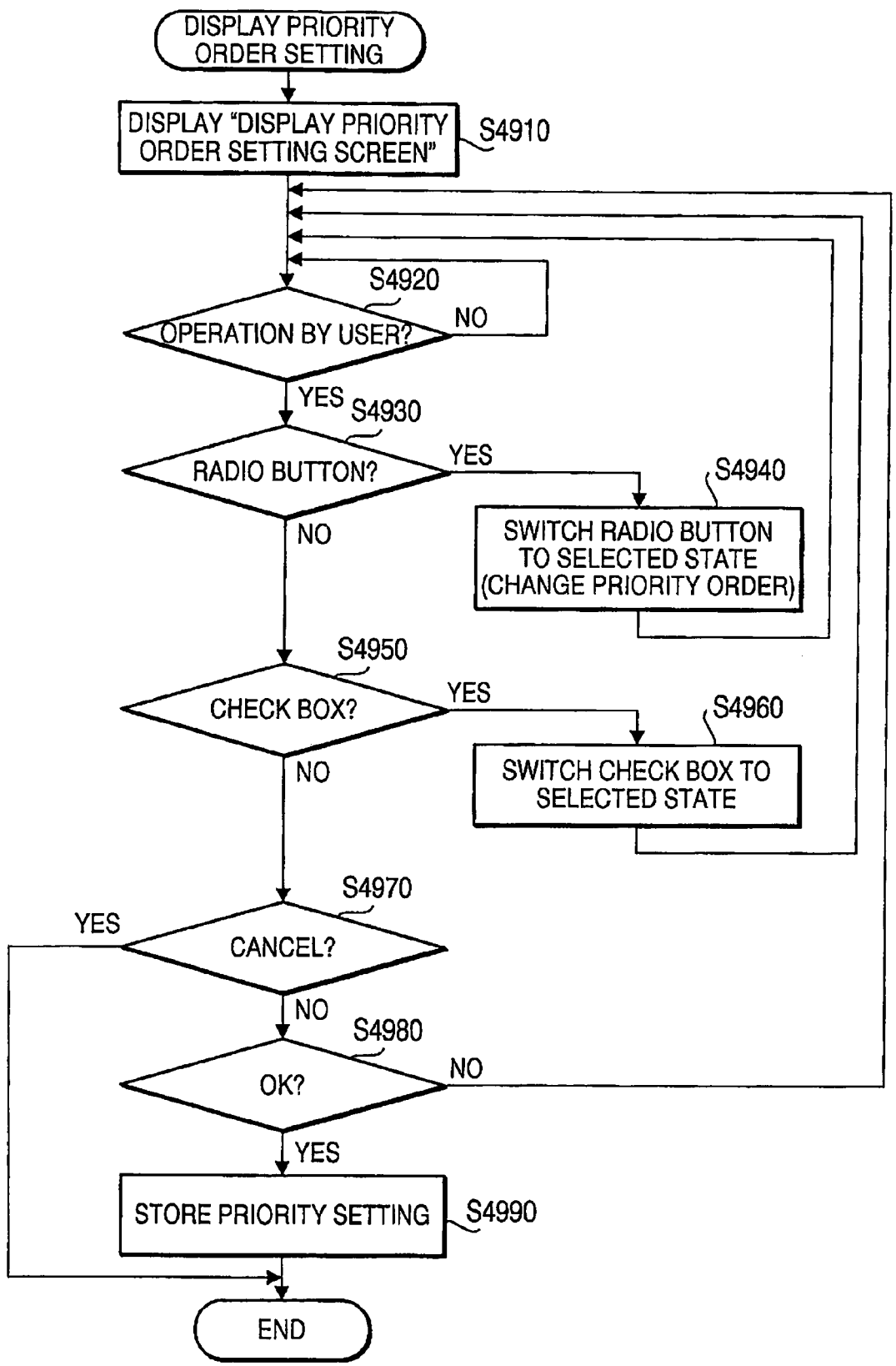
FIG. 25 is a flow chart showing a display priority order setting process executed by the management PC in accordance with illustrative aspects of the invention.

Next, the details of the display priority order setting process (S4780 of FIG. 22) will be explained referring to a flow chart of FIG. 25. The display priority order setting process, for selecting one of the aforementioned priority lists (see FIGS. 10A-10D) as a priority list to be used by each device, is executed when the display preference setting button 173 is pressed on the advanced settings screen 171 (FIG. 24) which has been explained above.

Figure 26:
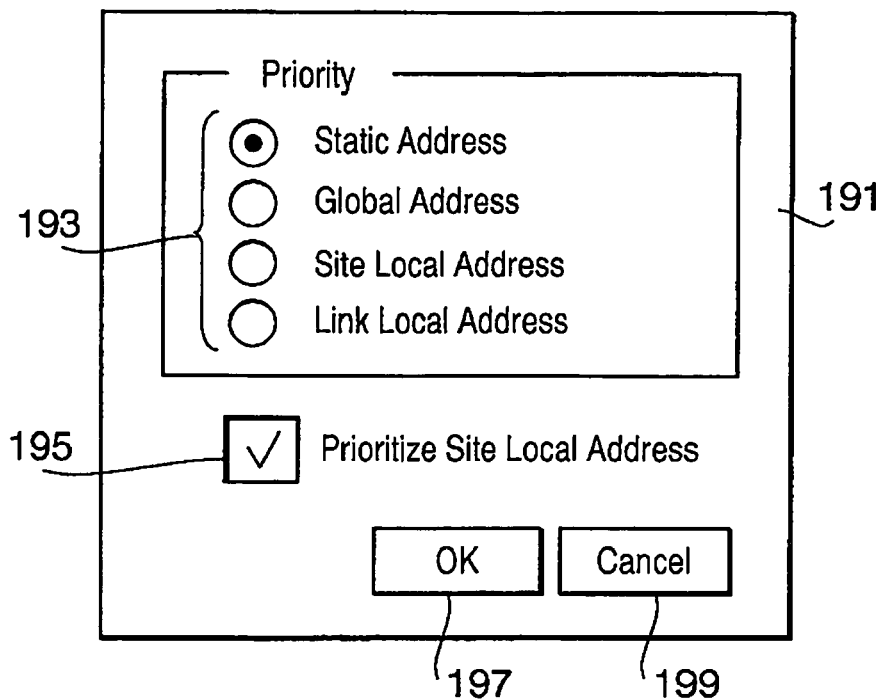
FIG. 26 is a schematic diagram showing a display priority order setting screen displayed by the management PC in accordance with illustrative aspects of the invention.

At the start of the display priority order setting process, the management PC 1 displays a display priority order setting screen 191 (see FIG. 26) on the display unit (S4910). As shown in FIG. 26, the display priority order setting screen 191 has radio buttons 193 (for letting the user select one of the four priority lists (FIGS. 10A-10D)), a check box 195 (for making a setting for prioritizing the site-local address), an OK button 197, a cancel button 199, etc.

After displaying the display priority order setting screen 191, the management PC 1 waits for an operation by the user (S4920: NO). When an operation is performed by the user (S4920: YES), if the operation is a selection of one of the radio buttons 193 (S4930: YES), the selected radio button is switched to a selected state (to a non-selected state when the radio button has already been selected) (S4940) and the process returns to S4920.

If the operation by the user in S4920 is a selection of the check box 195 (S4950: YES), the check box 195 is switched to a selected state (to a non-selected state when the check box 195 has already been selected) (S4960) and the process returns to S4920.

If the operation in S4920 is pressing the cancel button 199 (S4950: NO, S4970: YES), the display priority order setting process of FIG. 25 is ended skipping a step S4990 which will be explained below. If the operation in S4920 is the pressing of the OK button 197 (S4970: NO, S4980: YES), one of the four priority lists (FIGS. 10A-10D) is stored as a priority setting, according to the selection status of the radio buttons 193 and the check box 195 (S4990), and the display priority order setting process of FIG. 25 is ended. The priority setting stored in S4990 is thereafter transmitted to the managed device by use of SNMP. The priority setting sent from the management PC 1 is processed by the managed device in the aforementioned steps S1300 and S1310 (see FIG. 4), by which one of the four priority lists (FIGS. 10A-10D) is stored in the managed device.

As above, the priority list to be used by each managed device for the priority judgment can be set (selected from the four priority lists of FIGS. 10A-10D) and switched arbitrarily by the above operation on the management PC 1. After the setting, the managed device makes the priority judgment based on the priority list and generates an address list containing addresses sorted in the intended priority order. Therefore, by the above operation by the user (manager, administrator, etc.) for setting a desired priority list to each device, when the management PC 1 displays addresses assigned to a device, the management PC 1 is capable of displaying an address list sorted in the priority order intended for the particular device by displaying the address list obtained from the device just as it is.

4.5 Address Display Editing Process

Next, an address display editing process, executed by the management PC 1 for displaying addresses in an easy-to-understand style by use of the address list obtained from a device, will be explained.

The device management tool operating on the management PC 1 is configured to be able to display IPv6 addresses in a pull-down menu on various screens. For example, the selection window 153 of the IPv6 settings screen 151 (see FIG. 23) is designed so that it can be opened as a pull-down menu containing IPv6 addresses as shown in FIG. 27.

Figure 27:
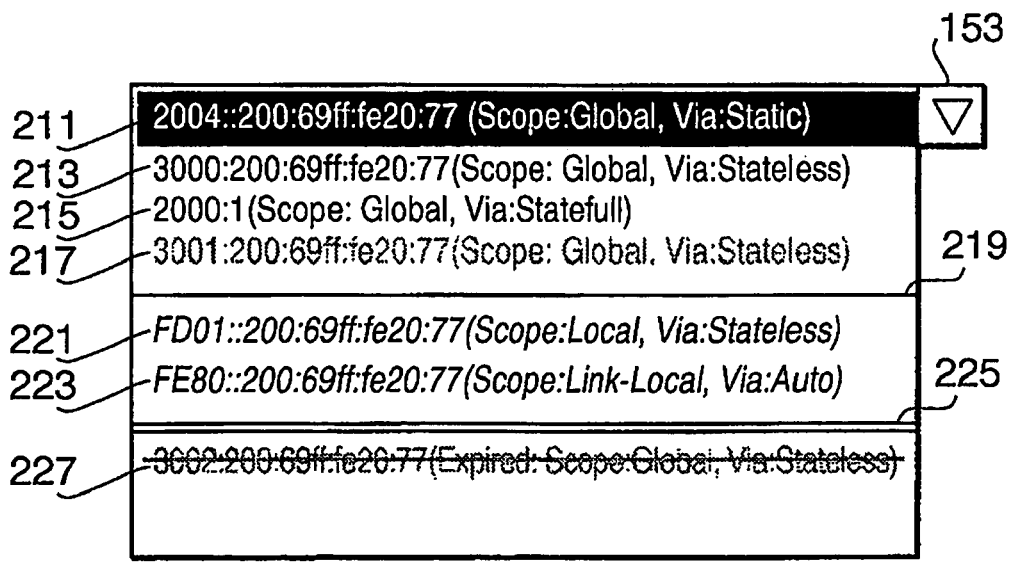
FIG. 27 is a screen image showing a selection window (opened pull-down menu) displayed by the management PC in accordance with illustrative aspects of the invention.

The selection window 153 shown in FIG. 27 is an example where the management PC 1 has obtained the address list shown in FIG. 2. In the opened pull-down menu, four global addresses 211, 213, 215 and 217, a separator line 219, two local addresses 221 and 223, a separator line 225, and an invalid address 227 have been displayed. While the display order in the pull-down menu is in conformity with that in the address list, in the address display editing process explained below, valid addresses are displayed in an upper part of the pull-down menu and thereafter invalid addresses are displayed in a lower part of the pull-down menu. In displaying the valid addresses, addresses having a mark in the address list are displayed using a bold font, local addresses are displayed using an italic font, and addresses having the "Deprecated" flag are dimmed (grayed out). The discrimination in the displaying style may also be implemented by use of different colors, type faces, etc. The invalid addresses are dimmed (grayed out) with strikeouts. Incidentally, a setting for-hiding the invalid addresses is also possible in the address display editing process which will be explained below.

The address display editing process for displaying a pull-down menu like the one shown in FIG. 27 will be explained referring to flow charts of FIGS. 28 and 29.

Figure 28:
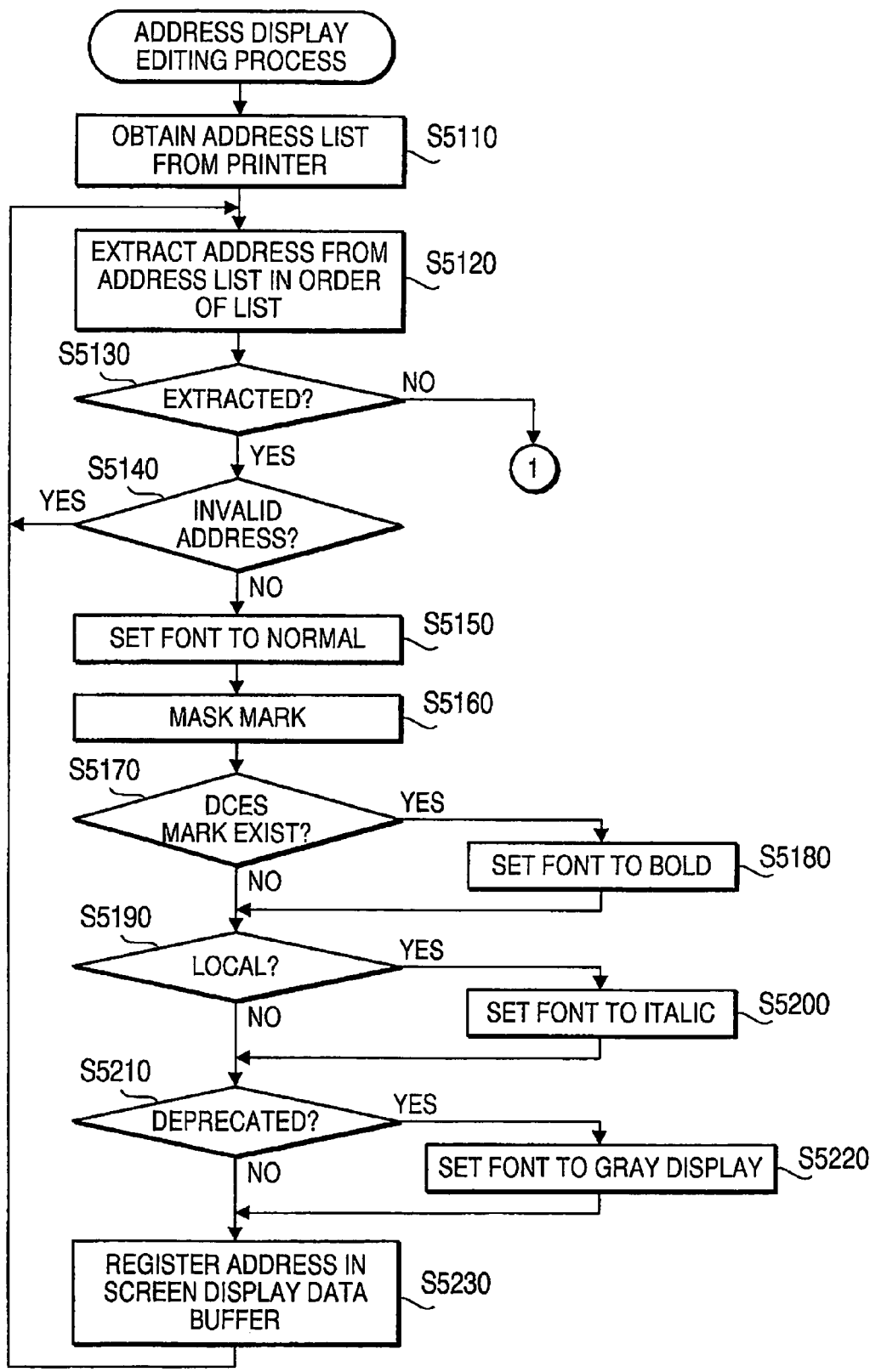
FIG. 28 is a flow chart showing the first half of an address display editing process executed by the management PC in accordance with illustrative aspects of the invention.

Referring to FIG. 28, at the start of the address display editing process, the management PC 1 obtains an address list (see FIG. 2) from a device (printer) (S5110), extracts a piece of address information from the obtained address list in the order of the list (from the high priority side of the address list) (S5120) and thereafter judges whether a piece of address information has been successfully extracted (S5130). Since at least a piece of address information has been stored in the address list obtained from the device, the judgment of the step S5130 results in "YES" at least once. In this case (S5130: YES), the management PC 1 judges whether the IP address in the extracted address information is an invalid address (S5140). If the IP address is an invalid address (S5140: YES), the process returns to S5120 since the IP address should be handled later as an object of a latter process from a step S5240 which will be explained later (see FIG. 29).

If the IP address is a valid address (S5140: NO), the management PC 1 first sets the display font to a normal font (S5150) and properly masks the "MARK" in the address information (S5160). Based on the properly masked "MARK", the management PC 1 sets the font to bold (S5180) if there exists (remains) a mark in the address information (S5170: YES). Subsequently, the management PC 1 sets the font to italic (S5200) if the address is a local address (S5190: YES), sets the font to the gray display (dimmed display) (S5220) if the "Deprecated" flag has been set in the address information (S5210: YES), registers the address (to which the display setting has been made by the above steps S5150-S5220) in a screen display data buffer (S5230), and returns to S5120.

Thereafter, the loop of S5120-S5230 is repeated until the judgment of S5120 results in "NO". By the repetition, the pieces of address information contained in the address list are successively processed in the order of the list, by which the display setting (S5150-S5220) is made for each valid address in the address list and the valid addresses to which the display setting has been made are registered in the screen display data buffer in S5230.

When S5120 is executed after the last piece of address information in the address list is processed, no further address information can be extracted (S5130: NO). In this case, the process advances to S5240 shown in FIG. 29.

Figure 29:
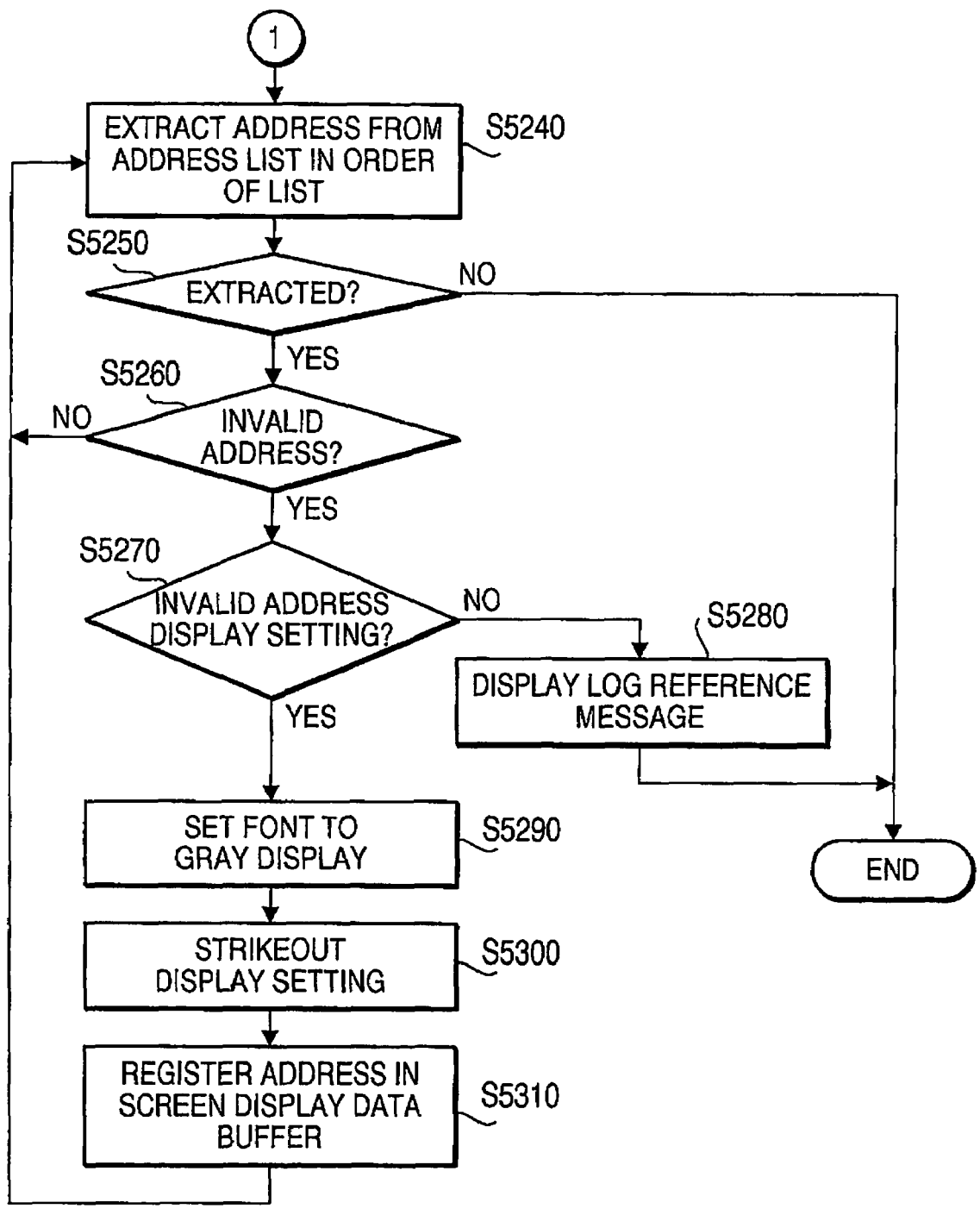
FIG. 29 is a flow chart showing the second half of the address display editing process in accordance with illustrative aspects of the invention.

Referring to FIG. 29, the management PC 1 extracts a piece of address information from the address list in the order of the list (from the high priority side of the address list) (S5240) similarly to S5120 and thereafter judges whether a piece of address information has been successfully extracted (S5250). The judgment of the step S5250 results in "YES" at least once since at least a piece of address information has been stored in the address list as mentioned above. In this case (S5250: YES), the management PC 1 judges whether the IP address in the extracted address information is an invalid address (S5260). If the IP address is a valid address (S5260: NO), the process returns to S5240 since the IP address has already been processed by the loop S5120-S5230 which has been explained above.

If the IP address is an invalid address (S5260: YES), the management PC 1 judges whether an invalid address display setting has been made (S5270). A setting screen (not shown) of the management tool has a selection window (not shown) for specifying whether to display (include) invalid addresses in the pull-down menus, and a selection in the setting screen is recorded in a setting file of the management tool as an invalid address display setting flag. The judgment of S5270 is made based on the invalid address display setting flag stored in the setting file. The invalid address display setting can be employed in this illustrative embodiment for the following reason. Generally, some users might find it difficult to see a pull-down menu when invalid addresses are included in the menu since the number of alternatives increases in some degree. On the other hand, invalid addresses may become necessary for trouble analysis, etc. To address these issues, whether to include invalid addresses in the pull-down menus can be selected in this illustrative embodiment.

If the invalid address display setting has not been made (S5270: NO), the management PC 1 displays a log reference message (prompting the user to refer to a log) in an area separate from the pull-down menu (S5280) and ends the process, by which only the addresses registered in S5230 are held in the data buffer for displaying the pull-down menu.

If an invalid address display setting has been made (S5270: YES), the management PC 1 sets the display font of the invalid address to the gray display (dimmed display) (S5290) and makes a strikeout display setting (S5300). The invalid address to which the above display setting (S5290, S5300) has been made is registered in the screen display data buffer (S5310) and the process returns to S5240.

Thereafter, the loop of S5240-S5310 is repeated until the judgment of S5250 results in "NO". By the repetition, the pieces of address information contained in the address list are successively processed in the order of the list. As a result, the display setting (S5290, S5300) can be made for each invalid address in the address list and the invalid addresses to which the display setting has been made can be registered in the screen display data buffer in the step S5310.

When S5240 is executed after the last piece of address information in the address list is processed, no further address information can be extracted (S5250: NO). In this case, the address display editing process of FIGS. 28 and 29 is ended.

Incidentally, the addresses classified into several display styles by the above address display editing process may not be immediately displayed on the screen of the display unit. In the selection window 153 shown in FIG. 27 for example, the addresses classified as above can be displayed in the window (pull-down menu) in response to pressing a button at the far right edge of the selection window 153 by the user instructing the management PC 1 to open the pull-down menu. The number of addresses that can be displayed at the same time in the opened pull-down menu has been preset. To let the pull-down menu show more addresses, the user performs a prescribed operation for scrolling the menu. Detailed explanation of such operation/display methods (well known in the field of computer technology) is omitted here.

4.6 Balloon Display Process

Next, a balloon display process, executed by the management PC 1 for displaying addresses in an easy-to-understand style based on an address list obtained from a device, will be explained.

The device management tool operating on the management PC 1 is configured to display one of the IPv6 addresses having the highest priority on various screens. The device management tool is also configured to be able to display other addresses (of lower priority) in a balloon display when the user points a cursor (pointer) of a pointing device at the one address displayed on the screen. The "balloon display" is a well known GUI function for temporarily displaying a small pop-up window (for displaying additional information to the user) when the user points the cursor (pointer) at an address (with no need of a particular operation such as clicking).

The balloon display will be explained below taking an example in which the user points at an IPv6 address being displayed on the device list display screen 101.

Figure 30:
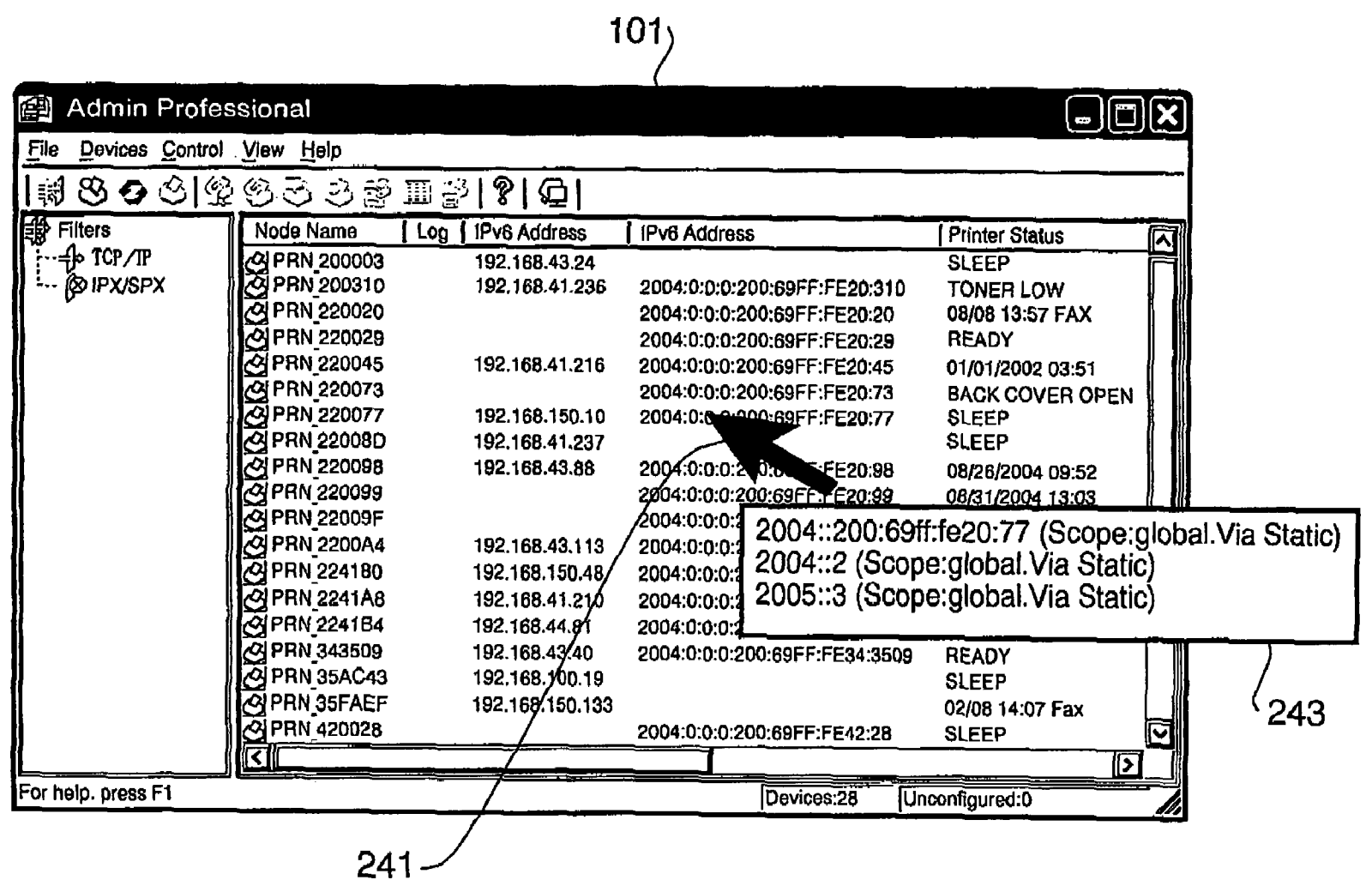

As shown in FIG. 30, when the user points at an IPv6 address on the device list display screen 101 with a cursor 241 of a pointing device, the management PC 1 displays a balloon 243 superposing it on the device list display screen 101. In the balloon 243, several addresses assigned to the device are displayed in addition to the address already displayed in the device list display screen 101. Such balloon display is implemented by a balloon display process like the one shown in FIG. 31.

At the start of the balloon display process, the management PC 1 extracts a piece of address information from an address list obtained from the device (printer) in the order of the list (from the high priority side of the address list) (S5510). This explanation will be continued assuming that an address list shown in FIG. 32 (illustrative address list which causes the balloon display shown in FIG. 30) has been obtained from the device. This address list has already been obtained from the device (and thereafter stored in a memory of the management PC 1) at the point when an address to be pointed at with the cursor 241 is displayed.

Subsequently, the management PC 1 judges whether a piece of address information has been successfully extracted in S5510 (S5520). The judgment of the step S5520 results in "YES" at least once since at least a piece of address information has been stored in the address list obtained from the device. In this case (S5520: YES), the management PC 1 properly masks the "MARK" in the address information (S5560). Based on the properly masked "MARK", the management PC 1 adds a balloon display item (an item to be displayed in the balloon) (S5550) if there exists (remains) a mark in the address information (S5540: YES). In this step, the IP address, the scope and the method contained in the address information (see FIG. 32) are added to (registered in) a data buffer for the balloon display.

After finishing S5550 or when there exists no mark in S5540 (S5540: NO), the process returns to S5510 and thereafter the loop of S5510-S5550 is repeated until the judgment of S5520 results in "NO". By the repetition, the pieces of address information contained in the address list of FIG. 32 are successively processed in the order of the list. When S5510 is executed after the last piece of address information in the address list is processed, no further address information can be extracted (S5520: NO). In this case, management PC 1 displays the balloon on the display unit according to the contents of the data buffer (S5560) and ends the balloon display process. By the step S5560, the balloon 243 shown in FIG. 30 is displayed on the display unit.

Figure 31:
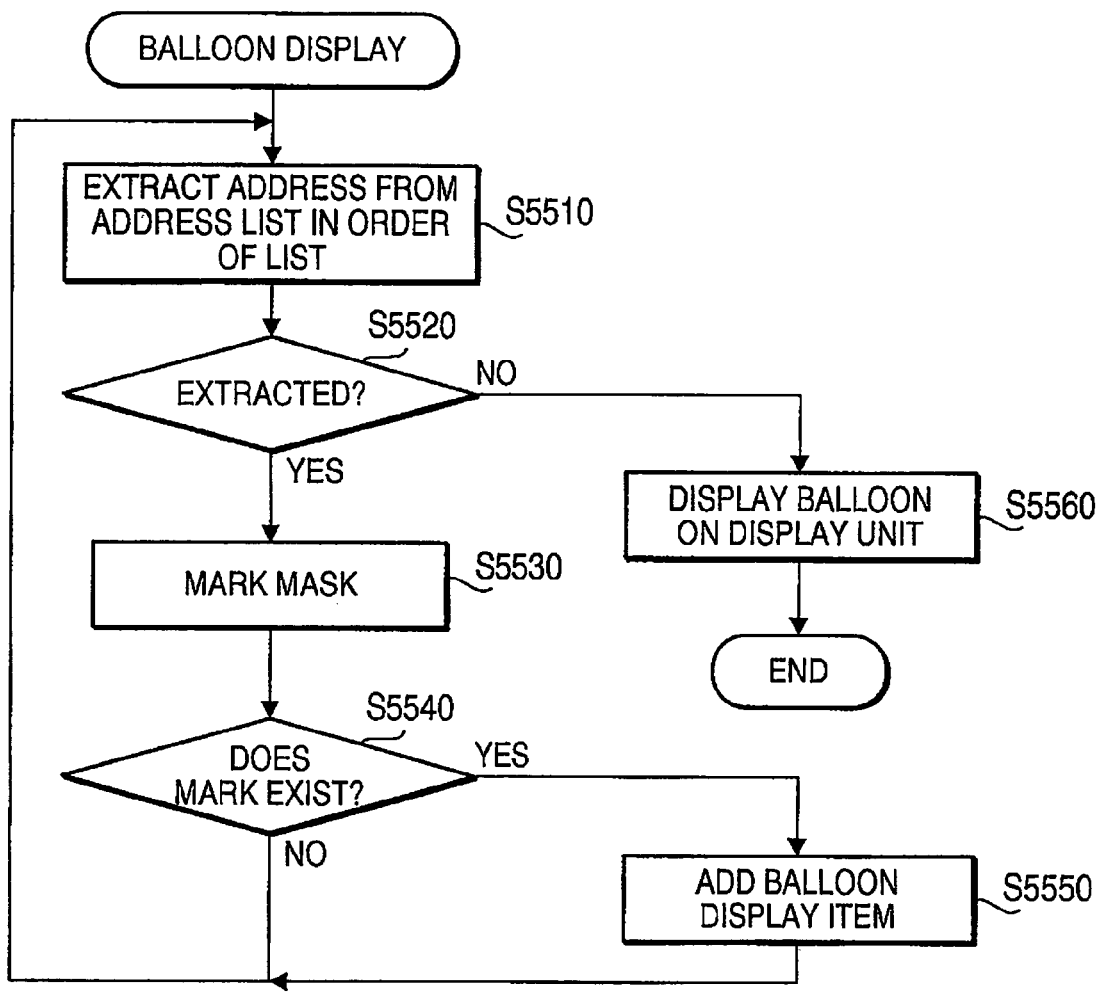
FIG. 31 is a flow chart showing a balloon display process executed by the management PC in accordance with illustrative aspects of the invention.

In the example of FIGS. 30-32, the mask used in S5530 is set so that only the "Static" mark (which is attached to a static address) will be extracted. Therefore, the step S5540 judges that there exists a mark only when the address information contains the "Static" mark, by which the addition of balloon display items (S5550) is executed for three pieces of address information having the "Static" mark (out of the nine pieces of address information contained in the address list shown in FIG. 32). Consequently, three pieces of address information are displayed in the balloon 243 (see FIG. 30) in the step S5560.

4.7 Remote Management Check Process

Next, a remote management check process will be explained below. The remote management check process is a process employed when the management PC 1 and a device (e.g. the management PC 1 and the printer 4 shown in FIG. 1) are not in the same local area network.

The communication between the management PC 1 and the printer 4 is impossible without using global addresses. Therefore, when the addresses of the printer 4 are simply displayed by the management PC 1, it is generally desirable that the global addresses of the printer 4 be displayed prominently.

However, since the printer 4 is usually operated by use of local addresses in the site-local scope A (see FIG. 1), the global addresses assigned to the printer 4 are not used in the site-local scope A.

Under such conditions, when the user of the management PC 1 desires to let the management PC 1 display the settings of the printer 4 and inform a user of the client PC 16 about address settings of the printer 4 for example, the user of the management PC 1 may desire to know local addresses which have been assigned to the printer 4. In such cases, the remote management check process is employed by the management PC 1.

Figure 33:
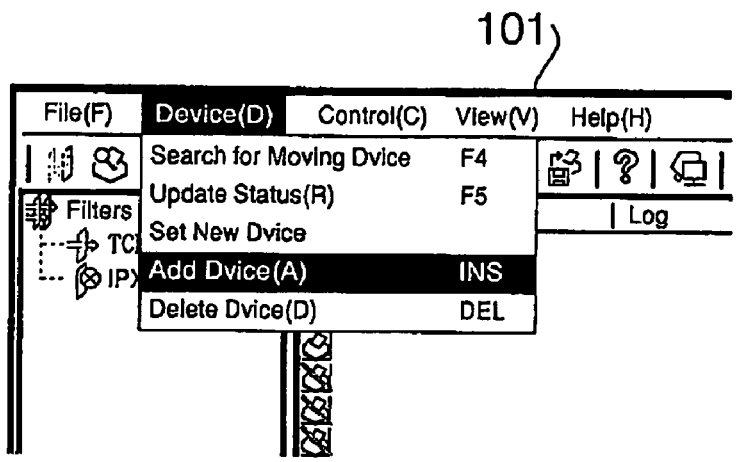
FIG. 33 is a screen image showing a case where an item "Add Device" is selected from a menu bar of the device list display screen in accordance with illustrative aspects of the invention.

To employ the remote management check process, the user of the management PC 1 previously checks the check box 195 (for making a setting for prioritizing the site-local address) on the display priority order setting screen 191 which has been explained above (see FIG. 26). With the check box 195 already checked as above, the user selects an item "Add Device" from a menu bar of the device list display screen 101 as shown in FIG. 33. A process corresponding to the item "Add Device" is contained in the step S4040 of FIG. 17 which has been explained above.

Figure 34:
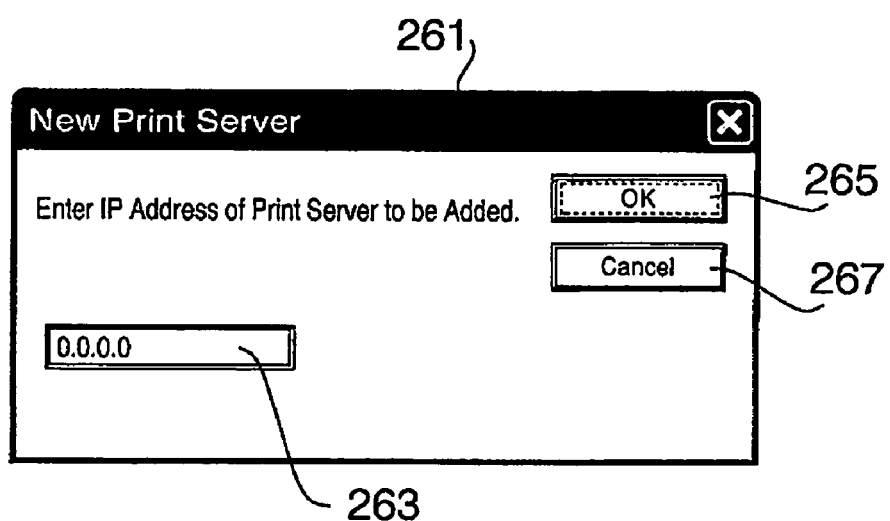
FIG. 34 is a screen image showing a device addition dialog displayed by the management PC in accordance with illustrative aspects of the invention.

When the item "Add Device" is selected from the menu bar of the device list display screen 101, the management PC 1 displays a device addition dialog 261 like the one shown in FIG. 34 on the display unit. The device addition dialog 261 has an address input window 263, an OK button 265, a cancel button 267, etc. The user can directly designate a device by entering an IP address in the address input window 263. The device designated in the device addition dialog 261 is added to the device list on the device list display screen 101. Thereafter, the device can be selected by the user in the steps S4020 and S4030 of FIG. 17 similarly to other devices.

When the step S4050 of FIG. 17 is executed after the addition of the printer 4 (a device outside the local area including the management PC 1) and the selection of the printer 4 (the added device) by the user, the remote management check process (see FIG. 35) is carried out.

Figure 35:
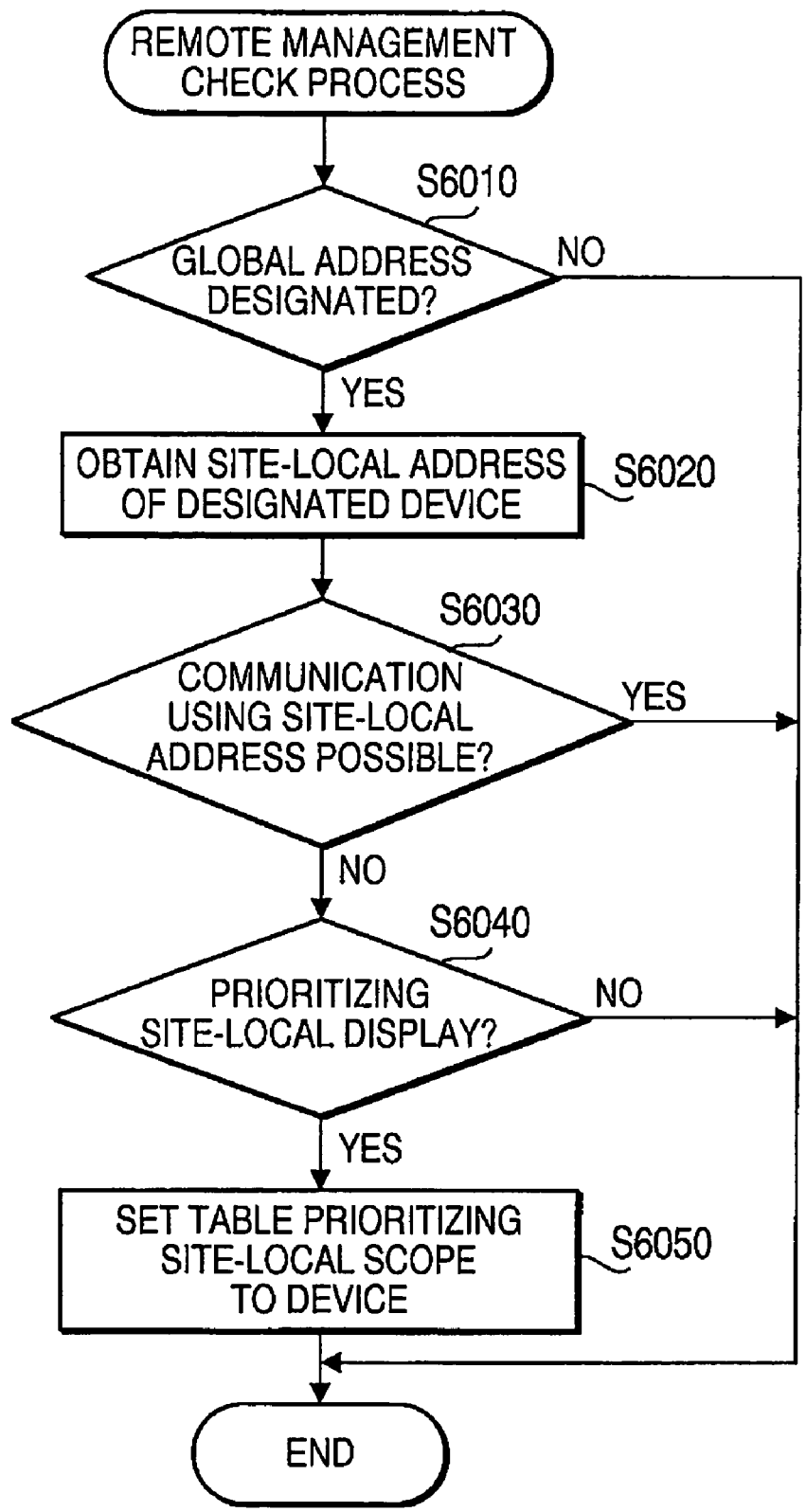
FIG. 35 is a flow chart showing a remote management check process executed by the management PC in accordance with illustrative aspects of the invention.

Referring to FIG. 35, at the start of the remote management check process, the management PC 1 checks whether the IP address input by the user in the device addition dialog 261 is in the global scope (S6010). If the input IP address is not a global address (S6010: NO), the remote management check process is ended since the device as the object of the step S4050 of FIG. 17 can be presumed to be in the same local area as the management PC 1 (not at a remote place like the printer 4).

If a global address has been input (S6010: YES), the management PC 1 obtains the site-local address of the designated device (S6020) and checks whether communication using the obtained site-local address is possible (S6030). If possible (S6030: YES), the device as the object of S4050 of FIG. 17 can be presumed to be in the same local area as the management PC 1 even though the global address was designated by chance. Also in this case, the remote management check process is ended since the object of S4050 is not a device at a remote place like the printer 4.

If the communication using the site-local address is impossible (S6030: NO), the management PC 1 judges whether a site-local display priority setting (a setting for prioritizing the displaying of the site-local address) has been made (S6040). This step is for checking whether the check box 195 (for prioritizing the site-local address) on the display priority order setting screen 191 (see FIG. 26) has been checked. Specifically, whether the check box 195 is checked has been recorded as a flag in a setting file or a storage area (e.g. registry) which is used by the management tool, and thus the step S6040 judges whether the site-local display priority setting has been made based on the flag.

If the site-local display priority setting has not been made (S6040: NO), the remote management check process is ended since the management PC 1 may display the addresses (pieces of address information) of the device (e.g. printer 4) according to the standard display method (based on one of the four priority lists (FIGS. 10A-10D) designated by the user).

On the other hand, if the site-local display priority setting has been made (S6040: YES), the user is presumed to desire local address information on the device (e.g. printer 4) by remote management from the management PC 1 as mentioned above, and thus the management PC 1 sets the table (priority list) prioritizing the site-local scope (see FIG. 10C) to the device (e.g. printer 4) (S6050) and ends the remote management check process.

The table (prioritizing the site-local scope) to be set to the device in S6050 is transmitted to the device. The device receiving the table executes the steps S1300 and S1310 (see FIG. 4), by which the table prioritizing the site-local scope is stored in the device and its address list is re-created.

Thereafter, steps explained before is executed when the addresses of the device (e.g. printer 4) is displayed by the management PC 1, in which the site-local address is displayed prominently since the priority table (priority list) prioritizing the site-local scope has been set to the device (e.g. printer 4) in the step S6050.

Other Aspects

While a description has been given above of an illustrative embodiment in accordance with aspects of the present invention, the present invention is not to be restricted by the particular illustrative embodiment and a variety of modifications, design changes, etc. are possible without departing from the scope and spirit of the present invention described in the appended claims.

For example, in the steps S4370, S4400 and S4410 (See FIG. 20) for displaying an IPv6 address in the IPv6 address display field 111 of the device information display window 103 on the device list display screen 101, the management PC 1 in the above illustrative embodiment is capable of determining whether to display an IPv6 address or not (S4370). However, the management PC 1 may be configured to display IPv6 addresses also in the step S4410, by opening the IPv6 address display field 111 as a pull-down menu similarly to the selection window 153 (pull-down menu) which has been explained referring to FIG. 27.

Even in the above illustrative embodiment in which only one IPv6 address having the highest priority is displayed in the IPv6 address display field 111 (without opening the IPv6 address display field 111 as a pull-down menu), the top-priority IPv6 address may be displayed properly changing its display style like the addresses displayed in the pull-down menu of FIG. 27. In other words, while a valid IPv6 address extracted first from the address list obtained from the printer (device) by the extraction in the order of the list is regarded to have the highest priority and the address is displayed immediately by the step S4410 (See FIG. 20), an extra step for modifying the font of the address based on the mark in the address information may also be added.

Figure 36:
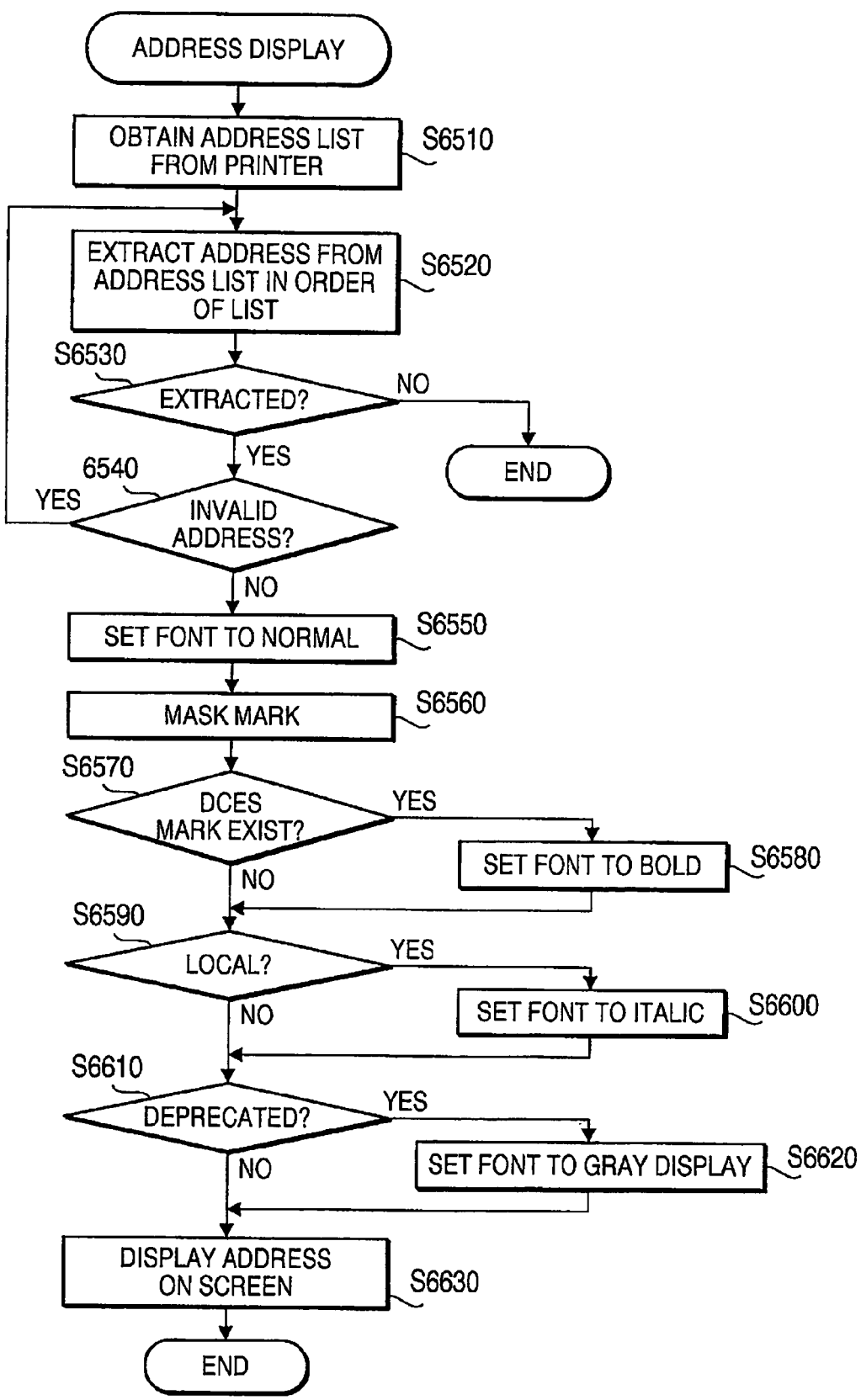
FIG. 36 is a flow chart showing an address display process (as a modification of the illustrative embodiment) executed by the management PC in accordance with illustrative aspects of the invention.

FIG. 36 is a flow chart showing the above process for displaying an IPv6 address in the IPv6 address display field 111 changing its display style. The management PC 1 first obtains the address list (see FIG. 2) from the device (printer) (S6510), extracts a piece of address information from the address list in the order of the list (from the high priority side of the address list) (S6520) and thereafter judges whether a piece of address information has been successfully extracted (S6530). The judgment of S6530 results in "YES" at least once since at least a piece of address information has been stored in the address list obtained from the device. In this case (S6530: YES), the management PC 1 judges whether the IP address in the extracted address information is an invalid address (S6540). If the IP address is an invalid address (S6540: YES), the process returns to S6520 for the extraction of a valid address.

If the IP address is a valid address (S6540: NO), the management PC 1 first sets the display font to a normal font (S6550) and properly masks the "MARK" in the address information (S6560). Based on the properly masked "MARK", the management PC 1 sets the font to bold (S6580) if there exists (remains) a mark in the address information (S6570: YES). Subsequently, the management PC 1 sets the font to italic (S6600) if the address is a local address (S6590: YES), sets the font to the gray display (dimmed display) (S6620) if the "Deprecated" flag has been set in the address information (S6610: YES), displays the IP address (to which the display setting has been made by S6550-S6620) in the IPv6 address display field 111 (S6630), and ends the process of FIG. 36. By the above process, an IPv6 address in a modified display style can be displayed in the IPv6 address display field 111 of the device list display screen 101 (see FIG. 18) similarly to the addresses displayed in the pull-down menu of FIG. 27.

In the above illustrative embodiment, prescribed marks ("Admin", "User", "Last", "Static", etc.) in the address information are masked by use of a proper mask and thereafter the display style is changed depending on whether there exists (remains) a mark in the address information. However, the judgment on the presence/absence of a mark may also be made independently for each of the marks ("Admin", "User", "Last", "Static", etc.). In this case, the display style may be changed variously corresponding to each mark.

While several ways of displaying one or more IP addresses in a window or menu (displaying one of the addresses in the address list having the highest priority, displaying all the addresses intended by the user in a pull-down menu, displaying all the addresses intended by the user in the balloon display, etc.) have been described in the above illustrative embodiment, when the number of addresses to be displayed exceeds a prescribed limit (the number of addresses that can be displayed at the same time in a window or menu), the management PC 1 may also allow the user to change the size of the window or menu to flexibly change the limit.

What is claimed is:

1. An address information display system which is configured so that at least a first node included in a plurality of nodes forming a network will function as an address information display apparatus capable of displaying address information for an address assigned to a device connected to the network, comprising:
    an address information storage unit configured to store address information for the device, while storing a plurality of address information items corresponding to each of a plurality of addresses assigned to the device;
    a judgment unit configured to judge whether an address assigned to the device is in a usable state based on the address information stored in the address information storage unit while judging whether each of a plurality of other addresses of the same device is in the usable state based on one or more corresponding address information items; and
    a display unit configured to display at least one address of the device judged by the judgment unit to be in the usable state when such an address exists while performing one of:
        displaying each address of the device judged by the judgment unit to be in an unusable state in a display style different from a display style of the address judged to be in the usable state, and
        not displaying each address judged to be in the unusable state.

2. The address information display system according to claim 1,
    wherein the address information includes validity term information regarding a term of validity which has been set to the address corresponding to the address information, and
    wherein the judgment unit judges that an address is in the usable state if the term of validity set to the address has not expired yet based on the validity term information while judging that the address is in the unusable state if the term of validity has already expired based on the validity term information.

3. The address information display system according to claim 2,
    wherein the address information storage unit stores the address information corresponding to an address until a prescribed time period passes following the expiration of the term of validity set to the address.

4. The address information display system according to claim 2,
    wherein the address information storage unit stores the address information corresponding to an address until the address information is read out a prescribed number of times following the expiration of the term of validity set to the address, wherein the prescribed number is at least one.

5. The address information display system according to claim 1, further comprising a message output unit configured to output a message when an address is judged by the judgment unit to be in the unusable state.

6. The address information display system according to claim 1,
    wherein the address information includes first communication possibility information indicating whether the address corresponding to the address information is an address allowing communication with the first node and
    wherein the judgment unit judges that an address is in the usable state if the address allows communication with the first node based on the first communication possibility information while judging that the address is in the unusable state if the address does not allow communication with the first node based on the first communication possibility information.

7. The address information display system according to claim 6,
    wherein the first communication possibility information is information indicating whether the address corresponding to the address information is a destination address contained in an SNMP request transmitted from the first node.

8. The address information display system according to claim 6,
    wherein the first communication possibility information is information indicating whether the address corresponding to the address information is an address in the same local area network as the first node.

9. The address information display system according to claim 1,
    wherein the address information includes second communication possibility information indicating whether the address corresponding to the address information is an address allowing communication with a second node different from the first node and
    wherein the judgment unit judges that an address is in the usable state if the address allows communication with the second node based on the second communication possibility information while judging that the address is in the unusable state if the address does not allow communication with the second node based on the second communication possibility information.

10. The address information display system according to claim 9,
    wherein the second communication possibility information included in the address information indicates that the address corresponding to the address information is an address allowing communication with the second node if the address corresponding to the address information is an address of the device which has been used for communication between the second node and the device using a printing protocol.

11. The address information display system according to claim 6,
wherein the display unit displays each address judged by the judgment unit to be in the unusable state in a display style different from a display style of the address judged to be in the usable state.

12. The address information display system according to claim 6,
wherein the display unit does not display each address judged by the judgment unit to be in the unusable state.

13. The address information display system according to claim 1,
wherein the address information includes communication protocol information configured to specify a communication protocol that uses the address corresponding to the address information, and
wherein the judgment unit judges that an address is in the usable state if the address is used by a communication protocol supported by both devices communicating with each other based on the communication protocol information while judging that the address is in the unusable state if the address is used by a communication protocol not supported by both devices communicating with each other based on the communication protocol information.

14. The address information display system according to claim 13,
wherein the address information on the device includes a plurality of address information items corresponding to the plurality of addresses used by different communication protocols,
wherein the judgment unit judges whether each of the addresses of the device is in the usable state based on the corresponding address information item in regard to each of the different communication protocols, and
wherein the display unit displays addresses judged by the judgment unit to be in the usable state in regard to each of the different communication protocols.

15. The address information display system according to claim 1,
wherein the address information on the device includes the plurality of address information items corresponding to the plurality of addresses used by the same communication protocol, and
wherein the judgment unit judges whether each of the addresses of the device is in the usable state based on the corresponding address information item.

16. The address information display system according to claim 1,
wherein, when addresses of the device judged by the judgment unit to be in the usable state include a static address which is not changed unless manually changed by a user, the display unit displays one or more of the addresses including at least the static address.

17. The address information display system according to claim 1,
wherein, when there are two or more addresses of the device judged by the judgment unit to be in the usable state, the display unit displays all the addresses.

18. The address information display system according to claim 1,
wherein, when addresses of the device judged by the judgment unit to be in the usable state include a wide area network address which allows communication with a node outside a local area network, the display unit displays one or more of the addresses including at least the wide area network address.

19. The address information display system according to claim 1,
wherein, when addresses of the device judged by the judgment unit to be in the usable state include the address that the device last used for communication, the display unit displays one or more of the addresses including at least the address last used for communication.

20. The address information display system according to claim 1, further comprising a display condition storage unit for storing a display condition which can be set arbitrarily by a user, wherein when addresses of the device judged by the judgment unit to be in the usable state include an address satisfying the display condition stored in the display condition storage unit, the display unit displays one or more of the addresses including at least the address satisfying the display condition.

21. An address information display system which is configured so that at least a first node included in a plurality of nodes forming a network will function as an address information display apparatus configured to display address information for an address assigned to a device connected to the network, comprising:
an address information storage unit configured to store the address information while storing a plurality of address information items on a device;
a judgment unit configured to judge whether each address is a static address, based on a corresponding address information item stored in the address information storage unit, wherein the static address does not chance unless manually changed by a user; and
a display unit configured to display at least an address of the device judged by the judgment unit to be a static address when such an address exists while one of displaying each address of the device judged by the judgment unit not to be a static address in a display style different from a display style of the address judged to be a static address or not displaying each address judged not to be a static address.

22. The address information display system according to claim 21,
wherein the display unit does not display each address judged by the judgment unit not to be a static address.

23. The address information display system according to claim 21,
wherein the display unit displays each address judged by the judgment unit not to be a static address in a display style different from a display style of the address judged to be a static address.

24. The address information display system according to claim 21,
wherein when an address judged by the judgment unit to be a static address exists, the display unit displays one or more addresses including at least the static address.

25. The address information display system according to claim 21,
wherein when there are two or more addresses judged by the judgment unit to be static addresses, the display unit first displays only one of the static addresses and thereafter displays two or more static address when a prescribed operation is performed by a user.

26. A computer readable medium comprising computer-readable instructions stored thereon that, when executed by a computer, perform a method comprising:

causing at least a first node included in a plurality of nodes forming a network to function as an address information display apparatus which displays address information for an address assigned to a device connected to the network, further causing the first node to execute:

obtaining the address information on the device from one of the nodes forming the network while obtaining a plurality of address information items when there are a plurality of address information items on the device;

judging whether an address assigned to the device is in a usable state based on the address information obtained in the address information acquisition step while judging whether each of a plurality of addresses of the device is in the usable state based on the corresponding address information item when a plurality of address information items on the device have been obtained in the address information acquisition step; and displaying at least one address of the device judged by the judgment step to be in the usable state when such an address exists while one of displaying each address of the device judged by the judgment step to be in the unusable state in a display style different from a display style of the address judged to be in the usable state and not displaying each address judged to be in the unusable state.

27. A computer readable medium comprising computer-readable instructions stored thereon that, when executed by a computer, perform a method comprising:

causing at least a first node included in a plurality of nodes forming a network to function as an address information display apparatus which displays address information for an address assigned to a device connected to the network, further causing the first node to execute:

obtaining the address information on a device from one of the nodes forming the network while obtaining a plurality of address information items when there are a plurality of address information items on the device;

judging whether an address assigned to the device is a static address based on the address information obtained in the address information acquisition step while judging whether each of a plurality of addresses of the device is a static address based on a corresponding address information item when a plurality of pieces of address information on the device have been obtained in the address information acquisition step, wherein the static address does not change unless manually chanced by a user; and displaying at least one address of the device judged by the judgment step to be a static address when such an address exists while one of displaying each address of the device judged by the judgment step not to be a static address in a display style different from a display style of the address judged to be a static address not displaying of each address judged not to be a static address.

\* \* \* \* \*

UNITED STATES PATENT AND TRADEMARK OFFICE
CERTIFICATE OF CORRECTION

PATENT NO. : 7,644,154 B2  Page 1 of 1
APPLICATION NO. : 11/236676
DATED : January 5, 2010
INVENTOR(S) : Norio Tagawa et al.

It is certified that error appears in the above-identified patent and that said Letters Patent is hereby corrected as shown below:

In Column 48, Line 32, Claim 21:
Please delete "chance" and insert --change--.

In Column 50, Line 19, Claim 27:
Please delete "chanced" and insert --changed--.

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,644,154 B2 | Page 1 of 1 |
| APPLICATION NO. | : 11/236676 | |
| DATED | : January 5, 2010 | |
| INVENTOR(S) | : Norio Tagawa et al. | |

It is certified that error appears in the above-identified patent and that said Letters Patent is hereby corrected as shown below:

Title Page, (*) Notice: Subject to any disclaimer, the term of this patent is extended or adjusted under 35 U.S.C. 154(b) by 738 days.

should read (*) Notice: Subject to any disclaimer, the term of this patent is extended or adjusted under 35 U.S.C. 154(b) by 1,104 days.

Signed and Sealed this

Twenty-second Day of June, 2010

David J. Kappos
*Director of the United States Patent and Trademark Office*